US012675958B2

(12) United States Patent
Palangie et al.

(10) Patent No.: US 12,675,958 B2
(45) **Date of Patent: \*Jul. 7, 2026**

(54) SYSTEM AND METHOD OF AUGMENTED REPRESENTATION OF AN ELECTRONIC DEVICE

(71) Applicant: Apple Inc., Cupertino, CA (US)

(72) Inventors: Alexis H. Palangie, Palo Alto, CA (US); Benjamin Hylak, San Francisco, CA (US); Aaron M. Burns, Sunnyvale, CA (US); Nathan Gitter, Cupertino, CA (US)

(73) Assignee: Apple Inc., Cupertino, CA (US)

( \* ) Notice: Subject to any disclaimer, the term of this patent is extended or adjusted under 35 U.S.C. 154(b) by 56 days.

This patent is subject to a terminal disclaimer.

(21) Appl. No.: 18/587,739

(22) Filed: Feb. 26, 2024

(65) Prior Publication Data

US 2024/0273838 A1     Aug. 15, 2024

Related U.S. Application Data

(63) Continuation of application No. PCT/US2022/075482, filed on Aug. 25, 2022.
(Continued)

(51) Int. Cl.
*G06T 19/00*          (2011.01)
(52) U.S. Cl.
CPC ........ *G06T 19/006* (2013.01); *G06T 2200/24* (2013.01)
(58) Field of Classification Search
CPC ... G06T 19/006; G06T 2200/24; G06F 3/011; G06F 3/013; G06F 3/017; G06F 3/04815; G06F 3/0481
See application file for complete search history.

(56) References Cited

U.S. PATENT DOCUMENTS 1,173,824 A     2/1916  Mckee
5,015,188 A     5/1991  Pellosie et al.
(Continued)

FOREIGN PATENT DOCUMENTS

AU     2022348895 A1     4/2024
CA        3033344 A1     2/2018
(Continued)

OTHER PUBLICATIONS

How to Use Your Phone or Tablet in VR! | iOS and Android, YouTube [online]. YouTube, Dec. 20, 2017, Available online at <https://www.youtube.com/watch?v=QhfZjbVUxZE>, [Retrieved from Internet on Dec. 23, 2022], 4 pages.
(Continued)

*Primary Examiner* — Motilewa Good-Johnson
(74) *Attorney, Agent, or Firm* — Kubota & Basol LLP

(57)          ABSTRACT

Some embodiments of the disclosure are directed to an augmented representation of a first electronic device. A three-dimensional representation of a first electronic device (e.g., an augmented device) is presented using a second electronic device in a three-dimensional environment. The three-dimensional environment includes captured portions of a real-world environment, optionally including the first electronic device. The augmented representation of the first electronic device includes a virtual user interface element representing an extension of the physical display of the first electronic device. The representation of the augmented device includes a display of the augmented user interface. The augmented device is optionally configured to display some or all of the user interfaces operating on the first electronic device. Manipulations of and/or interactions with the augmented representation of the first electronic device are possible.

24 Claims, 23 Drawing Sheets

Related U.S. Application Data

(60) Provisional application No. 63/238,030, filed on Aug. 27, 2021.

(56) References Cited

U.S. PATENT DOCUMENTS

| | | | |
|---|---|---|---|
| 5,422,812 A | 6/1995 | Knoll et al. |
| 5,515,488 A | 5/1996 | Hoppe et al. |
| 5,524,195 A | 6/1996 | Clanton et al. |
| 5,610,828 A | 3/1997 | Kodosky et al. |
| 5,731,805 A | 3/1998 | Tognazzini et al. |
| 5,737,553 A | 4/1998 | Bartok |
| 5,740,440 A | 4/1998 | West |
| 5,751,287 A | 5/1998 | Hahn et al. |
| 5,758,122 A | 5/1998 | Corda et al. |
| 5,794,178 A | 8/1998 | Caid et al. |
| 5,809,267 A | 9/1998 | Moran et al. |
| 5,877,766 A | 3/1999 | Bates et al. |
| 5,900,849 A | 5/1999 | Gallery |
| 5,933,143 A | 8/1999 | Kobayashi |
| 5,990,886 A | 11/1999 | Serdy et al. |
| 6,061,060 A | 5/2000 | Berry et al. |
| 6,078,310 A | 6/2000 | Tognazzini |
| 6,108,004 A | 8/2000 | Medl |
| 6,112,015 A | 8/2000 | Planas et al. |
| 6,154,559 A | 11/2000 | Beardsley |
| 6,167,433 A | 12/2000 | Maples et al. |
| 6,295,069 B1 | 9/2001 | Shirur |
| 6,426,745 B1 | 7/2002 | Isaacs et al. |
| 6,456,296 B1 | 9/2002 | Cataudella et al. |
| 6,584,465 B1 | 6/2003 | Zhu et al. |
| 6,714,201 B1 | 3/2004 | Grinstein et al. |
| 6,750,873 B1 | 6/2004 | Bernardini et al. |
| 6,756,997 B1 | 6/2004 | Ward et al. |
| 6,968,511 B1 | 11/2005 | Robertson et al. |
| 7,035,903 B1 | 4/2006 | Baldonado |
| 7,096,120 B2 | 8/2006 | Hull |
| 7,134,130 B1 | 11/2006 | Thomas |
| 7,137,074 B1 | 11/2006 | Newton et al. |
| 7,230,629 B2 | 6/2007 | Reynolds et al. |
| 7,298,370 B1 | 11/2007 | Middler et al. |
| 7,580,576 B2 | 8/2009 | Wang et al. |
| 7,634,718 B2 | 12/2009 | Nakajima |
| 7,706,579 B2 | 4/2010 | Oijer |
| 7,721,226 B2 | 5/2010 | Barabe et al. |
| 8,046,721 B2 | 10/2011 | Chaudhri et al. |
| 8,122,341 B1 | 2/2012 | Dayan et al. |
| 8,341,541 B2 | 12/2012 | Holecek et al. |
| 8,436,872 B2 | 5/2013 | Wright et al. |
| 8,593,558 B2 | 11/2013 | Gardiner et al. |
| 8,724,856 B1 | 5/2014 | King |
| 8,730,156 B2 | 5/2014 | Weising et al. |
| 8,767,045 B2 | 7/2014 | Kitazato et al. |
| 8,793,620 B2 | 7/2014 | Stafford |
| 8,793,729 B2 | 7/2014 | Adimatyam et al. |
| 8,803,873 B2 | 8/2014 | Yoo et al. |
| 8,866,880 B2 | 10/2014 | Tan et al. |
| 8,896,632 B2 | 11/2014 | Macdougall et al. |
| 8,947,323 B1 | 2/2015 | Raffle et al. |
| 8,970,478 B2 | 3/2015 | Johansson |
| 8,970,629 B2 | 3/2015 | Kim et al. |
| 8,994,718 B2 | 3/2015 | Latta et al. |
| 9,007,301 B1 | 4/2015 | Raffle et al. |
| 9,108,109 B2 | 8/2015 | Pare et al. |
| 9,158,115 B1 | 10/2015 | Worley et al. |
| 9,164,975 B2 | 10/2015 | Milewski et al. |
| 9,183,672 B1 | 11/2015 | Hickman et al. |
| 9,185,062 B1 | 11/2015 | Yang et al. |
| 9,189,611 B2 | 11/2015 | Wssingbo |
| 9,196,072 B2 | 11/2015 | Oh et al. |
| 9,201,500 B2 | 12/2015 | Srinivasan et al. |
| 9,214,137 B2 | 12/2015 | Bala et al. |
| 9,222,787 B2 | 12/2015 | Blumenberg et al. |
| 9,230,368 B2 | 1/2016 | Keane et al. |
| 9,237,334 B2 | 1/2016 | Cheng et al. |
| 9,241,149 B2 | 1/2016 | Redmann |
| 9,245,388 B2 | 1/2016 | Poulos et al. |
| 9,256,785 B2 | 2/2016 | Qvarfordt |
| 9,293,118 B2 | 3/2016 | Matsui |
| 9,294,757 B1 | 3/2016 | Lewis et al. |
| 9,298,334 B1 | 3/2016 | Zimmerman et al. |
| 9,316,827 B2 | 4/2016 | Lindley et al. |
| 9,383,189 B2 | 7/2016 | Bridges et al. |
| 9,384,594 B2 | 7/2016 | Maciocci et al. |
| 9,396,580 B1 | 7/2016 | Nowrouzezahrai et al. |
| 9,400,559 B2 | 7/2016 | Latta et al. |
| 9,426,193 B2 | 8/2016 | Goodman |
| 9,436,357 B2 | 9/2016 | Pallakoff et al. |
| 9,437,047 B2 | 9/2016 | Chang et al. |
| 9,448,635 B2 | 9/2016 | Macdougall et al. |
| 9,448,687 B1 | 9/2016 | Mckenzie et al. |
| 9,465,479 B2 | 10/2016 | Cho et al. |
| 9,491,374 B1 | 11/2016 | Avrahami et al. |
| 9,519,371 B2 | 12/2016 | Nishida |
| 9,526,127 B1 | 12/2016 | Taubman et al. |
| 9,544,257 B2 | 1/2017 | Ogundokun et al. |
| 9,563,331 B2 | 2/2017 | Poulos et al. |
| 9,575,559 B2 | 2/2017 | Andrysco |
| 9,588,651 B1 | 3/2017 | Buchanan et al. |
| 9,612,722 B2 | 4/2017 | Miller et al. |
| 9,619,105 B1 | 4/2017 | Dal Mutto |
| 9,619,519 B1 | 4/2017 | Dorner |
| 9,672,588 B1 | 6/2017 | Doucette et al. |
| 9,681,112 B2 | 6/2017 | Son |
| 9,684,372 B2 | 6/2017 | Xun et al. |
| 9,704,230 B2 | 7/2017 | Hofmann et al. |
| 9,734,402 B2 | 8/2017 | Jang et al. |
| 9,778,814 B2 | 10/2017 | Ambrus et al. |
| 9,779,512 B2 | 10/2017 | Tomlin et al. |
| 9,829,708 B1 | 11/2017 | Asada |
| 9,851,866 B2 | 12/2017 | Goossens et al. |
| 9,864,498 B2 | 1/2018 | Olsson et al. |
| 9,870,130 B2 | 1/2018 | Schubert et al. |
| 9,886,087 B1 | 2/2018 | Wald et al. |
| 9,911,232 B2 | 3/2018 | Shapira et al. |
| 9,933,833 B2 | 4/2018 | Tu et al. |
| 9,934,614 B2 | 4/2018 | Ramsby et al. |
| 9,952,042 B2 | 4/2018 | Abovitz et al. |
| 10,026,209 B1 | 7/2018 | Dagley et al. |
| 10,049,460 B2 | 8/2018 | Romano et al. |
| 10,101,803 B2 | 10/2018 | Faaborg et al. |
| 10,139,985 B2 * | 11/2018 | Mildrew ................. G06F 3/013 |
| 10,163,198 B2 * | 12/2018 | Rochford ............... G06V 20/20 |
| 10,175,483 B2 | 1/2019 | Salter et al. |
| 10,186,086 B2 * | 1/2019 | Giraldi ................. G06F 3/04842 |
| 10,192,347 B2 | 1/2019 | Bui et al. |
| 10,203,764 B2 | 2/2019 | Katz et al. |
| 10,210,664 B1 | 2/2019 | Chaturvedi |
| 10,303,427 B2 | 5/2019 | Shintani et al. |
| 10,307,671 B2 | 6/2019 | Barney et al. |
| 10,310,265 B2 * | 6/2019 | Giwnewer ................ G06F 1/00 |
| 10,318,034 B1 | 6/2019 | Hauenstein et al. |
| 10,331,205 B2 * | 6/2019 | Kim ......................... G06F 1/163 |
| 10,339,721 B1 * | 7/2019 | Dascola .................. G06F 3/011 |
| 10,353,532 B1 * | 7/2019 | Holz ................... G06F 3/04847 |
| 10,373,381 B2 | 8/2019 | Nuernberger et al. |
| 10,389,977 B1 | 8/2019 | Van Os et al. |
| 10,394,320 B2 | 8/2019 | George-svahn et al. |
| 10,401,958 B2 | 9/2019 | Peana et al. |
| 10,402,081 B1 | 9/2019 | Andersen et al. |
| 10,424,124 B2 | 9/2019 | Takahashi |
| 10,448,189 B2 | 10/2019 | Link |
| 10,484,641 B2 | 11/2019 | Zhou et al. |
| 10,488,941 B2 | 11/2019 | Lam et al. |
| 10,499,044 B1 | 12/2019 | Giokaris et al. |
| 10,534,439 B2 | 1/2020 | Raffa et al. |
| 10,540,005 B2 * | 1/2020 | Yoon .................... G06Q 20/352 |
| 10,545,584 B2 | 1/2020 | Tome et al. |
| 10,564,714 B2 | 2/2020 | Marggraff et al. |
| 10,565,448 B2 | 2/2020 | Bell et al. |
| 10,565,761 B2 * | 2/2020 | DeLuca .............. G02B 27/017 |
| 10,573,067 B1 | 2/2020 | Naik et al. |
| 10,599,570 B1 | 3/2020 | Ding et al. |
| 10,630,803 B2 | 4/2020 | Hwang et al. |
| 10,642,368 B2 | 5/2020 | Chen |

(56) References Cited

U.S. PATENT DOCUMENTS

| | | |
|---|---|---|
| 10,645,332 B2 | 5/2020 | Zhang |
| 10,664,043 B2 | 5/2020 | Ikuta et al. |
| 10,664,048 B2 | 5/2020 | Cieplinski et al. |
| 10,664,050 B2 | 5/2020 | Alcaide et al. |
| 10,671,241 B1 | 6/2020 | Jia et al. |
| 10,671,243 B2 | 6/2020 | Ryu et al. |
| 10,678,403 B2 | 6/2020 | Duarte et al. |
| 10,691,216 B2 | 6/2020 | Geisner et al. |
| 10,698,562 B1 | 6/2020 | Zhou et al. |
| 10,699,488 B1 | 6/2020 | Terrano |
| 10,701,661 B1 | 6/2020 | Coelho et al. |
| 10,708,965 B1 | 7/2020 | Subramanian et al. |
| 10,712,900 B2 | 7/2020 | Osman et al. |
| 10,732,721 B1 | 8/2020 | Clements |
| 10,754,434 B2 | 8/2020 | Hall et al. |
| 10,762,716 B1 | 9/2020 | Paul et al. |
| 10,768,421 B1 | 9/2020 | Rosenberg et al. |
| 10,768,693 B2 | 9/2020 | Powderly et al. |
| 10,776,933 B2 | 9/2020 | Faulkner |
| 10,846,864 B2 | 11/2020 | Kim et al. |
| 10,852,814 B1 | 12/2020 | Caron et al. |
| 10,861,242 B2 | 12/2020 | Lacey et al. |
| 10,877,645 B2 * | 12/2020 | Lee ................... H04M 1/72415 |
| 10,885,701 B1 | 1/2021 | Patel |
| 10,890,967 B2 | 1/2021 | Stellmach et al. |
| 10,922,744 B1 | 2/2021 | Mahajan |
| 10,929,099 B2 | 2/2021 | Querze et al. |
| 10,936,148 B1 | 3/2021 | Merkl et al. |
| 10,956,724 B1 | 3/2021 | Terrano |
| 10,983,663 B2 | 4/2021 | Iglesias |
| 11,003,308 B1 | 5/2021 | Dryer et al. |
| 11,017,611 B1 | 5/2021 | Mount et al. |
| 11,023,035 B1 | 6/2021 | Atlas et al. |
| 11,055,920 B1 | 7/2021 | Bramwell et al. |
| 11,079,995 B1 | 8/2021 | Hulbert et al. |
| 11,082,463 B2 | 8/2021 | Felman |
| 11,095,857 B1 | 8/2021 | Krol et al. |
| 11,112,875 B1 | 9/2021 | Zhou et al. |
| 11,126,850 B1 | 9/2021 | Ichim et al. |
| 11,132,840 B2 * | 9/2021 | Sarangdhar ........... H04L 67/125 |
| 11,138,798 B2 | 10/2021 | Paul et al. |
| 11,146,909 B1 | 10/2021 | Pinto et al. |
| 11,150,730 B1 | 10/2021 | Anderson et al. |
| 11,175,791 B1 | 11/2021 | Patnaikuni et al. |
| 11,176,755 B1 | 11/2021 | Tichenor et al. |
| 11,199,898 B2 | 12/2021 | Blume et al. |
| 11,200,742 B1 | 12/2021 | Post et al. |
| 11,204,678 B1 | 12/2021 | Baker et al. |
| 11,228,805 B2 | 1/2022 | Hardy |
| 11,232,643 B1 | 1/2022 | Stevens et al. |
| 11,243,734 B2 * | 2/2022 | Boissière ........... G06F 21/6245 |
| 11,249,556 B1 | 2/2022 | Schwarz et al. |
| 11,262,885 B1 | 3/2022 | Burckel |
| 11,266,919 B2 | 3/2022 | Bear et al. |
| 11,294,472 B2 | 4/2022 | Tang et al. |
| 11,294,475 B1 | 4/2022 | Pinchon et al. |
| 11,307,653 B1 | 4/2022 | Qian et al. |
| 11,340,756 B2 | 5/2022 | Faulkner et al. |
| 11,343,420 B1 | 5/2022 | Herz et al. |
| 11,347,319 B2 | 5/2022 | Goel et al. |
| 11,348,300 B2 | 5/2022 | Zimmermann et al. |
| 11,379,033 B2 | 7/2022 | O'hern et al. |
| 11,380,323 B2 | 7/2022 | Shin et al. |
| 11,382,611 B1 | 7/2022 | Westling et al. |
| 11,406,896 B1 | 8/2022 | Cheung et al. |
| 11,409,363 B2 | 8/2022 | Chen et al. |
| 11,416,080 B2 | 8/2022 | Heo et al. |
| 11,432,095 B1 | 8/2022 | Satongar et al. |
| 11,461,973 B2 | 10/2022 | Pinchon |
| 11,496,571 B2 | 11/2022 | Berliner et al. |
| 11,500,510 B2 * | 11/2022 | Tokuchi .................. G06F 3/167 |
| 11,531,402 B1 | 12/2022 | Stolzenberg |
| 11,531,459 B2 | 12/2022 | Poupyrev et al. |
| 11,557,102 B2 | 1/2023 | Palangie et al. |
| 11,567,625 B2 | 1/2023 | Faulkner et al. |
| 11,573,363 B2 | 2/2023 | Zou et al. |
| 11,574,452 B2 | 2/2023 | Berliner et al. |
| 11,599,239 B2 | 3/2023 | Rockel et al. |
| 11,604,080 B2 | 3/2023 | Paoletti et al. |
| 11,615,596 B2 | 3/2023 | Faulkner et al. |
| 11,641,460 B1 | 5/2023 | Geusz et al. |
| 11,669,155 B2 | 6/2023 | Bowman et al. |
| 11,682,180 B1 | 6/2023 | Willkie |
| 11,689,632 B2 | 6/2023 | Raisher et al. |
| 11,720,171 B2 | 8/2023 | Pastrana Vicente et al. |
| 11,726,577 B2 | 8/2023 | Katz |
| 11,730,226 B2 | 8/2023 | Stolarz et al. |
| 11,733,824 B2 | 8/2023 | Iskandar et al. |
| 11,743,215 B1 | 8/2023 | Murillo et al. |
| 11,762,457 B1 | 9/2023 | Ikkai et al. |
| 11,762,473 B2 | 9/2023 | Cipoletta et al. |
| 11,768,544 B2 | 9/2023 | Schwarz et al. |
| 11,842,454 B1 * | 12/2023 | Lin ......................... G06T 19/20 |
| 11,847,748 B2 | 12/2023 | Liu et al. |
| 11,861,056 B2 * | 1/2024 | Burns ................. G06F 3/04842 |
| 11,861,136 B1 | 1/2024 | Faulkner et al. |
| 11,868,582 B2 * | 1/2024 | Kim ....................... H04L 67/08 |
| 11,875,013 B2 | 1/2024 | Lemay et al. |
| 11,875,162 B2 * | 1/2024 | Garstenauer ........... H04L 51/10 |
| 11,886,643 B2 | 1/2024 | Irie et al. |
| 11,899,845 B2 | 2/2024 | Chung et al. |
| 11,909,453 B2 | 2/2024 | Javaudin et al. |
| 11,914,759 B2 | 2/2024 | Klein et al. |
| 11,922,588 B2 | 3/2024 | Fillhardt et al. |
| 11,928,263 B2 | 3/2024 | Jung et al. |
| 11,934,569 B2 | 3/2024 | Pastrana Vicente et al. |
| 11,948,263 B1 * | 4/2024 | Rudman ................. G06V 20/20 |
| 11,954,242 B2 | 4/2024 | Dascola et al. |
| 11,972,092 B2 * | 4/2024 | Zurmoehle ......... G06F 3/04815 |
| 11,983,326 B2 | 5/2024 | Lacey |
| 11,988,832 B2 | 5/2024 | Singh et al. |
| 11,989,965 B2 | 5/2024 | Tarighat Mehrabani |
| 11,995,301 B2 | 5/2024 | Hylak et al. |
| 12,020,387 B2 * | 6/2024 | Maharaja .............. G06T 19/006 |
| 12,023,579 B2 | 7/2024 | Azmandian et al. |
| 12,032,803 B2 | 7/2024 | Pastrana Vicente et al. |
| 12,062,127 B2 | 8/2024 | Park et al. |
| 12,099,653 B2 | 9/2024 | Chawda et al. |
| 12,099,695 B1 | 9/2024 | Smith et al. |
| 12,112,011 B2 | 10/2024 | Smith et al. |
| 12,113,948 B1 | 10/2024 | Smith et al. |
| 12,118,200 B1 | 10/2024 | Shutzberg et al. |
| 12,154,236 B1 | 11/2024 | Herman et al. |
| 12,182,325 B2 * | 12/2024 | Calderone ............. G06F 3/0488 |
| 12,236,546 B1 | 2/2025 | Lipton |
| 12,254,127 B2 * | 3/2025 | Burns ...................... G06F 3/017 |
| 12,321,515 B2 * | 6/2025 | Calderone .............. G06F 3/011 |
| 12,394,167 B1 | 8/2025 | Scully et al. |
| 12,408,804 B2 * | 9/2025 | Schneider .............. G05D 1/661 |
| 12,456,271 B1 | 10/2025 | Bernstein et al. |
| 2001/0047250 A1 | 11/2001 | Schuller et al. |
| 2002/0024675 A1 | 2/2002 | Foxlin |
| 2002/0030692 A1 | 3/2002 | Griesert |
| 2002/0044152 A1 | 4/2002 | Abbott et al. |
| 2002/0065778 A1 | 5/2002 | Bouet et al. |
| 2003/0038754 A1 | 2/2003 | Goldstein et al. |
| 2003/0151611 A1 | 8/2003 | Turpin et al. |
| 2003/0222924 A1 | 12/2003 | Baron |
| 2004/0059784 A1 | 3/2004 | Caughey |
| 2004/0104806 A1 | 6/2004 | Yui et al. |
| 2004/0230912 A1 | 11/2004 | Clow et al. |
| 2004/0243926 A1 | 12/2004 | Trenbeath et al. |
| 2005/0044510 A1 | 2/2005 | Yi |
| 2005/0062738 A1 | 3/2005 | Handley et al. |
| 2005/0073136 A1 | 4/2005 | Larsson et al. |
| 2005/0100210 A1 | 5/2005 | Rice et al. |
| 2005/0138572 A1 | 6/2005 | Good et al. |
| 2005/0144570 A1 | 6/2005 | Loverin et al. |
| 2005/0144571 A1 | 6/2005 | Loverin et al. |
| 2005/0175218 A1 | 8/2005 | Vertegaal et al. |
| 2005/0198143 A1 | 9/2005 | Moody et al. |
| 2005/0216866 A1 | 9/2005 | Rosen et al. |
| 2005/0231532 A1 | 10/2005 | Suzuki et al. |
| 2005/0248299 A1 | 11/2005 | Chemel et al. |

(56) References Cited

U.S. PATENT DOCUMENTS

| | | |
|---|---|---|
| 2006/0028400 A1 | 2/2006 | Lapstun et al. |
| 2006/0034590 A1 | 2/2006 | Teramoto |
| 2006/0080702 A1 | 4/2006 | Diez et al. |
| 2006/0156228 A1 | 7/2006 | Gallo et al. |
| 2006/0256083 A1 | 11/2006 | Rosenberg |
| 2006/0283214 A1 | 12/2006 | Donadon et al. |
| 2007/0172112 A1 | 7/2007 | Paley et al. |
| 2007/0259716 A1 | 11/2007 | Mattice et al. |
| 2008/0132249 A1 | 6/2008 | Hamilton |
| 2008/0181502 A1 | 7/2008 | Yang |
| 2008/0186255 A1 | 8/2008 | Cohen et al. |
| 2008/0211771 A1 | 9/2008 | Richardson |
| 2008/0222710 A1 | 9/2008 | Blagsvedt et al. |
| 2008/0310707 A1 | 12/2008 | Kansal et al. |
| 2009/0037844 A1 | 2/2009 | Kim et al. |
| 2009/0049408 A1 | 2/2009 | Naaman et al. |
| 2009/0064035 A1 | 3/2009 | Shibata et al. |
| 2009/0146779 A1 | 6/2009 | Kumar et al. |
| 2009/0146961 A1 | 6/2009 | Cheung et al. |
| 2009/0231356 A1 | 9/2009 | Barnes et al. |
| 2009/0254843 A1 | 10/2009 | Van et al. |
| 2009/0319181 A1 | 12/2009 | Khosravy et al. |
| 2009/0326810 A1 | 12/2009 | Callaghan et al. |
| 2010/0060549 A1* | 3/2010 | Tsem .................... G06F 3/167 |
| | | 345/2.1 |
| 2010/0097375 A1 | 4/2010 | Tadaishi et al. |
| 2010/0115459 A1 | 5/2010 | Kinnunen et al. |
| 2010/0177049 A1 | 7/2010 | Levy et al. |
| 2010/0185949 A1 | 7/2010 | Jaeger |
| 2010/0188503 A1 | 7/2010 | Tsai et al. |
| 2010/0188572 A1 | 7/2010 | Card |
| 2010/0269145 A1 | 10/2010 | Ingrassia et al. |
| 2010/0293504 A1 | 11/2010 | Hachiya |
| 2010/0302245 A1 | 12/2010 | Best |
| 2010/0309140 A1 | 12/2010 | Widgor |
| 2010/0328432 A1 | 12/2010 | Tanaka |
| 2010/0332196 A1 | 12/2010 | Fisker et al. |
| 2011/0018895 A1 | 1/2011 | Buzyn et al. |
| 2011/0018896 A1 | 1/2011 | Buzyn et al. |
| 2011/0029185 A1 | 2/2011 | Aoki et al. |
| 2011/0032365 A1 | 2/2011 | Yett |
| 2011/0066981 A1 | 3/2011 | Chmielewski et al. |
| 2011/0098029 A1 | 4/2011 | Rhoads et al. |
| 2011/0142321 A1 | 6/2011 | Huffman |
| 2011/0156879 A1 | 6/2011 | Matsushita et al. |
| 2011/0164163 A1 | 7/2011 | Bilbrey et al. |
| 2011/0169927 A1 | 7/2011 | Mages et al. |
| 2011/0175932 A1 | 7/2011 | Yu et al. |
| 2011/0216060 A1 | 9/2011 | Weising et al. |
| 2011/0243448 A1 | 10/2011 | Kawabuchi et al. |
| 2011/0254865 A1 | 10/2011 | Yee et al. |
| 2011/0289691 A1 | 12/2011 | Laflèche et al. |
| 2011/0304557 A1 | 12/2011 | Wilburn et al. |
| 2011/0310001 A1 | 12/2011 | Madau et al. |
| 2011/0320969 A1 | 12/2011 | Hwang et al. |
| 2012/0038751 A1 | 2/2012 | Yuan et al. |
| 2012/0066638 A1 | 3/2012 | Ohri |
| 2012/0075496 A1 | 3/2012 | Akifusa et al. |
| 2012/0086624 A1 | 4/2012 | Thompson et al. |
| 2012/0124525 A1 | 5/2012 | Kang |
| 2012/0131631 A1 | 5/2012 | Bhogal et al. |
| 2012/0159386 A1 | 6/2012 | Kang et al. |
| 2012/0170089 A1 | 7/2012 | Kim et al. |
| 2012/0170840 A1 | 7/2012 | Caruso et al. |
| 2012/0184372 A1 | 7/2012 | Laarakkers et al. |
| 2012/0194547 A1 | 8/2012 | Johnson et al. |
| 2012/0223885 A1 | 9/2012 | Perez |
| 2012/0249416 A1 | 10/2012 | Maciocci et al. |
| 2012/0249741 A1 | 10/2012 | Maciocci et al. |
| 2012/0256956 A1 | 10/2012 | Kasahara |
| 2012/0256967 A1 | 10/2012 | Baldwin et al. |
| 2012/0257035 A1 | 10/2012 | Larsen |
| 2012/0272179 A1 | 10/2012 | Stafford |
| 2012/0290401 A1 | 11/2012 | Neven |
| 2012/0304087 A1 | 11/2012 | Walkin et al. |
| 2013/0010062 A1 | 1/2013 | Redmann |
| 2013/0027860 A1 | 1/2013 | Masaki et al. |
| 2013/0088516 A1 | 4/2013 | Ota et al. |
| 2013/0093727 A1 | 4/2013 | Eriksson et al. |
| 2013/0103313 A1 | 4/2013 | Moore et al. |
| 2013/0127850 A1 | 5/2013 | Bindon |
| 2013/0147820 A1 | 6/2013 | Kalai et al. |
| 2013/0148850 A1 | 6/2013 | Matsuda et al. |
| 2013/0167092 A1 | 6/2013 | Yu et al. |
| 2013/0169533 A1 | 7/2013 | Jahnke |
| 2013/0190044 A1 | 7/2013 | Kulas |
| 2013/0191160 A1 | 7/2013 | Oran |
| 2013/0207963 A1* | 8/2013 | Stirbu ..................... G06T 19/00 |
| | | 345/419 |
| 2013/0211843 A1 | 8/2013 | Clarkson |
| 2013/0212470 A1 | 8/2013 | Karunamuni et al. |
| 2013/0222227 A1 | 8/2013 | Johansson et al. |
| 2013/0222410 A1 | 8/2013 | Kameyama et al. |
| 2013/0229345 A1 | 9/2013 | Day et al. |
| 2013/0232430 A1 | 9/2013 | Reitan |
| 2013/0246955 A1 | 9/2013 | Schwesig et al. |
| 2013/0249922 A1 | 9/2013 | Hachiya |
| 2013/0263016 A1 | 10/2013 | Lehtiniemi et al. |
| 2013/0265227 A1 | 10/2013 | Julian |
| 2013/0271397 A1 | 10/2013 | Hildreth et al. |
| 2013/0278501 A1 | 10/2013 | Bulzacki |
| 2013/0286004 A1 | 10/2013 | Mcculloch et al. |
| 2013/0293456 A1 | 11/2013 | Son et al. |
| 2013/0293468 A1 | 11/2013 | Perez et al. |
| 2013/0300648 A1 | 11/2013 | Kim et al. |
| 2013/0300654 A1 | 11/2013 | Seki |
| 2013/0307945 A1 | 11/2013 | Cheng et al. |
| 2013/0321462 A1 | 12/2013 | Salter et al. |
| 2013/0325326 A1 | 12/2013 | Blumenberg et al. |
| 2013/0326341 A1 | 12/2013 | Nonaka |
| 2013/0326364 A1 | 12/2013 | Latta et al. |
| 2013/0328925 A1 | 12/2013 | Latta et al. |
| 2013/0332890 A1 | 12/2013 | Ramic et al. |
| 2013/0335301 A1 | 12/2013 | Wong et al. |
| 2013/0342564 A1 | 12/2013 | Kinnebrew et al. |
| 2013/0342570 A1 | 12/2013 | Kinnebrew et al. |
| 2013/0345975 A1 | 12/2013 | Vulcano et al. |
| 2014/0002338 A1 | 1/2014 | Raffa et al. |
| 2014/0002444 A1 | 1/2014 | Bennett et al. |
| 2014/0022243 A1 | 1/2014 | Loberg |
| 2014/0028548 A1 | 1/2014 | Bychkov et al. |
| 2014/0040832 A1 | 2/2014 | Regelous |
| 2014/0049462 A1 | 2/2014 | Weinberger et al. |
| 2014/0063058 A1 | 3/2014 | Fialho et al. |
| 2014/0068692 A1 | 3/2014 | Archibong et al. |
| 2014/0071241 A1 | 3/2014 | Yang et al. |
| 2014/0075361 A1 | 3/2014 | Reynolds et al. |
| 2014/0078176 A1 | 3/2014 | Kim et al. |
| 2014/0092018 A1 | 4/2014 | Geithner |
| 2014/0104206 A1 | 4/2014 | Anderson |
| 2014/0108942 A1 | 4/2014 | Freeman et al. |
| 2014/0114845 A1 | 4/2014 | Rogers et al. |
| 2014/0125584 A1 | 5/2014 | Xun et al. |
| 2014/0125585 A1 | 5/2014 | Song et al. |
| 2014/0126782 A1 | 5/2014 | Takai et al. |
| 2014/0129990 A1 | 5/2014 | Xin et al. |
| 2014/0132499 A1 | 5/2014 | Schwesinger et al. |
| 2014/0132633 A1 | 5/2014 | Fekete et al. |
| 2014/0139426 A1 | 5/2014 | Kryze et al. |
| 2014/0164928 A1 | 6/2014 | Kim |
| 2014/0168267 A1 | 6/2014 | Kim et al. |
| 2014/0168453 A1 | 6/2014 | Shoemake et al. |
| 2014/0181683 A1* | 6/2014 | Lim ..................... H04L 63/108 |
| | | 715/740 |
| 2014/0184759 A1 | 7/2014 | Lee |
| 2014/0198017 A1 | 7/2014 | Lamb et al. |
| 2014/0232639 A1 | 8/2014 | Hayashi et al. |
| 2014/0237366 A1 | 8/2014 | Poulos et al. |
| 2014/0247208 A1 | 9/2014 | Henderek et al. |
| 2014/0247210 A1 | 9/2014 | Henderek et al. |
| 2014/0258942 A1 | 9/2014 | Kutliroff et al. |
| 2014/0267046 A1 | 9/2014 | Ellsworth et al. |
| 2014/0267130 A1 | 9/2014 | Hwang et al. |
| 2014/0267400 A1 | 9/2014 | Mabbutt et al. |

(56) References Cited

U.S. PATENT DOCUMENTS

| | | |
|---|---|---|
| 2014/0268054 A1 | 9/2014 | Olsson et al. |
| 2014/0268925 A1 | 9/2014 | Lee et al. |
| 2014/0280603 A1 | 9/2014 | Rideout et al. |
| 2014/0282272 A1 | 9/2014 | Kies et al. |
| 2014/0285641 A1 | 9/2014 | Kato et al. |
| 2014/0298273 A1 | 10/2014 | Blackstone et al. |
| 2014/0304612 A1 | 10/2014 | Collin |
| 2014/0320404 A1 | 10/2014 | Kasahara |
| 2014/0331187 A1 | 11/2014 | Hicks et al. |
| 2014/0333535 A1 | 11/2014 | Stafford |
| 2014/0333666 A1 | 11/2014 | Poulos et al. |
| 2014/0347391 A1 | 11/2014 | Keane et al. |
| 2014/0351727 A1 | 11/2014 | Danton et al. |
| 2014/0351753 A1 | 11/2014 | Shin et al. |
| 2014/0362111 A1 | 12/2014 | Kim |
| 2014/0363074 A1 | 12/2014 | Dolfing et al. |
| 2014/0368537 A1 | 12/2014 | Salter et al. |
| 2014/0368620 A1 | 12/2014 | Li et al. |
| 2014/0372957 A1 | 12/2014 | Keane et al. |
| 2014/0375541 A1 | 12/2014 | Nister et al. |
| 2014/0375683 A1 | 12/2014 | Salter et al. |
| 2015/0009118 A1 | 1/2015 | Thomas et al. |
| 2015/0035822 A1 | 2/2015 | Arsan et al. |
| 2015/0042679 A1 | 2/2015 | Järvenpää |
| 2015/0058718 A1 | 2/2015 | Kim et al. |
| 2015/0067580 A1 | 3/2015 | Um et al. |
| 2015/0077335 A1 | 3/2015 | Taguchi et al. |
| 2015/0082180 A1 | 3/2015 | Ames et al. |
| 2015/0095844 A1 | 4/2015 | Cho et al. |
| 2015/0121466 A1 | 4/2015 | Brands et al. |
| 2015/0123890 A1 | 5/2015 | Kapur et al. |
| 2015/0123901 A1 | 5/2015 | Schwesinger et al. |
| 2015/0128075 A1 | 5/2015 | Kempinski |
| 2015/0131850 A1 | 5/2015 | Qvarfordt |
| 2015/0135108 A1 | 5/2015 | Pope et al. |
| 2015/0143251 A1 | 5/2015 | Bailiang et al. |
| 2015/0145887 A1 | 5/2015 | Forutanpour et al. |
| 2015/0149929 A1 | 5/2015 | Shepherd et al. |
| 2015/0149961 A1 | 5/2015 | Karakotsios |
| 2015/0153833 A1 | 6/2015 | Pinault et al. |
| 2015/0169506 A1 | 6/2015 | Leventhal et al. |
| 2015/0177937 A1 | 6/2015 | Poletto et al. |
| 2015/0193982 A1 | 7/2015 | Mihelich et al. |
| 2015/0199081 A1 | 7/2015 | Wheeler |
| 2015/0205106 A1 | 7/2015 | Norden |
| 2015/0212576 A1 | 7/2015 | Ambrus et al. |
| 2015/0212684 A1 | 7/2015 | Sabia et al. |
| 2015/0220152 A1 | 8/2015 | Tait et al. |
| 2015/0221132 A1 | 8/2015 | Kruglick |
| 2015/0227285 A1* | 8/2015 | Lee ...................... G06F 3/0488 |
| | | 715/765 |
| 2015/0242095 A1 | 8/2015 | Sonnenberg |
| 2015/0253957 A1 | 9/2015 | Crocker |
| 2015/0254905 A1 | 9/2015 | Ramsby et al. |
| 2015/0262428 A1 | 9/2015 | Tatzgern et al. |
| 2015/0277699 A1 | 10/2015 | Algreatly |
| 2015/0286741 A1 | 10/2015 | Zhu et al. |
| 2015/0312561 A1 | 10/2015 | Hoof et al. |
| 2015/0317831 A1 | 11/2015 | Ebstyne et al. |
| 2015/0317832 A1 | 11/2015 | Ebstyne et al. |
| 2015/0331240 A1 | 11/2015 | Poulos et al. |
| 2015/0331576 A1 | 11/2015 | Piya et al. |
| 2015/0332091 A1 | 11/2015 | Kim et al. |
| 2015/0370323 A1 | 12/2015 | Cieplinski et al. |
| 2015/0370404 A1 | 12/2015 | Hu et al. |
| 2015/0381974 A1 | 12/2015 | Hoffman et al. |
| 2016/0012642 A1 | 1/2016 | Lee et al. |
| 2016/0015470 A1 | 1/2016 | Border |
| 2016/0018898 A1 | 1/2016 | Tu et al. |
| 2016/0018900 A1 | 1/2016 | Tu et al. |
| 2016/0025971 A1 | 1/2016 | Crow et al. |
| 2016/0026242 A1 | 1/2016 | Burns et al. |
| 2016/0026243 A1 | 1/2016 | Bertram et al. |
| 2016/0026253 A1 | 1/2016 | Bradski et al. |
| 2016/0028961 A1 | 1/2016 | Thurairatnam |
| 2016/0041391 A1 | 2/2016 | Van et al. |
| 2016/0050642 A1 | 2/2016 | Brown et al. |
| 2016/0062615 A1 | 3/2016 | Price et al. |
| 2016/0062636 A1 | 3/2016 | Jung et al. |
| 2016/0070448 A1 | 3/2016 | Krol |
| 2016/0085301 A1 | 3/2016 | Lopez |
| 2016/0093108 A1 | 3/2016 | Mao et al. |
| 2016/0098093 A1 | 4/2016 | Cheon et al. |
| 2016/0098094 A1 | 4/2016 | Minkkinen |
| 2016/0098972 A1 | 4/2016 | Feit et al. |
| 2016/0104235 A1 | 4/2016 | Benkar et al. |
| 2016/0127690 A1 | 5/2016 | Kaehler et al. |
| 2016/0133044 A1 | 5/2016 | Lynch |
| 2016/0133052 A1 | 5/2016 | Choi et al. |
| 2016/0171304 A1 | 6/2016 | Golding et al. |
| 2016/0179191 A1 | 6/2016 | Kim et al. |
| 2016/0179336 A1 | 6/2016 | Ambrus et al. |
| 2016/0189426 A1 | 6/2016 | Thomas et al. |
| 2016/0193104 A1 | 7/2016 | Du |
| 2016/0196692 A1 | 7/2016 | Kjallstrom et al. |
| 2016/0210784 A1 | 7/2016 | Ramsby et al. |
| 2016/0216768 A1 | 7/2016 | Goetz et al. |
| 2016/0224122 A1 | 8/2016 | Dietz et al. |
| 2016/0225012 A1 | 8/2016 | Ha et al. |
| 2016/0225164 A1 | 8/2016 | Tomlin et al. |
| 2016/0227267 A1 | 8/2016 | Tsurutani et al. |
| 2016/0253063 A1 | 9/2016 | Critchlow |
| 2016/0253821 A1 | 9/2016 | Romano et al. |
| 2016/0275702 A1 | 9/2016 | Reynolds et al. |
| 2016/0279516 A1 | 9/2016 | Gupta et al. |
| 2016/0291692 A1 | 10/2016 | Yasuda et al. |
| 2016/0291698 A1 | 10/2016 | Niinuma et al. |
| 2016/0291922 A1 | 10/2016 | Montgomerie et al. |
| 2016/0306434 A1 | 10/2016 | Ferrin |
| 2016/0309081 A1 | 10/2016 | Frahm et al. |
| 2016/0313890 A1 | 10/2016 | Walline et al. |
| 2016/0334940 A1 | 11/2016 | Kandadai et al. |
| 2016/0349063 A1 | 12/2016 | Maurer et al. |
| 2016/0350973 A1 | 12/2016 | Shapira et al. |
| 2016/0357266 A1 | 12/2016 | Patel et al. |
| 2016/0363774 A1* | 12/2016 | Kawasima ........... G02B 27/017 |
| 2016/0370858 A1* | 12/2016 | Leppänen ................ G09G 5/12 |
| 2016/0373647 A1 | 12/2016 | García Morate et al. |
| 2016/0373714 A1 | 12/2016 | Lee et al. |
| 2016/0379409 A1 | 12/2016 | Gavriliuc et al. |
| 2016/0379418 A1 | 12/2016 | Osborn et al. |
| 2017/0032568 A1 | 2/2017 | Gharpure et al. |
| 2017/0038829 A1 | 2/2017 | Lanier et al. |
| 2017/0038837 A1 | 2/2017 | Faaborg et al. |
| 2017/0038849 A1 | 2/2017 | Hwang |
| 2017/0039770 A1 | 2/2017 | Lanier et al. |
| 2017/0052373 A1 | 2/2017 | Memmott et al. |
| 2017/0052393 A1 | 2/2017 | Kweon |
| 2017/0052595 A1 | 2/2017 | Poulos et al. |
| 2017/0053383 A1 | 2/2017 | Heo |
| 2017/0060230 A1 | 3/2017 | Faaborg et al. |
| 2017/0061694 A1 | 3/2017 | Giraldi et al. |
| 2017/0090566 A1 | 3/2017 | George-svahn et al. |
| 2017/0109930 A1 | 4/2017 | Holzer et al. |
| 2017/0115728 A1 | 4/2017 | Park et al. |
| 2017/0123487 A1 | 5/2017 | Hazra et al. |
| 2017/0131964 A1 | 5/2017 | Baek et al. |
| 2017/0132694 A1 | 5/2017 | Damy |
| 2017/0132822 A1 | 5/2017 | Marschke et al. |
| 2017/0146801 A1 | 5/2017 | Stempora |
| 2017/0147180 A1 | 5/2017 | Yoon et al. |
| 2017/0148339 A1 | 5/2017 | Van Curen et al. |
| 2017/0153866 A1 | 6/2017 | Grinberg et al. |
| 2017/0154326 A1 | 6/2017 | Jo et al. |
| 2017/0162177 A1 | 6/2017 | Lebeck et al. |
| 2017/0169616 A1 | 6/2017 | Wiley et al. |
| 2017/0178392 A1 | 6/2017 | Zuccarino et al. |
| 2017/0185276 A1 | 6/2017 | Lee et al. |
| 2017/0206691 A1 | 7/2017 | Harrises et al. |
| 2017/0206692 A1 | 7/2017 | Sheaffer et al. |
| 2017/0212583 A1 | 7/2017 | Krasadakis |
| 2017/0213388 A1 | 7/2017 | Margolis et al. |
| 2017/0214782 A1 | 7/2017 | Brinda |
| 2017/0221264 A1 | 8/2017 | Perry |

(56) References Cited

U.S. PATENT DOCUMENTS

| | | |
|---|---|---|
| 2017/0228130 A1 | 8/2017 | Palmaro |
| 2017/0236332 A1 | 8/2017 | Kipman et al. |
| 2017/0243352 A1 | 8/2017 | Kutliroff et al. |
| 2017/0251143 A1 | 8/2017 | Peruch et al. |
| 2017/0256096 A1 | 9/2017 | Faaborg et al. |
| 2017/0270715 A1 | 9/2017 | Lindsay et al. |
| 2017/0285737 A1 | 10/2017 | Khalid et al. |
| 2017/0287215 A1 | 10/2017 | Lalonde et al. |
| 2017/0287225 A1 | 10/2017 | Powderly et al. |
| 2017/0302903 A1 | 10/2017 | Ng et al. |
| 2017/0308163 A1 | 10/2017 | Cieplinski et al. |
| 2017/0315715 A1 | 11/2017 | Fujita et al. |
| 2017/0326457 A1 | 11/2017 | Tilton et al. |
| 2017/0344223 A1 | 11/2017 | Holzer et al. |
| 2017/0351094 A1 | 12/2017 | Poulos et al. |
| 2017/0357389 A1 | 12/2017 | Fleizach et al. |
| 2017/0358141 A1 | 12/2017 | Stafford et al. |
| 2017/0364198 A1 | 12/2017 | Yoganandan et al. |
| 2018/0005433 A1 | 1/2018 | Kohler et al. |
| 2018/0024681 A1 | 1/2018 | Bernstein et al. |
| 2018/0045963 A1 | 2/2018 | Hoover et al. |
| 2018/0046363 A1 | 2/2018 | Miller et al. |
| 2018/0052518 A1 | 2/2018 | Zhu et al. |
| 2018/0075658 A1 | 3/2018 | Lanier et al. |
| 2018/0077383 A1 | 3/2018 | Akao et al. |
| 2018/0081519 A1 | 3/2018 | Kim |
| 2018/0084287 A1 | 3/2018 | Shimura |
| 2018/0088787 A1 | 3/2018 | Bereza et al. |
| 2018/0095542 A1* | 4/2018 | Mallinson ............ G06T 19/006 |
| 2018/0095634 A1 | 4/2018 | Alexander |
| 2018/0095636 A1 | 4/2018 | Valdivia et al. |
| 2018/0095649 A1 | 4/2018 | Valdivia et al. |
| 2018/0101223 A1 | 4/2018 | Ishihara et al. |
| 2018/0103209 A1 | 4/2018 | Fischler et al. |
| 2018/0114364 A1 | 4/2018 | Mcphee et al. |
| 2018/0120944 A1 | 5/2018 | Wang et al. |
| 2018/0122043 A1 | 5/2018 | Energin et al. |
| 2018/0122138 A1 | 5/2018 | Piya et al. |
| 2018/0130255 A1 | 5/2018 | Hazeghi et al. |
| 2018/0136815 A1 | 5/2018 | Tomizuka et al. |
| 2018/0143693 A1 | 5/2018 | Calabrese et al. |
| 2018/0150204 A1 | 5/2018 | Macgillivray |
| 2018/0150997 A1 | 5/2018 | Austin |
| 2018/0157332 A1 | 6/2018 | Nie |
| 2018/0158222 A1 | 6/2018 | Hayashi |
| 2018/0165853 A1 | 6/2018 | Inagi et al. |
| 2018/0173404 A1 | 6/2018 | Smith |
| 2018/0181199 A1 | 6/2018 | Harvey et al. |
| 2018/0181272 A1 | 6/2018 | Olsson et al. |
| 2018/0183986 A1 | 6/2018 | Smith et al. |
| 2018/0188048 A1 | 7/2018 | Ding et al. |
| 2018/0188802 A1 | 7/2018 | Okumura |
| 2018/0190003 A1 | 7/2018 | Upadhyay et al. |
| 2018/0197336 A1 | 7/2018 | Rochford et al. |
| 2018/0197341 A1 | 7/2018 | Loberg et al. |
| 2018/0210628 A1 | 7/2018 | Mcphee et al. |
| 2018/0218214 A1 | 8/2018 | Pestun et al. |
| 2018/0220195 A1 | 8/2018 | Panchaksharaiah et al. |
| 2018/0239144 A1 | 8/2018 | Woods et al. |
| 2018/0247449 A1 | 8/2018 | Park et al. |
| 2018/0275753 A1 | 9/2018 | Publicover et al. |
| 2018/0286126 A1 | 10/2018 | Schwarz et al. |
| 2018/0300023 A1 | 10/2018 | Hein |
| 2018/0300952 A1 | 10/2018 | Evans et al. |
| 2018/0302687 A1 | 10/2018 | Bhattacharjee et al. |
| 2018/0315248 A1 | 11/2018 | Bastov et al. |
| 2018/0322701 A1 | 11/2018 | Pahud et al. |
| 2018/0330544 A1 | 11/2018 | Corso et al. |
| 2018/0330550 A1 | 11/2018 | Takahashi |
| 2018/0348010 A1 | 12/2018 | Coleman et al. |
| 2018/0348861 A1 | 12/2018 | Uscinski et al. |
| 2018/0348986 A1 | 12/2018 | Sawaki |
| 2018/0350099 A1 | 12/2018 | Yerkes et al. |
| 2018/0350119 A1 | 12/2018 | Kocharlakota et al. |
| 2018/0352374 A1 | 12/2018 | Ball et al. |
| 2019/0004683 A1 | 1/2019 | Pahud et al. |
| 2019/0005055 A1 | 1/2019 | Andrew et al. |
| 2019/0012060 A1 | 1/2019 | Moore et al. |
| 2019/0018479 A1 | 1/2019 | Minami |
| 2019/0018498 A1 | 1/2019 | West et al. |
| 2019/0034076 A1 | 1/2019 | Vinayak et al. |
| 2019/0037137 A1 | 1/2019 | Toksvig et al. |
| 2019/0043259 A1 | 2/2019 | Wang et al. |
| 2019/0050062 A1 | 2/2019 | Chen et al. |
| 2019/0056785 A1 | 2/2019 | Suk |
| 2019/0065027 A1 | 2/2019 | Hauenstein et al. |
| 2019/0073109 A1 | 3/2019 | Zhang et al. |
| 2019/0080572 A1 | 3/2019 | Kim et al. |
| 2019/0088149 A1 | 3/2019 | Fink et al. |
| 2019/0094963 A1 | 3/2019 | Nijs |
| 2019/0094979 A1 | 3/2019 | Hall et al. |
| 2019/0096134 A1 | 3/2019 | Amacker et al. |
| 2019/0101991 A1 | 4/2019 | Brennan |
| 2019/0102953 A1 | 4/2019 | Lindsay et al. |
| 2019/0130622 A1 | 5/2019 | Hoover et al. |
| 2019/0130633 A1 | 5/2019 | Haddad et al. |
| 2019/0138183 A1 | 5/2019 | Rosas et al. |
| 2019/0146128 A1 | 5/2019 | Cao et al. |
| 2019/0155495 A1 | 5/2019 | Klein et al. |
| 2019/0164340 A1 | 5/2019 | Pejic et al. |
| 2019/0172261 A1 | 6/2019 | Alt et al. |
| 2019/0172262 A1 | 6/2019 | Mchugh et al. |
| 2019/0180504 A1 | 6/2019 | Pomerantz et al. |
| 2019/0188895 A1 | 6/2019 | Miller et al. |
| 2019/0188918 A1 | 6/2019 | Brewer et al. |
| 2019/0204906 A1 | 7/2019 | Ross et al. |
| 2019/0212827 A1 | 7/2019 | Kin et al. |
| 2019/0213389 A1 | 7/2019 | Peruch et al. |
| 2019/0227763 A1 | 7/2019 | Kaufthal |
| 2019/0228503 A1 | 7/2019 | Tokuchi |
| 2019/0228589 A1 | 7/2019 | Dascola et al. |
| 2019/0238818 A1 | 8/2019 | Held et al. |
| 2019/0244434 A1 | 8/2019 | Pahud et al. |
| 2019/0251884 A1 | 8/2019 | Burns et al. |
| 2019/0258365 A1 | 8/2019 | Zurmoehle et al. |
| 2019/0265828 A1 | 8/2019 | Hauenstein et al. |
| 2019/0266774 A1 | 8/2019 | Sommerlade et al. |
| 2019/0277651 A1 | 9/2019 | Ruikar |
| 2019/0278432 A1 | 9/2019 | Bennett et al. |
| 2019/0279407 A1 | 9/2019 | Mchugh et al. |
| 2019/0287307 A1 | 9/2019 | Rogers et al. |
| 2019/0294312 A1 | 9/2019 | Rohrbacher |
| 2019/0302977 A1 | 10/2019 | Pendergast et al. |
| 2019/0304166 A1 | 10/2019 | Yu et al. |
| 2019/0310757 A1 | 10/2019 | Lee et al. |
| 2019/0311547 A1 | 10/2019 | Ohmori |
| 2019/0324529 A1 | 10/2019 | Stellmach et al. |
| 2019/0325654 A1 | 10/2019 | Stisser et al. |
| 2019/0332244 A1 | 10/2019 | Beszteri et al. |
| 2019/0332250 A1* | 10/2019 | Lee .................. H04M 1/72415 |
| 2019/0333278 A1 | 10/2019 | Palangie et al. |
| 2019/0339770 A1 | 11/2019 | Kurlethimar et al. |
| 2019/0340816 A1 | 11/2019 | Rogers |
| 2019/0340832 A1 | 11/2019 | Srinivasan et al. |
| 2019/0346678 A1 | 11/2019 | Nocham |
| 2019/0346922 A1 | 11/2019 | Young et al. |
| 2019/0349575 A1 | 11/2019 | Knepper et al. |
| 2019/0354259 A1 | 11/2019 | Park |
| 2019/0361521 A1 | 11/2019 | Stellmach et al. |
| 2019/0362557 A1 | 11/2019 | Lacey et al. |
| 2019/0362560 A1 | 11/2019 | Choi et al. |
| 2019/0369569 A1 | 12/2019 | Olsen et al. |
| 2019/0369836 A1 | 12/2019 | Faulkner et al. |
| 2019/0370492 A1 | 12/2019 | Falchuk et al. |
| 2019/0371072 A1 | 12/2019 | Lindberg et al. |
| 2019/0371279 A1 | 12/2019 | Mak |
| 2019/0377487 A1 | 12/2019 | Bailey et al. |
| 2019/0379765 A1 | 12/2019 | Fajt et al. |
| 2019/0384406 A1 | 12/2019 | Smith et al. |
| 2019/0392830 A1 | 12/2019 | Abdollahian |
| 2020/0004401 A1 | 1/2020 | Hwang et al. |
| 2020/0005539 A1 | 1/2020 | Hwang et al. |
| 2020/0012341 A1 | 1/2020 | Stellmach et al. |
| 2020/0020157 A1 | 1/2020 | Powers et al. |

(56) References Cited

U.S. PATENT DOCUMENTS

| | | |
|---|---|---|
| 2020/0026349 A1 | 1/2020 | Fontanel et al. |
| 2020/0026922 A1 | 1/2020 | Pekelny et al. |
| 2020/0038120 A1 | 2/2020 | Ziraknejad et al. |
| 2020/0043243 A1 | 2/2020 | Bhushan et al. |
| 2020/0045249 A1 | 2/2020 | Francois et al. |
| 2020/0048825 A1 | 2/2020 | Schultz et al. |
| 2020/0051527 A1* | 2/2020 | Ngo .................... G06F 3/04842 |
| 2020/0073521 A1 | 3/2020 | Peebler et al. |
| 2020/0081526 A1 | 3/2020 | Walker et al. |
| 2020/0082602 A1 | 3/2020 | Jones |
| 2020/0089314 A1 | 3/2020 | Poupyrev et al. |
| 2020/0092537 A1 | 3/2020 | Sutter et al. |
| 2020/0097077 A1 | 3/2020 | Nguyen et al. |
| 2020/0098140 A1 | 3/2020 | Jagnow et al. |
| 2020/0098173 A1 | 3/2020 | Mccall |
| 2020/0099989 A1 | 3/2020 | Niemirska et al. |
| 2020/0106965 A1 | 4/2020 | Malia et al. |
| 2020/0112711 A1* | 4/2020 | Enriquez ............... G06T 19/006 |
| 2020/0117213 A1 | 4/2020 | Tian et al. |
| 2020/0126291 A1 | 4/2020 | Nguyen et al. |
| 2020/0128227 A1 | 4/2020 | Chavez et al. |
| 2020/0128232 A1 | 4/2020 | Hwang et al. |
| 2020/0129850 A1 | 4/2020 | Ohashi |
| 2020/0135141 A1 | 4/2020 | Day et al. |
| 2020/0159017 A1 | 5/2020 | Lin et al. |
| 2020/0201444 A1* | 6/2020 | Stoyles .................. G06V 20/20 |
| 2020/0214682 A1 | 7/2020 | Zaslavsky et al. |
| 2020/0218074 A1 | 7/2020 | Hoover et al. |
| 2020/0225735 A1 | 7/2020 | Schwarz |
| 2020/0225746 A1 | 7/2020 | Bar-zeev et al. |
| 2020/0225747 A1 | 7/2020 | Bar-zeev et al. |
| 2020/0225830 A1 | 7/2020 | Tang et al. |
| 2020/0226814 A1 | 7/2020 | Tang et al. |
| 2020/0226823 A1 | 7/2020 | Stachniak et al. |
| 2020/0242844 A1 | 7/2020 | Bae et al. |
| 2020/0257245 A1 | 8/2020 | Linville et al. |
| 2020/0257484 A1 | 8/2020 | Qian et al. |
| 2020/0258481 A1 | 8/2020 | Woo et al. |
| 2020/0267326 A1 | 8/2020 | Yim |
| 2020/0272303 A1 | 8/2020 | Jia et al. |
| 2020/0285314 A1 | 9/2020 | Cieplinski et al. |
| 2020/0286299 A1 | 9/2020 | Wang et al. |
| 2020/0301513 A1 | 9/2020 | Mejia Cobo |
| 2020/0318955 A1 | 10/2020 | Sharapov et al. |
| 2020/0319704 A1 | 10/2020 | Kathuria et al. |
| 2020/0322178 A1 | 10/2020 | Wang et al. |
| 2020/0322575 A1 | 10/2020 | Valli |
| 2020/0328913 A1 | 10/2020 | Wyas et al. |
| 2020/0356221 A1 | 11/2020 | Behzadi et al. |
| 2020/0357184 A1 | 11/2020 | Paul et al. |
| 2020/0357374 A1 | 11/2020 | Verweij et al. |
| 2020/0363867 A1 | 11/2020 | Azimi et al. |
| 2020/0371602 A1 | 11/2020 | Kanda |
| 2020/0371673 A1 | 11/2020 | Faulkner |
| 2020/0379626 A1 | 12/2020 | Guyomard et al. |
| 2020/0387214 A1 | 12/2020 | Ravasz et al. |
| 2020/0387228 A1 | 12/2020 | Ravasz et al. |
| 2020/0387287 A1 | 12/2020 | Ravasz et al. |
| 2020/0401687 A1 | 12/2020 | Mak |
| 2020/0410960 A1 | 12/2020 | Saito et al. |
| 2020/0412862 A1* | 12/2020 | Oh ........................ H04W 76/14 |
| 2021/0011556 A1 | 1/2021 | Atlas et al. |
| 2021/0019036 A1 | 1/2021 | Wang et al. |
| 2021/0034163 A1 | 2/2021 | Goel et al. |
| 2021/0034319 A1 | 2/2021 | Wang et al. |
| 2021/0049826 A1 | 2/2021 | Takahashi |
| 2021/0055789 A1 | 2/2021 | Tsai et al. |
| 2021/0056748 A1 | 2/2021 | Pritchett |
| 2021/0067418 A1* | 3/2021 | Ely ........................ H04L 41/22 |
| 2021/0074062 A1 | 3/2021 | Madonna et al. |
| 2021/0090222 A1 | 3/2021 | Lee et al. |
| 2021/0090337 A1 | 3/2021 | Ravasz et al. |
| 2021/0090348 A1 | 3/2021 | Croxford et al. |
| 2021/0096726 A1 | 4/2021 | Faulkner et al. |
| 2021/0097766 A1 | 4/2021 | Palangie et al. |
| 2021/0097776 A1 | 4/2021 | Faulkner et al. |
| 2021/0102820 A1 | 4/2021 | Le et al. |
| 2021/0103333 A1 | 4/2021 | Cieplinski et al. |
| 2021/0125414 A1 | 4/2021 | Berkebile |
| 2021/0132687 A1 | 5/2021 | Luo et al. |
| 2021/0134069 A1 | 5/2021 | Sorrento |
| 2021/0134248 A1 | 5/2021 | Wan et al. |
| 2021/0142552 A1 | 5/2021 | Kimura et al. |
| 2021/0158624 A1 | 5/2021 | Moon et al. |
| 2021/0165484 A1 | 6/2021 | Suguhara et al. |
| 2021/0165923 A1 | 6/2021 | Johnston |
| 2021/0166437 A1 | 6/2021 | Legendre et al. |
| 2021/0173340 A1 | 6/2021 | Kim |
| 2021/0173536 A1 | 6/2021 | Kondo |
| 2021/0191600 A1 | 6/2021 | Lemay et al. |
| 2021/0225043 A1 | 7/2021 | Tang et al. |
| 2021/0227601 A1 | 7/2021 | Eom et al. |
| 2021/0240332 A1 | 8/2021 | Walkin et al. |
| 2021/0241483 A1 | 8/2021 | Dryer et al. |
| 2021/0248674 A1 | 8/2021 | Ogunbunmi |
| 2021/0272367 A1 | 9/2021 | Richter |
| 2021/0272537 A1 | 9/2021 | Mak |
| 2021/0279957 A1* | 9/2021 | Eder .................. G06F 18/2413 |
| 2021/0279967 A1 | 9/2021 | Gernoth et al. |
| 2021/0286502 A1 | 9/2021 | Lemay et al. |
| 2021/0286510 A1 | 9/2021 | Tyler et al. |
| 2021/0287439 A1 | 9/2021 | Goodrich et al. |
| 2021/0295592 A1 | 9/2021 | Von Cramon |
| 2021/0295602 A1 | 9/2021 | Scapel et al. |
| 2021/0303074 A1 | 9/2021 | Vanblon et al. |
| 2021/0303107 A1 | 9/2021 | Pla I Conesa et al. |
| 2021/0312684 A1 | 10/2021 | Zimmermann et al. |
| 2021/0312713 A1 | 10/2021 | Peri et al. |
| 2021/0312717 A1 | 10/2021 | Mao |
| 2021/0326094 A1* | 10/2021 | Buerli .................. G06F 3/0481 |
| 2021/0327140 A1 | 10/2021 | Rothkopf et al. |
| 2021/0331069 A1 | 10/2021 | Gustafson et al. |
| 2021/0333864 A1 | 10/2021 | Harvey et al. |
| 2021/0350564 A1 | 11/2021 | Peuhkurinen et al. |
| 2021/0350604 A1 | 11/2021 | Pejsa et al. |
| 2021/0350634 A1 | 11/2021 | Major et al. |
| 2021/0358294 A1 | 11/2021 | Parashar et al. |
| 2021/0365108 A1* | 11/2021 | Burns .................. G06F 3/0481 |
| 2021/0366440 A1 | 11/2021 | Burns et al. |
| 2021/0368136 A1 | 11/2021 | Chalmers et al. |
| 2021/0374221 A1 | 12/2021 | Markhasin et al. |
| 2021/0375022 A1 | 12/2021 | Lee et al. |
| 2021/0383097 A1 | 12/2021 | Guerard et al. |
| 2021/0400744 A1 | 12/2021 | Chen et al. |
| 2021/0402306 A1 | 12/2021 | Huang |
| 2021/0405760 A1 | 12/2021 | Schoen |
| 2021/0409903 A1 | 12/2021 | Shapiro et al. |
| 2022/0011577 A1 | 1/2022 | Lawver et al. |
| 2022/0011855 A1 | 1/2022 | Hazra et al. |
| 2022/0012002 A1 | 1/2022 | Bar-zeev et al. |
| 2022/0027115 A1 | 1/2022 | Haapoja et al. |
| 2022/0028108 A1 | 1/2022 | Haapoja et al. |
| 2022/0030197 A1 | 1/2022 | Ishimoto |
| 2022/0070241 A1 | 3/2022 | Yerli |
| 2022/0076496 A1 | 3/2022 | Palangie et al. |
| 2022/0083145 A1 | 3/2022 | Matsunaga et al. |
| 2022/0083197 A1 | 3/2022 | Rockel et al. |
| 2022/0084279 A1 | 3/2022 | Lindmeier et al. |
| 2022/0086203 A1 | 3/2022 | Morris et al. |
| 2022/0086205 A1* | 3/2022 | LeBeau .................. G06F 3/011 |
| 2022/0091722 A1 | 3/2022 | Faulkner et al. |
| 2022/0091723 A1 | 3/2022 | Faulkner et al. |
| 2022/0092862 A1 | 3/2022 | Faulkner et al. |
| 2022/0100265 A1 | 3/2022 | Kies et al. |
| 2022/0100270 A1 | 3/2022 | Pastrana Vicente et al. |
| 2022/0101593 A1 | 3/2022 | Rockel et al. |
| 2022/0101612 A1 | 3/2022 | Palangie et al. |
| 2022/0104910 A1 | 4/2022 | Shelton et al. |
| 2022/0121275 A1 | 4/2022 | Balaji et al. |
| 2022/0121344 A1 | 4/2022 | Pastrana Vicente et al. |
| 2022/0122303 A1 | 4/2022 | Sasikumar et al. |
| 2022/0124130 A1 | 4/2022 | Punwani et al. |
| 2022/0124286 A1 | 4/2022 | Punwani et al. |
| 2022/0130107 A1 | 4/2022 | Lindh |

(56) References Cited

U.S. PATENT DOCUMENTS

| | | |
|---|---|---|
| 2022/0130126 A1 | 4/2022 | Delgado et al. |
| 2022/0137701 A1 | 5/2022 | Bowman et al. |
| 2022/0137705 A1 | 5/2022 | Hashimoto et al. |
| 2022/0148257 A1 | 5/2022 | Boubekeur et al. |
| 2022/0155853 A1 | 5/2022 | Fan et al. |
| 2022/0155863 A1 | 5/2022 | Wang et al. |
| 2022/0155909 A1 | 5/2022 | Kawashima et al. |
| 2022/0157029 A1 | 5/2022 | Horita et al. |
| 2022/0157083 A1 | 5/2022 | Jandhyala et al. |
| 2022/0165013 A1 | 5/2022 | Velez et al. |
| 2022/0179497 A1 | 6/2022 | Jung et al. |
| 2022/0179503 A1 | 6/2022 | Timonen et al. |
| 2022/0187907 A1 | 6/2022 | Lee et al. |
| 2022/0191570 A1 | 6/2022 | Reid et al. |
| 2022/0197403 A1 | 6/2022 | Hughes et al. |
| 2022/0198755 A1 | 6/2022 | Pinchon |
| 2022/0206298 A1 | 6/2022 | Goodman |
| 2022/0206588 A1 | 6/2022 | Canberk et al. |
| 2022/0207840 A1 | 6/2022 | Cansizoglu et al. |
| 2022/0214743 A1 | 7/2022 | Dascola et al. |
| 2022/0221976 A1 | 7/2022 | Agarwal et al. |
| 2022/0229524 A1 | 7/2022 | Mckenzie et al. |
| 2022/0229534 A1 | 7/2022 | Terre et al. |
| 2022/0232191 A1 | 7/2022 | Kawakami et al. |
| 2022/0236801 A1 | 7/2022 | Serbanati et al. |
| 2022/0239718 A1 | 7/2022 | Song et al. |
| 2022/0244536 A1* | 8/2022 | Sha ...................... G06F 3/0484 |
| 2022/0245888 A1 | 8/2022 | Singh et al. |
| 2022/0252882 A1 | 8/2022 | Berliner et al. |
| 2022/0253125 A1 | 8/2022 | Wallen et al. |
| 2022/0253136 A1 | 8/2022 | Holder et al. |
| 2022/0253149 A1 | 8/2022 | Berliner et al. |
| 2022/0253194 A1 | 8/2022 | Berliner et al. |
| 2022/0255995 A1* | 8/2022 | Berliner ............. G06F 3/04883 |
| 2022/0276720 A1 | 9/2022 | Yasui |
| 2022/0277533 A1 | 9/2022 | Park |
| 2022/0279303 A1 | 9/2022 | Marculescu et al. |
| 2022/0286488 A1 | 9/2022 | Berliner et al. |
| 2022/0287676 A1 | 9/2022 | Steines et al. |
| 2022/0291808 A1* | 9/2022 | Stevens .................. G06F 3/017 |
| 2022/0292783 A1 | 9/2022 | Jayaram et al. |
| 2022/0292784 A1 | 9/2022 | Jayaram et al. |
| 2022/0292785 A1 | 9/2022 | Jayaram et al. |
| 2022/0295032 A1 | 9/2022 | Jayaram et al. |
| 2022/0295040 A1 | 9/2022 | Jayaram et al. |
| 2022/0295139 A1 | 9/2022 | Jayaram et al. |
| 2022/0301264 A1 | 9/2022 | O'leary et al. |
| 2022/0303680 A1 | 9/2022 | Ahmed et al. |
| 2022/0311950 A1 | 9/2022 | Ith et al. |
| 2022/0317776 A1 | 10/2022 | Sundstrom et al. |
| 2022/0319134 A1 | 10/2022 | Rodrigues et al. |
| 2022/0319453 A1 | 10/2022 | Llull et al. |
| 2022/0326837 A1 | 10/2022 | Dessero et al. |
| 2022/0335697 A1 | 10/2022 | Harding et al. |
| 2022/0350463 A1 | 11/2022 | Walkin et al. |
| 2022/0365595 A1 | 11/2022 | Cieplinski et al. |
| 2022/0365740 A1 | 11/2022 | Chang et al. |
| 2022/0374136 A1 | 11/2022 | Chang et al. |
| 2022/0382385 A1 | 12/2022 | Chen et al. |
| 2022/0383592 A1 | 12/2022 | Hare et al. |
| 2022/0391158 A1* | 12/2022 | Lemmens ............. G06F 3/0481 |
| 2022/0392169 A1 | 12/2022 | Simpson et al. |
| 2022/0397962 A1 | 12/2022 | Goel et al. |
| 2022/0408164 A1 | 12/2022 | Lee et al. |
| 2022/0413691 A1 | 12/2022 | Becker et al. |
| 2022/0414975 A1 | 12/2022 | Becker et al. |
| 2022/0414999 A1 | 12/2022 | Ravasz et al. |
| 2022/0415094 A1 | 12/2022 | Kim et al. |
| 2022/0417604 A1 | 12/2022 | Chandrashekar et al. |
| 2023/0004216 A1 | 1/2023 | Rodgers et al. |
| 2023/0007335 A1 | 1/2023 | Gupta et al. |
| 2023/0008537 A1 | 1/2023 | Henderson et al. |
| 2023/0009683 A1 | 1/2023 | Biran et al. |
| 2023/0021861 A1 | 1/2023 | Fujiwara et al. |
| 2023/0027040 A1 | 1/2023 | Wang et al. |
| 2023/0030699 A1 | 2/2023 | Zion et al. |
| 2023/0031832 A1 | 2/2023 | Lipton et al. |
| 2023/0032545 A1 | 2/2023 | Mindlin et al. |
| 2023/0032771 A1 | 2/2023 | Zion et al. |
| 2023/0068660 A1 | 3/2023 | Brent et al. |
| 2023/0069764 A1 | 3/2023 | Jonker et al. |
| 2023/0074080 A1 | 3/2023 | Miller et al. |
| 2023/0076326 A1 | 3/2023 | Xu et al. |
| 2023/0086766 A1 | 3/2023 | Olwal et al. |
| 2023/0092282 A1 | 3/2023 | Boesel et al. |
| 2023/0092874 A1 | 3/2023 | Krivoruchko et al. |
| 2023/0093979 A1 | 3/2023 | Stauber et al. |
| 2023/0094522 A1 | 3/2023 | Stauber et al. |
| 2023/0100610 A1 | 3/2023 | Pastrana Vicente et al. |
| 2023/0100689 A1 | 3/2023 | Chiu et al. |
| 2023/0103161 A1 | 3/2023 | Li et al. |
| 2023/0114080 A1 | 4/2023 | Yang et al. |
| 2023/0119162 A1 | 4/2023 | Lipton et al. |
| 2023/0120052 A1 | 4/2023 | Wallen et al. |
| 2023/0130520 A1 | 4/2023 | Kaptelinin |
| 2023/0133579 A1 | 5/2023 | Chang et al. |
| 2023/0145592 A1 | 5/2023 | Singh et al. |
| 2023/0152889 A1 | 5/2023 | Cieplinski et al. |
| 2023/0152935 A1 | 5/2023 | Mckenzie et al. |
| 2023/0154122 A1 | 5/2023 | Dascola et al. |
| 2023/0163987 A1 | 5/2023 | Young et al. |
| 2023/0168745 A1 | 6/2023 | Yoda |
| 2023/0168788 A1 | 6/2023 | Faulkner et al. |
| 2023/0176806 A1 | 6/2023 | Chen et al. |
| 2023/0185426 A1 | 6/2023 | Rockel et al. |
| 2023/0186577 A1 | 6/2023 | Rockel et al. |
| 2023/0206572 A1 | 6/2023 | Pazmino et al. |
| 2023/0221833 A1 | 7/2023 | Holder et al. |
| 2023/0236660 A1 | 7/2023 | Kundu |
| 2023/0244857 A1 | 8/2023 | Weiss et al. |
| 2023/0259265 A1 | 8/2023 | Krivoruchko et al. |
| 2023/0260240 A1 | 8/2023 | Jayaram et al. |
| 2023/0266859 A1 | 8/2023 | Day et al. |
| 2023/0273706 A1 | 8/2023 | Smith et al. |
| 2023/0274504 A1 | 8/2023 | Ren et al. |
| 2023/0290042 A1 | 9/2023 | Casella et al. |
| 2023/0308610 A1 | 9/2023 | Henderson et al. |
| 2023/0308630 A1 | 9/2023 | Delgado |
| 2023/0314801 A1 | 10/2023 | Bove et al. |
| 2023/0315270 A1 | 10/2023 | Hylak et al. |
| 2023/0316634 A1 | 10/2023 | Chiu et al. |
| 2023/0316658 A1 | 10/2023 | Smith et al. |
| 2023/0325004 A1 | 10/2023 | Burns et al. |
| 2023/0325046 A1 | 10/2023 | De Almeida E De Vincenzo et al. |
| 2023/0333645 A1 | 10/2023 | Palangie et al. |
| 2023/0333646 A1 | 10/2023 | Pastrana Vicente et al. |
| 2023/0334808 A1 | 10/2023 | Sundstrom et al. |
| 2023/0341932 A1 | 10/2023 | Silva et al. |
| 2023/0343049 A1 | 10/2023 | Boesel et al. |
| 2023/0351702 A1* | 11/2023 | Tan ........................ G10L 15/22 |
| 2023/0353398 A1 | 11/2023 | White |
| 2023/0359199 A1 | 11/2023 | Adachi et al. |
| 2023/0360264 A1 | 11/2023 | Wu et al. |
| 2023/0368475 A1* | 11/2023 | Chan ...................... G06V 20/40 |
| 2023/0377259 A1 | 11/2023 | Becker et al. |
| 2023/0377268 A1 | 11/2023 | Hopkins et al. |
| 2023/0377295 A1 | 11/2023 | Angevine et al. |
| 2023/0377299 A1 | 11/2023 | Becker et al. |
| 2023/0377300 A1 | 11/2023 | Becker et al. |
| 2023/0384907 A1 | 11/2023 | Boesel et al. |
| 2023/0385532 A1 | 11/2023 | Mcveigh et al. |
| 2023/0388357 A1 | 11/2023 | Faulkner et al. |
| 2023/0394755 A1 | 12/2023 | Negoita et al. |
| 2023/0396854 A1 | 12/2023 | Sanders et al. |
| 2023/0400958 A1* | 12/2023 | Morrison ............ G06F 3/04815 |
| 2023/0409271 A1 | 12/2023 | Agrawal et al. |
| 2024/0012530 A1 | 1/2024 | Lin et al. |
| 2024/0037886 A1 | 2/2024 | Chiu et al. |
| 2024/0061513 A1 | 2/2024 | Reisman et al. |
| 2024/0062279 A1 | 2/2024 | Scully et al. |
| 2024/0070948 A1 | 2/2024 | Bradley et al. |
| 2024/0086031 A1 | 3/2024 | Palangie et al. |
| 2024/0086032 A1 | 3/2024 | Palangie et al. |

(56)  References Cited

U.S. PATENT DOCUMENTS

| | | |
|---|---|---|
| 2024/0087256 A1 | 3/2024 | Hylak et al. |
| 2024/0094863 A1 | 3/2024 | Smith et al. |
| 2024/0094866 A1 | 3/2024 | Lemay et al. |
| 2024/0094882 A1 | 3/2024 | Brewer et al. |
| 2024/0095984 A1 | 3/2024 | Ren et al. |
| 2024/0102821 A1 | 3/2024 | Vallet et al. |
| 2024/0103613 A1 | 3/2024 | Chawda et al. |
| 2024/0103616 A1 | 3/2024 | Yerkes et al. |
| 2024/0103636 A1 | 3/2024 | Lindmeier et al. |
| 2024/0103676 A1 | 3/2024 | Pastrana Vicente et al. |
| 2024/0103681 A1 | 3/2024 | Broughton et al. |
| 2024/0103684 A1 | 3/2024 | Yu et al. |
| 2024/0103685 A1 | 3/2024 | Pazmino et al. |
| 2024/0103686 A1* | 3/2024 | Pazmino ................. H04L 67/12 |
| 2024/0103687 A1 | 3/2024 | Pastrana Vicente et al. |
| 2024/0103701 A1 | 3/2024 | Pastrana Vicente et al. |
| 2024/0103704 A1 | 3/2024 | Pastrana Vicente et al. |
| 2024/0103707 A1 | 3/2024 | Henderson et al. |
| 2024/0103716 A1 | 3/2024 | Pastrana Vicente et al. |
| 2024/0103803 A1 | 3/2024 | Krivoruchko et al. |
| 2024/0104836 A1 | 3/2024 | Dessero et al. |
| 2024/0104843 A1 | 3/2024 | Mckenzie et al. |
| 2024/0104870 A1 | 3/2024 | Fuste Lleixa et al. |
| 2024/0104873 A1 | 3/2024 | Pastrana Vicente et al. |
| 2024/0104875 A1 | 3/2024 | Couche et al. |
| 2024/0104876 A1 | 3/2024 | Couche et al. |
| 2024/0104877 A1 | 3/2024 | Henderson et al. |
| 2024/0119682 A1 | 4/2024 | Rudman et al. |
| 2024/0126362 A1* | 4/2024 | Burns ..................... G06F 3/013 |
| 2024/0135612 A1 | 4/2024 | Hold-geoffroy et al. |
| 2024/0152245 A1 | 5/2024 | Broughton et al. |
| 2024/0152256 A1 | 5/2024 | Dascola et al. |
| 2024/0185514 A1 | 6/2024 | Singh et al. |
| 2024/0189507 A1 | 6/2024 | Bailey et al. |
| 2024/0192764 A1 | 6/2024 | Dascola et al. |
| 2024/0193892 A1 | 6/2024 | Lutter et al. |
| 2024/0200967 A1 | 6/2024 | Arroyo et al. |
| 2024/0203066 A1 | 6/2024 | Kawashima et al. |
| 2024/0205509 A1 | 6/2024 | Kim et al. |
| 2024/0221273 A1 | 7/2024 | Dusseau et al. |
| 2024/0221291 A1 | 7/2024 | Henderson et al. |
| 2024/0233097 A1 | 7/2024 | Ngo et al. |
| 2024/0233288 A1* | 7/2024 | Stauber ................. A63F 13/533 |
| 2024/0256032 A1 | 8/2024 | Holder et al. |
| 2024/0265656 A1 | 8/2024 | Victor-faichney et al. |
| 2024/0265796 A1 | 8/2024 | Ippadi Veerabhadre Gowda et al. |
| 2024/0272722 A1 | 8/2024 | Gitter et al. |
| 2024/0272782 A1 | 8/2024 | Pastrana Vicente et al. |
| 2024/0273838 A1* | 8/2024 | Palangie ................. G06F 3/017 |
| 2024/0281108 A1 | 8/2024 | Krivoruchko et al. |
| 2024/0281109 A1 | 8/2024 | Manjunath et al. |
| 2024/0291953 A1 | 8/2024 | Cerra et al. |
| 2024/0297919 A1 | 9/2024 | Berliner et al. |
| 2024/0302948 A1 | 9/2024 | Hylak et al. |
| 2024/0310971 A1 | 9/2024 | Kawashima et al. |
| 2024/0338104 A1 | 10/2024 | Salter et al. |
| 2024/0338921 A1 | 10/2024 | Burgner et al. |
| 2024/0361832 A1* | 10/2024 | Calderone ........... G02B 27/017 |
| 2024/0361833 A1* | 10/2024 | Calderone .............. G06F 3/011 |
| 2024/0361835 A1 | 10/2024 | Hylak et al. |
| 2024/0361901 A1 | 10/2024 | Ravasz et al. |
| 2024/0393876 A1 | 11/2024 | Chawda et al. |
| 2024/0402800 A1 | 12/2024 | Shutzberg et al. |
| 2024/0402821 A1 | 12/2024 | Meyer et al. |
| 2024/0403080 A1 | 12/2024 | Laurita et al. |
| 2024/0404206 A1 | 12/2024 | Chiu et al. |
| 2024/0404207 A1 | 12/2024 | Laurita et al. |
| 2024/0404232 A1 | 12/2024 | Rockwell et al. |
| 2024/0404233 A1 | 12/2024 | Boesel et al. |
| 2024/0411444 A1 | 12/2024 | Shutzberg et al. |
| 2024/0420435 A1 | 12/2024 | Gitter et al. |
| 2024/0428488 A1 | 12/2024 | Ren et al. |
| 2025/0005855 A1 | 1/2025 | Holder et al. |
| 2025/0005864 A1 | 1/2025 | Dessero et al. |
| 2025/0008057 A1 | 1/2025 | Chiu et al. |
| 2025/0013343 A1 | 1/2025 | Smith et al. |
| 2025/0013344 A1 | 1/2025 | Smith et al. |
| 2025/0024008 A1 | 1/2025 | Cerra et al. |
| 2025/0028423 A1 | 1/2025 | Dessero et al. |
| 2025/0029319 A1 | 1/2025 | Boesel et al. |
| 2025/0029328 A1 | 1/2025 | Smith et al. |
| 2025/0031002 A1 | 1/2025 | Hawkins et al. |
| 2025/0036253 A1 | 1/2025 | Stauber et al. |
| 2025/0036255 A1 | 1/2025 | Pastrana Vicente et al. |
| 2025/0069328 A1 | 2/2025 | Herscher et al. |
| 2025/0077060 A1 | 3/2025 | Becker et al. |
| 2025/0077066 A1 | 3/2025 | Lutter |
| 2025/0078420 A1 | 3/2025 | Dessero et al. |
| 2025/0078429 A1 | 3/2025 | Dascola et al. |
| 2025/0103132 A1 | 3/2025 | Rickwald et al. |
| 2025/0104335 A1 | 3/2025 | Huang et al. |
| 2025/0104367 A1 | 3/2025 | Huang et al. |
| 2025/0106581 A1 | 3/2025 | Lutter et al. |
| 2025/0106582 A1 | 3/2025 | Lutter et al. |
| 2025/0110605 A1 | 4/2025 | Huang et al. |
| 2025/0111472 A1 | 4/2025 | Lutter et al. |
| 2025/0111605 A1 | 4/2025 | Huang et al. |
| 2025/0111622 A1 | 4/2025 | Stern et al. |
| 2025/0111626 A1* | 4/2025 | Deliz Centeno ...... G06T 19/006 |
| 2025/0117079 A1 | 4/2025 | Chiu et al. |
| 2025/0118038 A1 | 4/2025 | Sorrentino et al. |
| 2025/0130707 A1 | 4/2025 | Stauber et al. |
| 2025/0156031 A1 | 5/2025 | Holder et al. |
| 2025/0157136 A1 | 5/2025 | Lindmeier et al. |
| 2025/0165069 A1* | 5/2025 | Calderone .............. G06F 3/011 |
| 2025/0199656 A1 | 6/2025 | Lipton et al. |
| 2025/0200901 A1 | 6/2025 | Ren et al. |
| 2025/0209744 A1 | 6/2025 | Piemonte et al. |
| 2025/0209753 A1 | 6/2025 | Piemonte et al. |
| 2025/0224811 A1 | 7/2025 | Lindmeier et al. |
| 2025/0232541 A1 | 7/2025 | Chand et al. |
| 2025/0245938 A1 | 7/2025 | Kim et al. |
| 2025/0258577 A1 | 8/2025 | Palangie et al. |
| 2025/0278134 A1 | 9/2025 | Pastrana Vicente et al. |
| 2025/0278166 A1 | 9/2025 | Mckenzie et al. |
| 2025/0278907 A1 | 9/2025 | Pazmino et al. |
| 2025/0284344 A1 | 9/2025 | Sundstrom et al. |
| 2025/0291470 A1 | 9/2025 | Hylak et al. |
| 2025/0306727 A1 | 10/2025 | Kawashima et al. |
| 2025/0322612 A1 | 10/2025 | Cerra et al. |
| 2025/0348186 A1 | 11/2025 | Krivoruchko |
| 2025/0350902 A1 | 11/2025 | Keatch et al. |
| 2025/0356596 A1 | 11/2025 | O'leary et al. |
| 2025/0377719 A1 | 12/2025 | Ravasz et al. |
| 2025/0377759 A1 | 12/2025 | Pazmino et al. |
| 2025/0377760 A1 | 12/2025 | Mckenzie et al. |
| 2025/0378595 A1 | 12/2025 | Ford et al. |
| 2025/0378629 A1 | 12/2025 | Ravasz et al. |
| 2025/0378645 A1 | 12/2025 | Holder et al. |

FOREIGN PATENT DOCUMENTS

| | | |
|---|---|---|
| CN | 102298493 A | 12/2011 |
| CN | 104714771 A | 6/2015 |
| CN | 104981681 A | 10/2015 |
| CN | 105264461 A | 1/2016 |
| CN | 105264478 A | 1/2016 |
| CN | 106990838 A | 7/2017 |
| CN | 108519818 A | 9/2018 |
| CN | 108563335 A | 9/2018 |
| CN | 108633307 A | 10/2018 |
| CN | 110413171 A | 11/2019 |
| CN | 110476142 A | 11/2019 |
| CN | 110543230 A | 12/2019 |
| CN | 110673718 A | 1/2020 |
| CN | 110830786 A | 2/2020 |
| CN | 111033572 A | 4/2020 |
| CN | 111213183 A | 5/2020 |
| CN | 111488056 A | 8/2020 |
| CN | 111580652 A | 8/2020 |
| CN | 111641843 A | 9/2020 |
| CN | 111913565 A | 11/2020 |
| CN | 112068757 A | 12/2020 |
| CN | 113168737 A | 7/2021 |

(56)          References Cited

FOREIGN PATENT DOCUMENTS

| CN | 114327026 A | 4/2022 |
|---|---|---|
| CN | 114546102 A | 5/2022 |
| CN | 109491508 B | 8/2022 |
| CN | 115309271 A | 11/2022 |
| CN | 116132905 A | 5/2023 |
| CN | 117043722 A | 11/2023 |
| CN | 117857981 A | 4/2024 |
| CN | 118102204 A | 5/2024 |
| DE | 102016125811 A1 | 11/2017 |
| DE | 102020101675 A1 | 7/2020 |
| DE | 102020128536 A1 | 5/2021 |
| EP | 0816983 A2 | 1/1998 |
| EP | 1530115 A2 | 5/2005 |
| EP | 1562021 A1 | 8/2005 |
| EP | 2393056 A1 | 12/2011 |
| EP | 2458486 A1 | 5/2012 |
| EP | 2551763 A1 | 1/2013 |
| EP | 2741175 A2 | 6/2014 |
| EP | 2893297 A1 | 7/2015 |
| EP | 2947545 A1 | 11/2015 |
| EP | 3088997 A1 | 11/2016 |
| EP | 3118722 A1 | 1/2017 |
| EP | 3249497 A1 | 11/2017 |
| EP | 3306444 A1 | 4/2018 |
| EP | 3316075 A1 | 5/2018 |
| EP | 3336805 A1 | 6/2018 |
| EP | 3451135 A1 | 3/2019 |
| EP | 3503101 A1 | 6/2019 |
| EP | 3506151 A1 | 7/2019 |
| EP | 3570144 A1 | 11/2019 |
| EP | 3588255 A1 | 1/2020 |
| EP | 3654147 A1 | 5/2020 |
| EP | 4155867 A1 | 3/2023 |
| EP | 3688726 B1 | 8/2023 |
| GB | 2540791 A | 2/2017 |
| JP | H06-4596 A | 1/1994 |
| JP | H10-51711 A | 2/1998 |
| JP | H10-78845 A | 3/1998 |
| JP | H11-289555 A | 10/1999 |
| JP | 2004-510239 A | 4/2004 |
| JP | 2005-215144 A | 8/2005 |
| JP | 2005-333524 A | 12/2005 |
| JP | 2006-4093 A | 1/2006 |
| JP | 2006-107048 A | 4/2006 |
| JP | 2006-146803 A | 6/2006 |
| JP | 2006-295236 A | 10/2006 |
| JP | 2011-203880 A | 10/2011 |
| JP | 2012-234550 A | 11/2012 |
| JP | 2013-178639 A | 9/2013 |
| JP | 2013-196158 A | 9/2013 |
| JP | 2013-254358 A | 12/2013 |
| JP | 2013-257716 A | 12/2013 |
| JP | 2014-21565 A | 2/2014 |
| JP | 2014-59840 A | 4/2014 |
| JP | 2014-71663 A | 4/2014 |
| JP | 2014-99184 A | 5/2014 |
| JP | 2014-514652 A | 6/2014 |
| JP | 2014-514653 A | 6/2014 |
| JP | 2015-56173 A | 3/2015 |
| JP | 2015-515040 A | 5/2015 |
| JP | 2015-118332 A | 6/2015 |
| JP | 2015-222565 A | 12/2015 |
| JP | 2016-96513 A | 5/2016 |
| JP | 2016-194744 A | 11/2016 |
| JP | 2017-27206 A | 2/2017 |
| JP | 2017-58528 A | 3/2017 |
| JP | 2017-126009 A | 7/2017 |
| JP | 2017-525002 A | 8/2017 |
| JP | 2017-531221 A | 10/2017 |
| JP | 2018-5516 A | 1/2018 |
| JP | 2018-5517 A | 1/2018 |
| JP | 2018-41477 A | 3/2018 |
| JP | 2018-514005 A | 5/2018 |
| JP | 2018-88118 A | 6/2018 |
| JP | 2018-101019 A | 6/2018 |
| JP | 2018-106499 A | 7/2018 |
| JP | 6438869 B2 | 12/2018 |
| JP | 2019-40333 A | 3/2019 |
| JP | 2019-515361 A | 6/2019 |
| JP | 2019-169154 A | 10/2019 |
| JP | 2019-175449 A | 10/2019 |
| JP | 2019-527881 A | 10/2019 |
| JP | 2019-532382 A | 11/2019 |
| JP | 2019536131 A | 12/2019 |
| JP | 2020-503595 A | 1/2020 |
| JP | 2020-86913 A | 6/2020 |
| JP | 2022-53334 A | 4/2022 |
| JP | 2022175629 A | 11/2022 |
| JP | 2023052278 A | 4/2023 |
| KR | 10-2011-0017236 A | 2/2011 |
| KR | 10-2011-0128487 A | 11/2011 |
| KR | 10-2013-0010012 A | 1/2013 |
| KR | 10-2014-0073730 A | 6/2014 |
| KR | 10-2014-0097654 A | 8/2014 |
| KR | 10-2016-0012139 A | 2/2016 |
| KR | 10-2017-0027240 A | 3/2017 |
| KR | 10-2018-0102171 A | 9/2018 |
| KR | 10-2019-0100957 A | 8/2019 |
| KR | 10-2020-0010296 A | 1/2020 |
| KR | 10-2020-0035103 A | 4/2020 |
| KR | 10-2020-0110788 A | 9/2020 |
| KR | 10-2020-0135496 A | 12/2020 |
| KR | 10-2020-0140378 A | 12/2020 |
| KR | 10-2021-0083016 A | 7/2021 |
| KR | 10-2021-0092614 A | 7/2021 |
| KR | 10-2021-0123530 A | 10/2021 |
| KR | 10-2022-0030177 A | 3/2022 |
| KR | 10-2025-0117234 A | 8/2025 |
| WO | 2010/026519 A1 | 3/2010 |
| WO | 2011/008638 A1 | 1/2011 |
| WO | 2012/145180 A1 | 10/2012 |
| WO | 2013/184447 A2 | 12/2013 |
| WO | 2014/190106 A1 | 11/2014 |
| WO | 2014/203301 A1 | 12/2014 |
| WO | 2015/130150 A1 | 9/2015 |
| WO | 2015/192117 A1 | 12/2015 |
| WO | 2015/195216 A1 | 12/2015 |
| WO | 2016/014877 A1 | 1/2016 |
| WO | 2016/118344 A1 | 7/2016 |
| WO | 2016/126522 A1 | 8/2016 |
| WO | 2017/024142 A1 | 2/2017 |
| WO | 2017/088487 A1 | 6/2017 |
| WO | 2018/005557 A1 | 1/2018 |
| WO | 2018/046957 A2 | 3/2018 |
| WO | 2018/090060 A1 | 5/2018 |
| WO | 2018/106299 A1 | 6/2018 |
| WO | 2018/116556 A1 | 6/2018 |
| WO | 2018/125428 A1 | 7/2018 |
| WO | 2018/175735 A1 | 9/2018 |
| WO | 2018/213801 A1 | 11/2018 |
| WO | 2018/224847 A2 | 12/2018 |
| WO | 2019/067902 A1 | 4/2019 |
| WO | 2019/074771 A1 | 4/2019 |
| WO | 2019/142560 A1 | 7/2019 |
| WO | 2019/152286 A2 | 8/2019 |
| WO | 2019/172678 A1 | 9/2019 |
| WO | 2019/213111 A1 | 11/2019 |
| WO | 2019/217163 A1 | 11/2019 |
| WO | 2020/066682 A1 | 4/2020 |
| WO | 2020/105349 A1 | 5/2020 |
| WO | 2020/121483 A1 | 6/2020 |
| WO | 2020/179027 A1 | 9/2020 |
| WO | 2020/247256 A1 | 12/2020 |
| WO | 2021/061349 A1 | 4/2021 |
| WO | 2021/061351 A1 | 4/2021 |
| WO | 2021/133053 A1 | 7/2021 |
| WO | 2021/173839 A1 | 9/2021 |
| WO | 2021/202783 A1 | 10/2021 |
| WO | 2021/203856 A1 | 10/2021 |
| WO | 2022/046340 A1 | 3/2022 |
| WO | 2022/055821 A1 | 3/2022 |
| WO | 2022/055822 A1 | 3/2022 |
| WO | 2022/066399 A1 | 3/2022 |
| WO | 2022/066535 A2 | 3/2022 |

(56)          References Cited

FOREIGN PATENT DOCUMENTS

| WO | 2022/067075 A1 | 3/2022 |
|----|----------------|--------|
| WO | 2022/067343 A2 | 3/2022 |
| WO | 2022/072187 A2 | 4/2022 |
| WO | 2022/146936 A1 | 7/2022 |
| WO | 2022/146938 A1 | 7/2022 |
| WO | 2022/147146 A1 | 7/2022 |
| WO | 2022/164881 A1 | 8/2022 |
| WO | 2022/192040 A1 | 9/2022 |
| WO | 2022/204664 A1 | 9/2022 |
| WO | 2022/208797 A1 | 10/2022 |
| WO | 2022/225795 A1 | 10/2022 |
| WO | 2023/043646 A1 | 3/2023 |
| WO | 2023/096940 A2 | 6/2023 |
| WO | 2023/141535 A1 | 7/2023 |
| WO | 2024/064036 A1 | 3/2024 |
| WO | 2024/064373 A1 | 3/2024 |
| WO | 2025/159543 A1 | 7/2025 |

OTHER PUBLICATIONS

International Search Report received for PCT Patent Application No. PCT/US2022/082379, mailed on May 30, 2023, 7 pages.
International Search Report received for PCT Patent Application No. PCT/US2023/019309, mailed on Sep. 1, 2023, 6 pages.
International Search Report received for PCT Patent Application No. PCT/US2023/074968, mailed on Feb. 26, 2024, 7 pages.
Notice of Allowance received for U.S. Appl. No. 18/429,294, mailed on Jun. 21, 2024, 10 pages.
Apple, "Use Continuity to Connect Your Mac, iPhone, iPad, and Apple Watch", Apple Support, Available online at <https://support.apple.com/en-us/HT204681>, [Retrieved from Internet on Dec. 23, 2022], 4 pages.
Didehkhorshid et al., "Text Input in Virtual Reality Using a Tracked Drawing Tablet", HCII 2020, LNCS 12428, 2020, pp. 314-329.
Edmiston et al., "Touch-Enabled Input Devices for Controlling Virtual Environments", 12th IFAC Symposium on Analysis, Design and Evaluation of Human-Machine Systems, Las Vegas, NV, USA, Aug. 11-15, 2013, pp. 349-356.
Metalnwood, "Using a Tablet for Touch Control, with VR Headset On. (Demo Vid)", Virtual Reality, ED Forums, Jun. 12, 2020, Available online at <https://forum.dcs.world/topic/237992-using-a-tablet-for-touch-control-with-vr-headset-on-demo-vid/>, [Retrieved from Internet on Jan. 2, 2024], 9 pages.
Wood, Tyriel, "The HoloLens 2 Tour!—Discovering a World of Holograms", YouTube [online]. YouTube, Mar. 23, 2021 [retrieved on Dec. 7, 2023], Retrieved from the Internet: <URL: https://www.youtube.com/watch?v=rMks7sMzPxl> 2 pages.
International Search Report received for PCT Patent Application No. PCT/US2023/074957, mailed on Jan. 30, 2024, 7 pages.
Corrected Notice of Allowability received for U.S. Appl. No. 18/146,234, mailed on Mar. 20, 2025, 2 Pages.
Corrected Notice of Allowability received for U.S. Appl. No. 18/146,234, mailed on Feb. 6, 2025, 2 pages.
Non-Final Office Action received for U.S. Appl. No. 18/304,290, mailed on Mar. 5, 2025, 111 Pages (Official Copy Only).
Notice of Allowance received for U.S. Appl. No. 18/146,234, mailed on Jan. 24, 2025, 12 pages.
Lin, et al., "Ubii: Physical World Interaction Through Augmented Reality", Publisher: IEEE, DOI:10.1109/TMC.2016.2567378, May 13, 2016, 14 pages.
Extended European Search Report received for European Patent Application No. 24171800.6, mailed on Sep. 5, 2024, 15 pages.
Extended European Search Report received for European Patent Application No. 24171804.8, mailed on Sep. 5, 2024, 13 pages.
International Search Report received for PCT Patent Application No. PCT/US2024/030661, mailed on Nov. 4, 2024, 5 pages.
Notice of Allowance received for U.S. Appl. No. 18/429,294, mailed on Oct. 31, 2024, 10 pages.
Notice of Allowance received for U.S. Appl. No. 18/429,301, mailed on Nov. 22, 2024, 8 pages.

Huang, et al., Proxy-Based Security Audit System for Remote Desktop Access, Computer Communications And Networks, ICCCN 2009. Proceedings of 18th International Conference On, IEEE, Piscataway, NJ, USA, Aug. 3, 2009, 5 pages.
Extended European Search Report received for European Patent Application No. 24158036.4, mailed on Jul. 18, 2024, 12 pages.
Non-Final Office Action received for U.S. Appl. No. 18/429,301, mailed on Jun. 12, 2024, 28 pages.
Your PC in VR, Virtual Desktop [online]. Virtual Desktop, Inc., 2023 [retrieved on Apr. 17, 2024]. Retrieved from the Internet: <URL: https://www.vrdesktop.net/>, 4 pages.
Sun et al., "MagicHand: Interact with IoT Devices in Augmented Reality Environment", 2019 IEEE Conference on Virtual Reality and 3D User Interfaces, Osaka, Japan, Mar. 23-27, 2019, [retrieved on Dec. 4, 2020], 6 pages.
Writtenhouse, Sandy, "How to Use Live View on Google Maps", Available online at <https://www.lifewire.com/use-live-view-google-maps-5323691>, [Retrieved from Internet on Jun. 27, 2024], Jul. 5, 2022, 6 pages.
Extended European Search Report received for European Patent Application No. 25179367.5, mailed on Jul. 1, 2025, 10 pages.
Extended European Search Report received for European Patent Application No. 25200319.9, mailed on Nov. 24, 2025, 10 pages.
Extended European Search Report received for European Patent Application No. 25169060.8, mailed on May 12, 2025, 10 pages.
Notice of Allowance received for U.S. Appl. No. 18/427,434, mailed on Sep. 17, 2025, 10 pages.
Extended European Search Report received for European Patent Application No. 25169059.0, mailed on May 12, 2025, 11 pages.
Extended European Search Report received for European Patent Application No. 25174955.2, mailed on Jun. 25, 2025, 12 pages.
Notice of Allowance received for U.S. Appl. No. 18/057,172, mailed on Jul. 15, 2025, 12 pages.
Non-Final Office Action received for U.S. Appl. No. 18/473,198, mailed on Jul. 15, 2025, 13 pages.
Non-Final Office Action received for U.S. Appl. No. 18/902,541, mailed on Nov. 28, 2025, 13 pages.
Notice of Allowance received for U.S. Appl. No. 18/174,403, mailed on Aug. 21, 2025, 13 pages.
Notice of Allowance received for U.S. Appl. No. 18/894,997, mailed on Aug. 12, 2025, 13 pages.
Non-Final Office Action received for U.S. Appl. No. 18/473,197, mailed on May 1, 2025, 14 pages.
Non-Final Office Action received for U.S. Appl. No. 18/896,227, mailed on May 29, 2025, 14 pages.
Notice of Allowance received for U.S. Appl. No. 18/322,469, mailed on Jul. 7, 2025, 14 pages.
Notice of Allowance received for U.S. Appl. No. 18/322,469, mailed on Mar. 19, 2025, 14 pages.
Notice of Allowance received for U.S. Appl. No. 18/473,184, mailed on Dec. 2, 2025, 14 pages.
Non-Final Office Action received for U.S. Appl. No. 18/473,187, mailed on May 16, 2025, 15 pages.
Non-Final Office Action received for U.S. Appl. No. 18/473,195, mailed on Jun. 27, 2025, 16 pages.
Non-Final Office Action received for U.S. Appl. No. 18/587,815, mailed on Sep. 25, 2025, 16 pages.
Final Office Action received for U.S. Appl. No. 18/473,195, mailed on Nov. 26, 2025, 17 pages.
Non-Final Office Action received for U.S. Appl. No. 18/473,242, mailed on Sep. 5, 2025, 17 pages.
Non-Final Office Action received for U.S. Appl. No. 18/472,073, mailed on Dec. 3, 2025, 18 pages.
Non-Final Office Action received for U.S. Appl. No. 18/473,190, mailed on Dec. 10, 2025, 18 pages.
Non-Final Office Action received for U.S. Appl. No. 18/916,583, mailed on Oct. 2, 2025, 18 pages.
Non-Final Office Action received for U.S. Appl. No. 18/467,523, mailed on Jun. 17, 2025, 19 pages.
Non-Final Office Action received for U.S. Appl. No. 18/471,729, mailed on Jun. 17, 2025, 19 pages.
Corrected Notice of Allowability received for U.S. Appl. No. 18/152,656, mailed on Jul. 22, 2025, 2 pages.

(56) References Cited

OTHER PUBLICATIONS

Corrected Notice of Allowability received for U.S. Appl. No. 18/157,040, mailed on Oct. 30, 2025, 2 pages.

Corrected Notice of Allowability received for U.S. Appl. No. 18/157,040, mailed on Sep. 25, 2025, 2 pages.

Corrected Notice of Allowability received for U.S. Appl. No. 18/473,180, mailed on Apr. 1, 2025, 2 pages.

Corrected Notice of Allowability received for U.S. Appl. No. 18/988,115, mailed on Jul. 15, 2025, 2 pages.

Corrected Notice of Allowance received for U.S. Appl. No. 18/424,644, mailed on Jun. 24, 2025, 2 pages.

Supplemental Notice of Allowability received for U.S. Appl. No. 18/473,261, mailed on Sep. 30, 2025, 2 pages.

Final Office Action received for U.S. Appl. No. 18/473,196, mailed on Jul. 16, 2025, 20 pages.

Final Office Action received for U.S. Appl. No. 18/518,340, mailed on Oct. 31, 2025, 20 pages.

Non-Final Office Action received for U.S. Appl. No. 17/905,483, mailed on Jul. 15, 2025, 20 pages.

Non-Final Office Action received for U.S. Appl. No. 18/515,191, mailed on Oct. 21, 2025, 20 pages.

Non-Final Office Action received for U.S. Appl. No. 18/518,340, mailed on Jul. 22, 2025, 20 pages.

Final Office Action received for U.S. Appl. No. 18/317,890, mailed on Sep. 3, 2025, 22 pages.

Non-Final Office Action received for U.S. Appl. No. 18/057,172, mailed on Mar. 14, 2025, 22 pages.

Non-Final Office Action received for U.S. Appl. No. 18/473,176, mailed on May 14, 2025, 23 pages.

Final Office Action received for U.S. Appl. No. 18/149,640, mailed on May 21, 2025, 24 pages.

Final Office Action received for U.S. Appl. No. 18/473,176, mailed on Dec. 3, 2025, 24 pages.

Non-Final Office Action received for U.S. Appl. No. 18/174,403, mailed on Mar. 20, 2025, 26 pages.

Non-Final Office Action received for U.S. Appl. No. 18/317,890, mailed on Apr. 17, 2025, 26 pages.

Non-Final Office Action received for U.S. Appl. No. 18/327,844, mailed on Mar. 24, 2025, 27 pages.

Final Office Action received for U.S. Appl. No. 17/933,020, mailed on May 21, 2025, 28 pages.

Non-Final Office Action received for U.S. Appl. No. 17/933,020, mailed on Oct. 1, 2025, 28 pages.

Non-Final Office Action received for U.S. Appl. No. 18/894,984, mailed on Nov. 28, 2025, 28 pages.

Non-Final Office Action received for U.S. Appl. No. 17/934,104, mailed on Nov. 14, 2025, 30 pages.

Final Office Action received for U.S. Appl. No. 18/298,994, mailed on Sep. 12, 2025, 32 pages.

Non-Final Office Action received for U.S. Appl. No. 18/317,886, mailed on Apr. 30, 2025, 34 pages.

Non-Final Office Action received for U.S. Appl. No. 18/473,260, mailed on Jun. 27, 2025, 35 pages.

Final Office Action received for U.S. Appl. No. 18/473,260, mailed on Oct. 22, 2025, 38 pages.

Non-Final Office Action received for U.S. Appl. No. 18/473,239, mailed on Sep. 10, 2025, 38 pages.

Non-Final Office Action received for U.S. Appl. No. 18/473,256, mailed on Nov. 4, 2025., 38 pages.

European Search Report received for European Patent Application No. 22723527.2, mailed on May 12, 2025, 4 pages.

International Search Report received for PCT Application No. PCT/US2025/028705, mailed on Aug. 5, 2025, 4 pages.

International Search Report received for PCT Patent Application No. PCT/US2023/074978, mailed on Apr. 4, 2024, 4 pages.

International Search Report received for PCT Patent Application No. PCT/US2024/012828, mailed on May 6, 2024, 4 pages.

International Search Report received for PCT Patent Application No. PCT/US2024/032109, mailed on Sep. 13, 2024, 4 pages.

International Search Report received for PCT Patent Application No. PCT/US2024/043470, mailed on Oct. 29, 2024, 4 pages.

International Search Report received for PCT Patent Application No. PCT/US2025/011189, mailed on Apr. 23, 2025, 4 pages.

Non-Final Office Action received for U.S. Appl. No. 17/202,034, mailed on Jun. 4, 2025, 40 pages.

Non-Final Office Action received for U.S. Appl. No. 18/473,184, mailed on Jul. 25, 2025, 40 pages.

Final Office Action received for U.S. Appl. No. 18/645,292, mailed on Jun. 2, 2025, 41 pages.

Non-Final Office Action received for U.S. Appl. No. 18/473,155, mailed on Jul. 10, 2025, 47 pages.

Search Report received for Chinese Patent Application No. 202210728190.3, mailed on Aug. 29, 2025, 5 pages (2 pages of English Translation and 3 pages of Official Copy Only).

Corrected Notice of Allowability received for U.S. Appl. No. 18/919,095, mailed on Nov. 12, 2025, 5 pages.

Notice of Allowance received for U.S. Appl. No. 18/988,115, mailed on Oct. 7, 2025, 5 pages.

International Search Report received for PCT Patent Application No. PCT/US2023/074960, mailed on Feb. 12, 2024, 6 pages.

International Search Report received for PCT Patent Application No. PCT/US2024/032153, mailed on Nov. 11, 2024, 6 pages.

International Search Report received for PCT Patent Application No. PCT/US2025/032533, mailed on Oct. 30, 2025, 6 pages.

Notice of Allowance received for U.S. Appl. No. 18/152,656, mailed on Jun. 25, 2025, 6 pages.

Notice of Allowance received for U.S. Appl. No. 18/424,644, mailed on Jun. 11, 2025, 6 pages.

Extended European Search Report received for European Patent Application No. 24221722.2, mailed on Apr. 17, 2025, 7 pages.

International Search Report received for PCT Patent Application No. PCT/US2023/074973, mailed on Mar. 7, 2024, 7 pages.

International Search Report received for PCT Patent Application No. PCT/US2025/032549, mailed on Oct. 23, 2025, 7 pages.

Notice of Allowance received for U.S. Appl. No. 18/153,943, mailed on Jun. 17, 2025, 7 pages.

Notice of Allowance received for U.S. Appl. No. 18/304,290, mailed on Aug. 20, 2025, 7 pages.

Notice of Allowance received for U.S. Appl. No. 18/471,729, mailed on Oct. 10, 2025, 7 pages.

Notice of Allowance received for U.S. Appl. No. 18/473,196, mailed on Dec. 2, 2025, 7 pages.

Notice of Allowance received for U.S. Appl. No. 18/988,115, mailed on Jun. 30, 2025, 7 pages.

Restriction Requirement received for U.S. Appl. No. 18/473,259, mailed on Oct. 30, 2025, 7 pages.

International Search Report received for PCT Patent Application No. PCT/US2025/029736, mailed on Nov. 6, 2025, 8 pages.

Non-Final Office Action received for U.S. Appl. No. 18/882,622, mailed on May 22, 2025, 8 pages.

Notice of Allowance received for U.S. Appl. No. 18/473,182, mailed on Apr. 23, 2025, 8 pages.

Notice of Allowance received for U.S. Appl. No. 18/473,182, mailed on Oct. 21, 2025, 8 pages.

Notice of Allowance received for U.S. Appl. No. 17/655,521, mailed on Apr. 16, 2025, 8 pages.

Notice of Allowance received for U.S. Appl. No. 18/473,179, mailed on Oct. 6, 2025, 8 pages.

Notice of Allowance received for U.S. Appl. No. 18/473,262, mailed on Oct. 7, 2025, 8 pages.

Notice of Allowance received for U.S. Appl. No. 18/645,292, mailed on Nov. 4, 2025, 8 pages.

Notice of Allowance received for U.S. Appl. No. 18/882,622, mailed on Aug. 27, 2025, 8 pages.

Notice of Allowance received for U.S. Appl. No. 18/896,227, mailed on Jul. 11, 2025, 8 pages.

Notice of Allowance received for U.S. Appl. No. 18/919,095, mailed on Jul. 22, 2025, 8 pages.

Notice of Allowance received for U.S. Appl. No. 18/919,095, mailed on Oct. 23, 2025, 8 pages.

International Search Report received for PCT Patent Application No. PCT/US2025/029209, mailed on Nov. 5, 2025, 9 pages.

(56) References Cited

OTHER PUBLICATIONS

Notice of Allowance received for U.S. Appl. No. 18/153,943, mailed on Oct. 7, 2025, 9 pages.

Notice of Allowance received for U.S. Appl. No. 18/157,040, mailed on Jun. 24, 2025, 9 pages.

Notice of Allowance received for U.S. Appl. No. 18/427,434, mailed on Apr. 17, 2025, 9 pages.

Notice of Allowance received for U.S. Appl. No. 18/471,850, mailed on Jun. 10, 2025, 9 pages.

Notice of Allowance received for U.S. Appl. No. 18/473,179, mailed on May 8, 2025, 9 pages.

Notice of Allowance received for U.S. Appl. No. 18/473,261, mailed on Sep. 23, 2025, 9 pages.

Notice of Allowance received for U.S. Appl. No. 18/473,262, mailed on Jun. 10, 2025, 9 pages.

Notice of Allowance received for U.S. Appl. No. 18/515,188, mailed on Mar. 20, 2025, 9 pages.

Adding Environments, Available online at: https://manual.keyshot.com/manual/environments/adding-environments/, [retrieved on Jun. 9, 2023], 2 pages.

Applicant-Initiated Interview Summary received for U.S. Appl. No. 18/119,219, mailed on May 21, 2024, 3 pages.

AquaSnap Window Manager: dock, snap, tile, organize [online], Nurgo Software, Available online at: <https://www.nurgo-software.com/products/aquasnap>, [retrieved on Jun. 27, 2023], 5 pages.

Area Light, Available online at: https://manual.keyshot.com/manual/materials/material-types/light-sources/area-light/, [retrieved on Jun. 9, 2023], 24 pages.

Artec Leo, Artec 3D [online], 2018 [retrieved on Apr. 25, 2024]. Retrieved from the Internet: <URL: https://artec3d.com/portable-3d-scanners/artec-leo>, 39 pages.

Artec Leo Full 3D Scanning Demo w/ Sample Data, Digitize Designs, LLC, Available online at: <https://www.youtube.com/watch?v=ecBKo_h3Pug>, [retrieved on Sep. 1, 2022], Feb. 22, 2019, 3 pages.

Common Menus in Microsoft Windows, Wikipedia, Sep. 15, 2019, Retrieved from the Internet: URL: https://en.wikipedia.org/w/index.php?title=Common_menus_in_Microsoft_Windows&oldid=921467305, 2 pages.

Corrected Notice of Allowability received for U.S. Appl. No. 17/448,875, mailed on Apr. 24, 2024, 4 pages.

Corrected Notice of Allowability received for U.S. Appl. No. 17/469,788, mailed on Feb. 12, 2025, 2 pages.

Corrected Notice of Allowability received for U.S. Appl. No. 17/479,791, mailed on May 19, 2023, 2 pages.

Corrected Notice of Allowability received for U.S. Appl. No. 17/659,147, mailed on Feb. 14, 2024, 6 pages.

Corrected Notice of Allowability received for U.S. Appl. No. 17/932,655, mailed on Oct. 12, 2023, 2 pages.

Corrected Notice of Allowability received for U.S. Appl. No. 17/932,999, mailed on Feb. 20, 2025, 2 pages.

Corrected Notice of Allowability received for U.S. Appl. No. 17/932,999, mailed on Jan. 23, 2025, 9 pages.

Corrected Notice of Allowability received for U.S. Appl. No. 17/935,095, mailed on Oct. 18, 2024, 3 pages.

Corrected Notice of Allowability received for U.S. Appl. No. 18/154,757, mailed on Aug. 30, 2024, 2 pages.

Corrected Notice of Allowability received for U.S. Appl. No. 18/174,337, mailed on Jan. 15, 2025, 2 pages.

Corrected Notice of Allowability received for U.S. Appl. No. 18/421,827, mailed on Aug. 29, 2024, 2 pages.

Corrected Notice of Allowability received for U.S. Appl. No. 18/463,739, mailed on Oct. 4, 2024, 2 pages.

Corrected Notice of Allowability received for U.S. Appl. No. 18/465,098, mailed on Mar. 13, 2024, 3 pages.

Corrected Notice of Allowance received for U.S. Appl. No. 17/407,675, mailed on Dec. 24, 2024, 2 pages.

Corrected Notice of Allowance received for U.S. Appl. No. 17/478,593, mailed on Dec. 21, 2022, 2 pages.

Corrected Notice of Allowance received for U.S. Appl. No. 18/119,219, mailed on Sep. 11, 2024, 2 pages.

Corrected Notice of Allowance received for U.S. Appl. No. 18/152,656, mailed on Dec. 20, 2024, 5 pages.

Curious Blocks Alternatives 12, progsoft [online]. Progsoft, Available Online at: <URL: https://progsoft.net/en/software/curious-blocks>, [retrieved on Apr. 25, 2024], 2024, 7 pages.

Drawing and Painting in VR by Using a Graphics Tablet as Virtual Paper, Reddit [online]. Reddit, Aug. 1, 2012. Available online at <https://www.reddit.com/r/oculus/comments/1wsdlv/drawing_and_painting_in_vr_by_using_a_graphics/>, [Retrieved from Internet on Nov. 18, 2025], 6 pages.

European Search Report received for European Patent Application No. 21791153.6, mailed on Mar. 22, 2024, 5 pages.

European Search Report received for European Patent Application No. 21801378.7, mailed on Jul. 10, 2024, 5 pages.

European Search Report received for European Patent Application No. 22703771.0, mailed on Feb. 26, 2025, 4 pages.

Ex Parte Quayle Action received for U.S. Appl. No. 17/655,347, mailed on Jul. 8, 2024, 6 pages.

Extended European Search Report received for European Patent Application No. 23158818.7, mailed on Jul. 3, 2023, 12 pages.

Extended European Search Report received for European Patent Application No. 23158929.2, mailed on Jun. 27, 2023, 12 pages.

Extended European Search Report received for European Patent Application No. 23197572.3, mailed on Feb. 19, 2024, 7 pages.

Extended European Search Report received for European Patent Application No. 24159868.9, mailed on Oct. 9, 2024, 13 pages.

Extended European Search Report received for European Patent Application No. 24178730.8, mailed on Oct. 14, 2024, 8 pages.

Extended European Search Report received for European Patent Application No. 24178752.2, mailed on Oct. 4, 2024, 8 pages.

Extended European Search Report received for European Patent Application No. 24179233.2, mailed on Oct. 2, 2024, 10 pages.

Extended European Search Report received for European Patent Application No. 24179830.5, mailed on Nov. 5, 2024, 11 pages.

Extended European Search Report received for European Patent Application No. 24190323.6, mailed on Dec. 12, 2024, 9 pages.

Extended European Search Report received for European Patent Application No. 24217335.9, mailed on Feb. 24, 2025, 8 pages.

Eye-supported target positioning in MRTK, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/EyeTracking/EyeTracking_Positioning.html>, 2 pages.

Feature Highlights, Available online at: https://manual.keyshot.com/manual/whats-new/feature-highlights/, [retrieved on Jun. 9, 2023], 28 pages.

Final Office Action received for U.S. Appl. No. 14/531,874, mailed on Nov. 4, 2016, 10 pages.

Final Office Action received for U.S. Appl. No. 15/644,639, mailed on Sep. 19, 2019, 12 pages.

Final Office Action received for U.S. Appl. No. 17/202,034, mailed on May 4, 2023, 41 pages.

Final Office Action received for U.S. Appl. No. 17/202,034, mailed on Nov. 4, 2024, 50 pages.

Final Office Action received for U.S. Appl. No. 17/407,675, mailed on May 22, 2024, 18 pages.

Final Office Action received for U.S. Appl. No. 17/448,875, mailed on Mar. 16, 2023, 24 pages.

Final Office Action received for U.S. Appl. No. 17/469,788, mailed on Nov. 16, 2023, 24 pages.

Final Office Action received for U.S. Appl. No. 17/580,495, mailed on Feb. 12, 2025, 29 pages.

Final Office Action received for U.S. Appl. No. 17/580,495, mailed on May 13, 2024, 29 pages.

Final Office Action received for U.S. Appl. No. 17/655,521, mailed on Apr. 10, 2024, 18 pages.

Final Office Action received for U.S. Appl. No. 17/659,147, mailed on Oct. 4, 2023, 17 pages.

Final Office Action received for U.S. Appl. No. 17/807,226, mailed on Nov. 30, 2023, 23 pages.

(56) References Cited

OTHER PUBLICATIONS

Final Office Action received for U.S. Appl. No. 17/812,965, mailed on Jan. 31, 2024, 9 pages.
Final Office Action received for U.S. Appl. No. 17/814,462, mailed on Nov. 1, 2024, 44 pages.
Final Office Action received for U.S. Appl. No. 17/816,314, mailed on Jan. 20, 2023, 11 pages.
Final Office Action received for U.S. Appl. No. 17/905,483, mailed on Jan. 8, 2025, 19 pages.
Final Office Action received for U.S. Appl. No. 17/934,104, mailed on Oct. 18, 2024, 28 pages.
Final Office Action received for U.S. Appl. No. 17/935,095, mailed on Dec. 29, 2023, 15 pages.
Final Office Action received for U.S. Appl. No. 18/157,040, mailed on Dec. 2, 2024, 25 pages.
Final Office Action received for U.S. Appl. No. 18/182,300, mailed on Feb. 16, 2024, 32 pages.
Final Office Action received for U.S. Appl. No. 18/182,300, mailed on Oct. 31, 2024, 34 pages.
Final Office Action received for U.S. Appl. No. 18/327,844, mailed on Nov. 29, 2024, 25 pages.
Final Office Action received for U.S. Appl. No. 18/375,280, mailed on Jul. 12, 2024, 19 pages.
Final Office Action received for U.S. Appl. No. 18/473,196, mailed on Dec. 6, 2024, 22 pages.
Home | Virtual Desktop [online], Virtual Desktop, Available online at: <https://www.vrdesktop.net>, [retrieved on Jun. 29, 2023], 4 pages.
International Search Report received for PCT Patent Application No. PCT/US2015/029727, mailed on Nov. 2, 2015, 6 pages.
International Search Report received for PCT Patent Application No. PCT/US2021/022413, mailed on Aug. 13, 2021, 7 pages.
International Search Report received for PCT Patent Application No. PCT/US2021/049520, mailed on Apr. 8, 2022, 8 pages.
International Search Report received for PCT Patent Application No. PCT/US2021/050948, mailed on Mar. 4, 2022, 6 pages.
International Search Report received for PCT Patent Application No. PCT/US2021/071518, mailed on Feb. 25, 2022, 7 pages.
International Search Report received for PCT Patent Application No. PCT/US2021/071595, mailed on Mar. 17, 2022, 7 pages.
International Search Report received for PCT Patent Application No. PCT/US2021/071596, mailed on Apr. 8, 2022, 7 pages.
International Search Report received for PCT Patent Application No. PCT/US2022/013208, mailed on Apr. 26, 2022, 7 pages.
International Search Report received for PCT Patent Application No. PCT/US2022/071208, mailed on Aug. 18, 2022, 9 pages.
International Search Report received for PCT Patent Application No. PCT/US2022/071228, mailed on Aug. 25, 2022, 6 pages.
International Search Report received for PCT Patent Application No. PCT/US2022/071704, mailed on Aug. 26, 2022, 6 pages.
International Search Report received for PCT Patent Application No. PCT/US2022/076603, mailed on Jan. 9, 2023, 4 pages.
International Search Report received for PCT Patent Application No. PCT/US2022/076608, mailed Feb. 24, 2023, 8 pages.
International Search Report received for PCT Patent Application No. PCT/US2022/076719, mailed on Mar. 3, 2023, 8 pages.
International Search Report received for PCT Patent Application No. PCT/US2022/076808, mailed on Mar. 28, 2023, 6 pages.
International Search Report received for PCT Patent Application No. PCT/US2022/076985, mailed on Feb. 20, 2023, 5 pages.
International Search Report received for PCT Patent Application No. PCT/US2023/018213, mailed on Jul. 26, 2023, 6 pages.
International Search Report received for PCT Patent Application No. PCT/US2023/060052, mailed on May 24, 2023, 6 pages.
International Search Report received for PCT Patent Application No. PCT/US2023/060429, mailed on Jun. 28, 2023, 7 pages.
International Search Report received for PCT Patent Application No. PCT/US2023/060592, mailed on Jun. 14, 2023, 7 pages.
International Search Report received for PCT Patent Application No. PCT/US2023/060943, mailed on Jun. 6, 2023, 7 pages.

International Search Report received for PCT Patent Application No. PCT/US2023/074257, mailed on Nov. 21, 2023, 5 pages.
International Search Report received for PCT Patent Application No. PCT/US2023/074793, mailed on Feb. 6, 2024, 6 pages.
International Search Report received for PCT Patent Application No. PCT/US2023/074950, mailed on Jan. 3, 2024, 7 pages.
International Search Report received for PCT Patent Application No. PCT/US2023/074955, mailed on Feb. 1, 2024, 6 pages.
International Search Report received for PCT Patent Application No. PCT/US2023/074962, mailed on Jan. 19, 2024, 9 pages.
International Search Report received for PCT Patent Application No. PCT/US2023/074979, mailed on Feb. 26, 2024, 6 pages.
International Search Report received for PCT Patent Application No. PCT/US2024/013602, mailed on Apr. 29, 2024, 4 pages.
International Search Report received for PCT Patent Application No. PCT/US2024/026102, mailed on Aug. 26, 2024, 5 pages.
International Search Report received for PCT Patent Application No. PCT/US2024/030107, mailed on Oct. 23, 2024, 9 pages.
International Search Report received for PCT Patent Application No. PCT/US2024/032140, mailed on Sep. 10, 2024, 4 pages.
International Search Report received for PCT Patent Application No. PCT/US2024/032314, mailed on Nov. 11, 2024, 6 pages.
International Search Report received for PCT Patent Application No. PCT/US2024/032423, mailed on Sep. 25, 2024, 5 pages.
International Search Report received for PCT Patent Application No. PCT/US2024/032451, mailed on Nov. 15, 2024, 6 pages.
International Search Report received for PCT Patent Application No. PCT/US2024/032455, mailed on Sep. 25, 2024, 4 pages.
International Search Report received for PCT Patent Application No. PCT/US2024/032456, mailed on Nov. 14, 2024, 6 pages.
International Search Report received for PCT Patent Application No. PCT/US2024/039190, mailed on Nov. 22, 2024, 5 pages.
International Search Report received for PCT Patent Application No. PCT/US2024/039204, mailed on Nov. 14, 2024, 4 pages.
Kitasenju Design, X [online], X Corp., Available Online at: <URL: https://twitter.com/kitasenjudesign/status/1282665402812608513>, [retrieved on Apr. 25, 2024], 2024, 1 page.
Letter Restarting Period for Response received for U.S. Appl. No. 15/644,639, mailed on Sep. 28, 2018, 8 pages.
Light Manager, Available online at: https://manual.keyshot.com/manual/lighting/lighting-manager/, [retrieved on Jun. 9, 2023], 3 pages.
MagicaVoxel 0.99.5 Review, YouTube [online], Google LLC, Available Online at: <URL: https://www.youtube.com/watch?v=WPPFnHQWwFk>, [retrieved on Apr. 25, 2024], 2024, 2 pages.
Non-Final Office Action received for U.S. Appl. No. 14/531,874, mailed on May 18, 2016, 11 pages.
Non-Final Office Action received for U.S. Appl. No. 15/644,639, mailed on Apr. 12, 2019, 11 pages.
Non-Final Office Action received for U.S. Appl. No. 15/644,639, mailed on Sep. 10, 2018, 9 pages.
Non-Final Office Action received for U.S. Appl. No. 16/881,599, mailed on Apr. 28, 2021, 8 pages.
Non-Final Office Action received for U.S. Appl. No. 17/123,000, mailed on Nov. 12, 2021, 8 pages.
Non-Final Office Action received for U.S. Appl. No. 17/202,034, mailed on Jan. 19, 2024, 44 pages.
Non-Final Office Action received for U.S. Appl. No. 17/202,034, mailed on Jul. 20, 2022, 38 pages.
Non-Final Office Action received for U.S. Appl. No. 17/407,675, mailed on Sep. 11, 2023, 16 pages.
Non-Final Office Action received for U.S. Appl. No. 17/448,875, mailed on Oct. 6, 2022, 25 pages.
Non-Final Office Action received for U.S. Appl. No. 17/448,875, mailed on Sep. 29, 2023, 30 pages.
Non-Final Office Action received for U.S. Appl. No. 17/469,788, mailed on Mar. 2, 2023, 22 pages.
Non-Final Office Action received for U.S. Appl. No. 17/469,788, mailed on Mar. 21, 2024, 24 pages.
Non-Final Office Action received for U.S. Appl. No. 17/479,791, mailed on May 11, 2022, 18 pages.
Non-Final Office Action received for U.S. Appl. No. 17/580,495, mailed on Aug. 15, 2024, 28 pages.

(56)     References Cited

OTHER PUBLICATIONS

Non-Final Office Action received for U.S. Appl. No. 17/580,495, mailed on Dec. 11, 2023, 27 pages.

Non-Final Office Action received for U.S. Appl. No. 17/655,521, mailed on Aug. 23, 2023, 13 pages.

Non-Final Office Action received for U.S. Appl. No. 17/655,521, mailed on Nov. 27, 2024, 17 pages.

Non-Final Office Action received for U.S. Appl. No. 17/659,147, mailed on Mar. 16, 2023, 19 pages.

Non-Final Office Action received for U.S. Appl. No. 17/807,226, mailed on Jun. 26, 2023, 21 pages.

Non-Final Office Action received for U.S. Appl. No. 17/812,965, mailed on Jun. 8, 2023, 8 pages.

Non-Final Office Action received for U.S. Appl. No. 17/814,455, mailed on Feb. 16, 2024, 24 pages.

Non-Final Office Action received for U.S. Appl. No. 17/814,462, mailed on Feb. 1, 2024, 30 pages.

Non-Final Office Action received for U.S. Appl. No. 17/816,314, mailed on Jul. 6, 2023, 10 pages.

Non-Final Office Action received for U.S. Appl. No. 17/816,314, mailed on Sep. 23, 2022, 10 pages.

Non-Final Office Action received for U.S. Appl. No. 17/905,483, mailed on Mar. 27, 2024, 16 pages.

Non-Final Office Action received for U.S. Appl. No. 17/932,655, mailed on Apr. 20, 2023, 10 pages.

Non-Final Office Action received for U.S. Appl. No. 17/932,999, mailed on Feb. 23, 2024, 22 pages.

Non-Final Office Action received for U.S. Appl. No. 17/933,020, mailed on Jan. 30, 2025, 26 pages.

Non-Final Office Action received for U.S. Appl. No. 17/934,104, mailed on Mar. 25, 2024, 26 pages.

Non-Final Office Action received for U.S. Appl. No. 17/935,095, mailed on Jun. 22, 2023, 15 pages.

Non-Final Office Action received for U.S. Appl. No. 18/119,219, mailed on Mar. 28, 2024, 15 pages.

Non-Final Office Action received for U.S. Appl. No. 18/149,640, mailed on Jan. 15, 2025, 17 pages.

Non-Final Office Action received for U.S. Appl. No. 18/153,943, mailed on Dec. 31, 2024, 33 pages.

Non-Final Office Action received for U.S. Appl. No. 18/154,697, mailed on Nov. 24, 2023, 10 pages.

Non-Final Office Action received for U.S. Appl. No. 18/157,040, mailed on May 2, 2024, 25 pages.

Non-Final Office Action received for U.S. Appl. No. 18/182,300, mailed on May 29, 2024, 33 pages.

Non-Final Office Action received for U.S. Appl. No. 18/182,300, mailed on Oct. 26, 2023, 29 pages.

Non-Final Office Action received for U.S. Appl. No. 18/298,994, mailed on Mar. 7, 2025, 26 pages.

Non-Final Office Action received for U.S. Appl. No. 18/317,893, mailed on Apr. 25, 2024, 18 pages.

Non-Final Office Action received for U.S. Appl. No. 18/322,469, mailed on Nov. 15, 2024, 34 pages.

Non-Final Office Action received for U.S. Appl. No. 18/327,844, mailed on May 17, 2024, 20 pages.

Non-Final Office Action received for U.S. Appl. No. 18/336,770, mailed on Jun. 5, 2024, 12 pages.

Non-Final Office Action received for U.S. Appl. No. 18/375,280, mailed on Nov. 27, 2024, 17 pages.

Non-Final Office Action received for U.S. Appl. No. 18/424,644, mailed on Jan. 29, 2025, 18 pages.

Non-Final Office Action received for U.S. Appl. No. 18/427,434, mailed on Nov. 21, 2024, 17 pages.

Non-Final Office Action received for U.S. Appl. No. 18/473,196, mailed on Aug. 16, 2024, 21 pages.

Non-Final Office Action received for U.S. Appl. No. 18/473,196, mailed on Feb. 28, 2025, 20 pages.

Non-Final Office Action received for U.S. Appl. No. 18/645,292, mailed on Feb. 21, 2025, 39 pages.

Non-Final Office Action received for U.S. Appl. No. 18/988,115, mailed on Feb. 24, 2025, 40 pages.

Notice of Allowability received for U.S. Appl. No. 17/812,965, mailed on Jan. 15, 2025, 3 pages.

Notice of Allowability received for U.S. Appl. No. 17/814,455, mailed on Jan. 13, 2025, 7 pages.

Notice of Allowance received for U.S. Appl. No. 17/407,675, mailed on Aug. 20, 2024, 7 pages.

Notice of Allowance received for U.S. Appl. No. 18/154,757, mailed on Aug. 26, 2024, 12 pages.

Notice of Allowance received for U.S. Appl. No. 14/531,874, mailed on Mar. 28, 2017, 9 pages.

Notice of Allowance received for U.S. Appl. No. 15/644,639, mailed on Jan. 16, 2020, 16 pages.

Notice of Allowance received for U.S. Appl. No. 16/881,599, mailed on Dec. 17, 2021, 7 pages.

Notice of Allowance received for U.S. Appl. No. 17/123,000, mailed on May 27, 2022, 8 pages.

Notice of Allowance received for U.S. Appl. No. 17/123,000, mailed on Sep. 19, 2022, 7 pages.

Notice of Allowance received for U.S. Appl. No. 17/407,675, mailed on Dec. 11, 2024, 8 pages.

Notice of Allowance received for U.S. Appl. No. 17/448,875, mailed on Apr. 17, 2024, 8 pages.

Notice of Allowance received for U.S. Appl. No. 17/448,875, mailed on Jul. 12, 2024, 8 pages.

Notice of Allowance received for U.S. Appl. No. 17/448,876, mailed on Apr. 7, 2022, 9 pages.

Notice of Allowance received for U.S. Appl. No. 17/448,876, mailed on Jul. 20, 2022, 8 pages.

Notice of Allowance received for U.S. Appl. No. 17/469,788, mailed on Feb. 5, 2025, 5 pages.

Notice of Allowance received for U.S. Appl. No. 17/469,788, mailed on Oct. 15, 2024, 7 pages.

Notice of Allowance received for U.S. Appl. No. 17/478,593, mailed on Aug. 31, 2022, 10 pages.

Notice of Allowance received for U.S. Appl. No. 17/479,791, mailed on Mar. 13, 2023, 9 pages.

Notice of Allowance received for U.S. Appl. No. 17/479,791, mailed on Nov. 17, 2022, 9 pages.

Notice of Allowance received for U.S. Appl. No. 17/580,495, mailed on Jun. 6, 2023, 6 pages.

Notice of Allowance received for U.S. Appl. No. 17/580,495, mailed on Nov. 30, 2022, 12 pages.

Notice of Allowance received for U.S. Appl. No. 17/650,775, mailed on Jan. 25, 2024, 10 pages.

Notice of Allowance received for U.S. Appl. No. 17/650,775, mailed on Sep. 18, 2023, 10 pages.

Notice of Allowance received for U.S. Appl. No. 17/655,347, mailed on Feb. 20, 2025, 7 pages.

Notice of Allowance received for U.S. Appl. No. 17/655,347, mailed on Oct. 9, 2024, 7 pages.

Notice of Allowance received for U.S. Appl. No. 17/659,147, mailed on Jan. 26, 2024, 13 pages.

Notice of Allowance received for U.S. Appl. No. 17/659,147, mailed on May 29, 2024, 13 pages.

Notice of Allowance received for U.S. Appl. No. 17/807,226, mailed on Jul. 3, 2024, 9 pages.

Notice of Allowance received for U.S. Appl. No. 17/807,236, mailed on Feb. 5, 2024, 13 pages.

Notice of Allowance received for U.S. Appl. No. 17/807,236, mailed on Jul. 10, 2024, 9 pages.

Notice of Allowance received for U.S. Appl. No. 17/812,965, mailed on Jul. 26, 2024, 6 pages.

Notice of Allowance received for U.S. Appl. No. 17/812,965, mailed on Nov. 15, 2024, 6 pages.

Notice of Allowance received for U.S. Appl. No. 17/814,455, mailed on Oct. 7, 2024, 10 pages.

Notice of Allowance received for U.S. Appl. No. 17/814,462, mailed on Feb. 26, 2025, 8 pages.

Notice of Allowance received for U.S. Appl. No. 17/816,314, mailed on Jan. 4, 2024, 6 pages.

(56)        References Cited

OTHER PUBLICATIONS

Notice of Allowance received for U.S. Appl. No. 17/932,655, mailed on Jan. 24, 2024, 7 pages.

Notice of Allowance received for U.S. Appl. No. 17/932,655, mailed on Sep. 29, 2023, 7 pages.

Notice of Allowance received for U.S. Appl. No. 17/932,999, mailed on Sep. 12, 2024, 9 pages.

Notice of Allowance received for U.S. Appl. No. 17/933,707, mailed on Jun. 28, 2024, 8 pages.

Notice of Allowance received for U.S. Appl. No. 17/933,707, mailed on Mar. 6, 2024, 9 pages.

Notice of Allowance received for U.S. Appl. No. 17/935,095, mailed on Jul. 3, 2024, 9 pages.

Notice of Allowance received for U.S. Appl. No. 18/119,219, mailed on Jul. 22, 2024, 7 pages.

Notice of Allowance received for U.S. Appl. No. 18/152,656, mailed on Dec. 17, 2024, 12 pages.

Notice of Allowance received for U.S. Appl. No. 18/154,697, mailed on Aug. 6, 2024, 8 pages.

Notice of Allowance received for U.S. Appl. No. 18/154,697, mailed on Dec. 3, 2024, 7 pages.

Notice of Allowance received for U.S. Appl. No. 18/154,757, mailed on Jan. 23, 2024, 10 pages.

Notice of Allowance received for U.S. Appl. No. 18/154,757, mailed on Jan. 23, 2025, 12 pages.

Notice of Allowance received for U.S. Appl. No. 18/154,757, mailed on May 10, 2024, 12 pages.

Notice of Allowance received for U.S. Appl. No. 18/174,337, mailed on Jan. 2, 2025, 8 pages.

Notice of Allowance received for U.S. Appl. No. 18/182,304, mailed on Jan. 24, 2024, 9 pages.

Notice of Allowance received for U.S. Appl. No. 18/182,304, mailed on Oct. 2, 2023, 9 pages.

Notice of Allowance received for U.S. Appl. No. 18/317,893, mailed on Jan. 13, 2025, 11 pages.

Notice of Allowance received for U.S. Appl. No. 18/317,893, mailed on Mar. 6, 2024, 8 pages.

Notice of Allowance received for U.S. Appl. No. 18/317,893, mailed on Nov. 22, 2023, 9 pages.

Notice of Allowance received for U.S. Appl. No. 18/336,770, mailed on Nov. 29, 2024, 9 pages.

Notice of Allowance received for U.S. Appl. No. 18/421,675, mailed on Apr. 11, 2024, 9 pages.

Notice of Allowance received for U.S. Appl. No. 18/421,675, mailed on Jul. 31, 2024, 8 pages.

Notice of Allowance received for U.S. Appl. No. 18/421,827, mailed on Aug. 14, 2024, 10 pages.

Notice of Allowance received for U.S. Appl. No. 18/423,187, mailed on Jun. 5, 2024, 9 pages.

Notice of Allowance received for U.S. Appl. No. 18/463,739, mailed on Feb. 1, 2024, 10 pages.

Notice of Allowance received for U.S. Appl. No. 18/463,739, mailed on Jun. 17, 2024, 9 pages.

Notice of Allowance received for U.S. Appl. No. 18/463,739, mailed on Oct. 30, 2023, 11 pages.

Notice of Allowance received for U.S. Appl. No. 18/465,098, mailed on Jun. 20, 2024, 8 pages.

Notice of Allowance received for U.S. Appl. No. 18/465,098, mailed on Mar. 4, 2024, 6 pages.

Notice of Allowance received for U.S. Appl. No. 18/465,098, mailed on Nov. 17, 2023, 8 pages.

Notice of Allowance received for U.S. Appl. No. 18/473,180, mailed on Aug. 22, 2024, 13 pages.

Notice of Allowance received for U.S. Appl. No. 18/473,180, mailed on Jan. 2, 2025, 12 pages.

Notice of Allowance received for U.S. Appl. No. 18/515,188, mailed on Nov. 27, 2024, 9 pages.

Notice of Allowance received for U.S. Appl. No. 18/668,032, mailed on Jan. 16, 2025, 9 pages.

Notice of Allowance received for U.S. Appl. No. 18/671,936, mailed on Jan. 15, 2025, 9 pages.

Notice of Allowance received for U.S. Appl. No. 18/671,936, mailed on Mar. 5, 2025, 7 pages.

Open Source Voxel Editor for Windows, Mac, Linux, iOS, and Android, Goxel [online]. Goxel by Guillaume Chereau, Available Online at: <URL: https://goxel.xyz/>, [retrieved on Apr. 25, 2024], 2024, 3 pages.

POP 2 3D Scanner (Infrared Light I Precision 0.05mm), Revpoint [online]. Revopoint 3D, <URL: https://global.revopoint3d.com/products/face-3d-scanner-pop2 ?_ ga=2.182721893.277596832. 1650264227-586470518.1640327512&ref=dh0L07OOzRuqo&utm_campaign=pop2_banner&utm_medium=referral&utm_source=Official_Website>, [retrieved on Apr. 25, 2024], 2014, 16 pages.

Restriction Requirement received for U.S. Appl. No. 17/905,483, mailed on Dec. 7, 2023, 7 pages.

Restriction Requirement received for U.S. Appl. No. 17/932,999, mailed on Oct. 3, 2023, 6 pages.

Restriction Requirement received for U.S. Appl. No. 18/473,187, mailed on Dec. 30, 2024, 5 pages.

Search Report received for Chinese Patent Application No. 202310873465.7, mailed on Feb. 1, 2024, 5 pages (2 pages of English Translation and 3 pages of Official Copy).

Search Report received for United Kingdom Patent Application No. GB2210885.6, mailed on Jan. 27, 2023, 1 page.

Sharevox, Phoria [online]. Phoria Pty Ltd, Available Online at: <URL: https://www.phoria.com.au/projects/sharevox/>, [retrieved on Apr. 25, 2024], 2024, 2 pages.

Sliders, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/README_Sliders.html>, 3 pages.

Spatial Audio Head Tracking on Apple Tv Automatically Resets when You Get Up from the Couc . . . , AppleInsider [online]. Jun. 10, 2021 [retrieved on Dec. 20, 2024]. Retrieved from the Internet: <https://forums.appleinsider.com/discussion/222259/spatial-audio-head-tracking-on-apple-tv-automatically-resets-when-you-get-up-from-the-couc>, 2024, 6 pages.

Supplemental Notice of Allowability received for U.S. Appl. No. 18/317,893, mailed on Jan. 29, 2025, 3 pages.

Supplemental Notice of Allowance received for U.S. Appl. No. 14/531,874, mailed on Jul. 26, 2017, 5 pages.

Supplemental Notice of Allowance received for U.S. Appl. No. 18/515,188, mailed on Dec. 12, 2024, 2 pages.

VoxEdit Beta Tutorial—Introduction and How To Animate Voxel Creations, YouTube [online], Google LLC, Available Online at: <URL: https://www.youtube.com/watch?v=fqcArJWtyqM>, [retrieved on Apr. 25, 2024], 2024, 2 pages.

Voxel World Lens, Snapchat [online]. Snapchat Inc., Available Online at: <URL: https://www.snapchat.com/lens/689751dd6a7d446280d903d15d79f104?locale=en-US>, [retrieved on Apr. 25, 2024], 2024, 1 page.

Voxelize, Rossiev [online]. Denis Rossiev 2018-2024, Available Online at: <URL: https://www.rossiev.pro/voxelize/>, [retrieved on Apr. 25, 2024], 2024, 16 pages.

VR Design Best Practices, LeapMotion, Aug. 29, 2015, 31 pages.

You Can Bring Your Real Phone With You Into VR!, YouTube [online]. YouTube, Mar. 28, 2023. Available online at <https://www.youtube.com/watch?v=2niOsrGVUq8>, [Retrieved from Internet on Nov. 18, 2025], 2 pages.

Coloring a Point Cloud Using 3DF Zephyr Pro, Wayback Machine, https://web.archive.org/web/20170522233043/http://www.3dflow.net:80/technology/documents/3df-zephyr-tutorials/point-cloud-coloring-using-3df-zephyr/, May 22, 2017, 1 page.

Apple, "Use Message Effects with iMessage on Your iPhone, iPad, and iPod Touch", Apple Support, Available online at: <https://support.apple.com/en-us/HT206894>, [retrieved on Feb. 22, 2024], 5 pages.

Banta et al., "A Next-Best-View System for Autonomous 3-D Object Reconstruction", IEEE Transactions on Systems, Man, and Cybernetics—Part A: Systems and Humans vol. 30, No. 5, Sep. 30, 2000, pp. 589-598.

(56)            References Cited

OTHER PUBLICATIONS

Berard Francois, "A Study on Two-Dimensional Scrolling with Head Motion", CLIPS-IMAG Technical Report. France, Ref: <TR-IMAG-CLIPS-IHM-199901>, Retrieved from: <http://iihm.imag.fr/publs/1999/TR199901_PWindowRate.pdf>, Retrieved on Dec. 26, 2024, Jan. 8, 1999, 7 pages.

Bermejo et al., "Exploring Button Designs for Mid-air Interaction in Virtual Reality: A Hexa-metric Evaluation of Key Representations and Multi-modal Cues", Proceedings of the ACM on Human-Computer Interaction, vol. 5, No. EICS, Article 194, May 27, 2021, 26 pages.

Bhowmick Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.

Bohn Dieter, "Rebooting WebOS: How LG Rethought The Smart TV", The Verge, Available online at: <http://www.theverge.com/2014/1/6/5279220/rebooting-webos-how-lg-rethought-the-smart-tv>, [Retrieved Aug. 26, 2019], Jan. 6, 2014, 5 pages.

Bolt et al., "Two-Handed Gesture in Multi-Modal Natural Dialog", Uist '92, 5th Annual Symposium on User Interface Software And Technology. Proceedings Of the ACM Symposium on User Interface Software And Technology, Monterey, Nov. 15-18, 1992, pp. 7-14.

Brennan Dominic, "4 Virtual Reality Desktops for Vive, Rift, and Windows VR Compared", [online]. Road to VR, Available online at: <https://www.roadtovr.com/virtual-reality-desktop-compared-oculus-rift-htc-vive/>, [retrieved on Jun. 29, 2023], Jan. 3, 2018, 4 pages.

Capturing Reality, "Data Sheet RealityCapture Tarasque 1.2", Wayback Machine, https://web.archive.org/web/20220327110303/https://www.capturingreality.com/assets/Documents/datasheet_TARASQUE_1.2.pdf, Mar. 27, 2022, 5 pages.

Capturing Reality, "RealityCapture tutorial: Complete model in PPI", Youtube, https://www.youtube.com/watch?v=tw6wNNEbH_M, Oct. 14, 2021, 2 pages.

Cas and Chary XR, "Oculus Go & Your Phone As 2nd Controller !!—An Inexpensive Way To Play PC VR Games", posted on Mar. 8, 2019, https://www.youtube.com/watch?v=i_iRVa0kemw, 2019, 4 pages.

Chatterjee et al., "Gaze+Gesture: Expressive, Precise and Targeted Free-Space Interactions", ICMI '15, Nov. 9-13, 2015, 8 pages.

Choe et al., "Augmented-Reality-Based 3D Emotional Messenger for Dynamic User Communication with Smart Devices", Electronics, vol. 9, No. 1127, Jul. 10, 2020, 15 pages.

Cybersence, "Leap Motion—Virtual Wearables", YouTube, Mar. 26, 2018, Retrieved from the Internet: URL: https://www.youtube.com/watch?v=j81-Y60q-zl, 2 pages.

Dhakal et al., "SLAM-Share: Visual Simultaneous Localization and Mapping for Real-time Multi-user Augmented Reality", Nov. 30, 2022. CoNEXT '22: Proceedings of the 18th International Conference on emerging Networking EXperiments and Technologies, Dec. 6-9, 2022, Roma, Italy, pp. 293-306. Retrieved from <https://doi.org/10.1145/3555050.3569142>, 14 pages.

Dudley et al., "Fast and Precise Touch-Based Text Entry for Head-Mounted Augmented Reality with Variable Occlusion", ACM Transactions on Computer-Human Interaction (TOCHI), vol. 25, No. 6, Article 30, Dec. 13, 2018, 40 pages.

Fatima et al., "Eye Movement Based Human Computer Interaction", 3rd International Conference On Recent Advances In Information Technology (RAIT), Mar. 3, 2016, pp. 489-494.

Gamedbharat,"I Want to Rotate a Object on Double Tap, Can Any One Help Me With This?", posted on Jul. 26, 2017, https://discussions.unity.com/t/i-want-to-rotate-a-object-on-double-tap-can-any-one-help-me-with-this/192010, 2017, 3 pages.

Ghosh et al., "NotifiVIR: Exploring Interruptions and Notifications in Virtual Reality", IEEE transactions on visualization and computer graphics, vol. 24, No. 4, Apr. 2018, pp. 1447-1456.

Grey Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.

Headmaster Introduction, "If You Can Move Your Head, You Can Move Your World", Retrieved from: <https://www.microsoft.com/buxtoncollection/a/pdf/HeadMaster%20Introduction.pdf>, Retrieved on Dec. 26, 2024, 4 pages.

Jones et al., "The Future of Virtual Museums: On-Line, Immersive, 3D Environments", ProQuest (Technology Collection Database, Dissertations and Theses Database): Technical Literature Search, Jul. 26, 2002, 12 pages.

Kim et al., "Pseudo-haptic Button for Improving User Experience of Mid-air Interaction in VR", International Journal of Human-Computer Studies, vol. 168, No. 102907, Aug. 9, 2022, 11 pages.

Kim et al., "Virtual Object Sizes for Efficient and Convenient Mid-air Manipulation", The Visual Computer, vol. 38, No. 9, Jul. 1, 2022, pp. 3463-3474.

Lachambre et al., "Unity Photogrammetry Workflow", https://unity3d.com/files/solutions/photogrammetry/Unity-Photogrammetry-Workflow_2017-07_v2.pdf, Jun. 23, 2017, pp. 55-64.

Lang, "Leap Motion 'Virtual Wearable' AR Prototype is a Potent Glimpse at the Future of Your Smartphone", Mar. 24, 2018, Retrieved from the Internet: URL: https://www.roadtovr.com/leap-motion-virtual-wearable-ar-prototype-glimpse-of-future-smartphone/, [retrieved on Sep. 1, 2020], 6 pages.

Lee et al., "UbiPoint: Towards Non-intrusive Mid-Air Interaction for Hardware Constrained Smart Glasses", In Proceedings of the 11th ACM Multimedia Systems Conference, May 27, 2020, pp. 190-201.

Lin et al., "Towards Naturally Grabbing and Moving Objects in VR", IS&T International Symposium on Electronic Imaging and The Engineering Reality of Virtual Reality, 2016, 6 pages.

Locher et al., "Mobile Phone and Cloud—a Dream Team for 3D Reconstruction", 2016 IEEE Winter Conference on Applications of Computer Vision (WACV), 2016, pp. 1-8.

Lor Cas, "Reality Capture: Exporting Mesh", Youtube, https://www.youtube.com/watch?v=PdvTRa2B_s0, Dec. 10, 2020, 2 pages.

Macmostvideo, "A Beginner's Guide to Selecting Items On Your Mac (#1566)", Bibliographic Information, Jan. 4, 2018, Retrieved from <URL:https://www.youtube.com/watch?v=a6MDAuh7M0Q&ab_channel=macmostvideo/>, [retrieved on Feb. 19, 2025], Most relevant passage of the video is 00:10 to 00:30, 2 pages.

Mcgill et al., "Expanding The Bounds Of Seated Virtual Workspaces", University of Glasgow, Available online at: <https://core.ac.uk/download/pdf/323988271.pdf>, [retrieved on Jun. 27, 2023], Jun. 5, 2020, 44 pages.

Medeiros et al., "Promoting Reality Awareness in Virtual Reality through Proxemics", IEEE Virtual Reality and 3D User Interfaces (VR), Mar. 27-Apr. 1, 2021, 11 pages.

Mendes et al., "Mid-Air Interactions Above Stereoscopic Interactive Tables", IEEE Symposium on 3D User Interfaces (3DUI), Mar. 29-30, 2014, pp. 3-10.

Nunez Angulo et al., "Manual for the Design of Didactic Units in Augmented Reality Using the Cospaces EDU Application", 2020, 75 pages.

Pfeuffer et al., "Gaze + Pinch Interaction in Virtual Reality", In Proceedings of SUI '17, Brighton, United Kingdom, Oct. 16-17, 2017, pp. 99-108.

Pfeuffer et al., "Gaze and Touch Interaction on Tablets", UIST '16, Tokyo, Japan, ACM, Oct. 16-19, 2016, pp. 301-311.

Pfeuffer et al., "Gaze+touch vs. Touch: What's the Trade-off When Using Gaze to Extend Touch to Remote Displays?", Advances In Databases And Information Systems, Aug. 30, 2015, pp. 349-367.

Process a 3D Scan With Projection in Reality Capture (RC), Wayback Machine, https://web.archive.org/web/20200116135047/http:/www.pi3dscan.com/index.php/instructions/item/process-a-3d-scan-with-projection-in-reality-capture-rc, Jan. 16, 2020, 1 page.

Qi et al., "PointNet++: Deep Hierarchical Feature Learning on Point Sets in a Metric Space", Stanford University, Jun. 7, 2017, 14 pages.

Ran et al., "Multi-User Augmented Reality with Communication Efficient and Spatially Consistent Virtual Objects", Nov. 24, 2020. CoNEXT '20: Proceedings of the 16th International Conference on

(56)         References Cited

OTHER PUBLICATIONS emerging Networking Experiments and Technologies, Dec. 1-4, 2020, Barcelona, Spain, pp. 386-398. Retrieved from <https://doi.org/10.1145/3386367.3431312>, 13 pages.

Ro et al., "AR Pointer: Advanced Ray-Casting Interface Using Laser Pointer Metaphor for Object Manipulation in 3D Augmented Reality Environment", Applied Sciences, vol. 9, No. 3078, [retrieved on Jul. 27, 2020], Jul. 30, 2019, 18 pages.

Schenk et al., "SPOCK: A Smooth Pursuit Oculomotor Control Kit", CHI'16 Extended Abstracts, San Jose, CA, USA, ACM, May 7-12, 2016, pp. 2681-2687.

Schubert Martin, "Design Sprints at Leap Motion: A Playground of 3D User Interfaces", Ultraleap For Developers [online]. Nov. 8, 2017 [retrieved on Mar. 21, 2025]. Retrieved from the Internet: <URL: https://blog.leapmotion.com/design-playground-3d-user-interfaces/>, 17 pages.

Schuetz Markus, "Interactive Exploration of Point Clouds", Technische Universitat Wien, reposiTUm, https://doi.org/10.34726/hss.2021. 91668, Mar. 8, 2021, 119 pages.

Slambekova Dana, "Gaze and Gesture Based Object Interaction in Virtual World", [retrieved on Dec. 17, 2015]. Retrieved from the Internet: <URL:https://www.cs.rit.edu/~dxs4659/Report.pdf>, May 31, 2012, 54 pages.

Speicher et al., "Pseudo-haptic Controls for Mid-air Finger-based Menu Interaction", CHI'19 Extended Abstracts, May 4-9, 2019, Conference on Human Factors in Computing Systems, May 2, 2019, pp. 1-6.

Strand Robin, "Surface Skeletons in Grids With Non-cubic Voxels", 2004 IEEE Xplore, Available Online at: <DOI: 10.1109/ICPR.2004. 1334195>, Sep. 2004, 5 pages.

Tolle et al., "Design of Head Movement Controller System (HEMOCS) for Control Mobile Application through Head Pose Movement Detection", Retrieved from:<https://www.google.com/url?sa=t &source=web&rct=j&opi=89978449&url=https://online-journals. org/index.php/i-jim/article/download/5552/4029/19224&ved= 2ahUKEwj-w86vga-HAxUJJDQIHYMNDNw4HhAWegQILhAB &usg=AOwVaw3HR1t7v8Rx7osc1lp0UfOh>, DOI: <httpdx.doi. org/10.3991/ijim.v10i3.5552>, Retrieved on Dec. 26, 2024, 2016, 5 pages.

Simple Modal Window With Background Blur Effect, Available online at: <http://web.archive.org/web/20160313233427/https:// www.cssscript.com/simple-modal-window-with-background-blur-effect/>, Mar. 13, 2016, 5 pages.

Yamada Yoshihiro, "How to Generate a Modal Window with ModalPopup Control", Available online at: <http://web.archive.org/ web/20210920015801/https://atmarkit.itmedia.co.jp/fdotnet/dotnettips/ 580aspajaxmodalpopup/aspajaxmodalpopup.html > [Search Date Aug. 22, 2023], Sep. 20, 2021, 8 pages (1 page of English Abstract and 7 pages of Official Copy).

Yue et al., "Optimal Region Selection for Stereoscopic Video Subtitle Insertion", IEEE Transactions on Circuits and Systems for Video Technology, vol. 28, No. 11, Nov. 2018, 13 pages.

Zhuang et al., "Distributed Architecture for 3D Graphics Rendering in Collaborative System", Computer and Modernization, Issue 4, 2017, 5 pages (1 page of English Abstract and 4 pages of Official Copy). date unknown.

Notice of Allowance received for U.S. Appl. No. 18/473,179, mailed on Feb. 25, 2026, 9 pages.

* cited by examiner

System
200

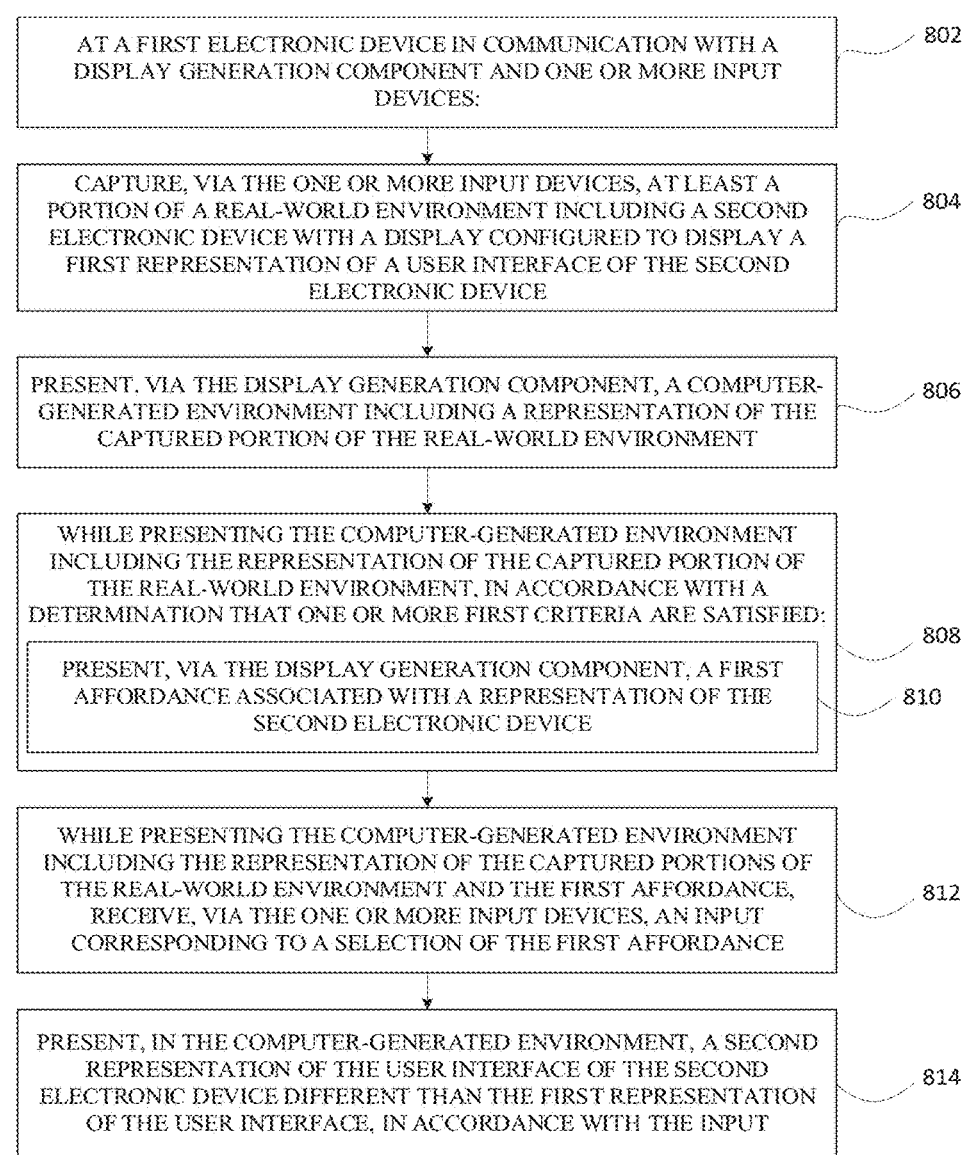

800

AT A FIRST ELECTRONIC DEVICE IN COMMUNICATION WITH A DISPLAY GENERATION COMPONENT AND ONE OR MORE INPUT DEVICES: — 802

CAPTURE, VIA THE ONE OR MORE INPUT DEVICES, AT LEAST A PORTION OF A REAL-WORLD ENVIRONMENT INCLUDING A SECOND ELECTRONIC DEVICE WITH A DISPLAY CONFIGURED TO DISPLAY A FIRST REPRESENTATION OF A USER INTERFACE OF THE SECOND ELECTRONIC DEVICE — 804

PRESENT, VIA THE DISPLAY GENERATION COMPONENT, A COMPUTER-GENERATED ENVIRONMENT INCLUDING A REPRESENTATION OF THE CAPTURED PORTION OF THE REAL-WORLD ENVIRONMENT — 806

WHILE PRESENTING THE COMPUTER-GENERATED ENVIRONMENT INCLUDING THE REPRESENTATION OF THE CAPTURED PORTION OF THE REAL-WORLD ENVIRONMENT, IN ACCORDANCE WITH A DETERMINATION THAT ONE OR MORE FIRST CRITERIA ARE SATISFIED: — 808

PRESENT, VIA THE DISPLAY GENERATION COMPONENT, A FIRST AFFORDANCE ASSOCIATED WITH A REPRESENTATION OF THE SECOND ELECTRONIC DEVICE — 810

WHILE PRESENTING THE COMPUTER-GENERATED ENVIRONMENT INCLUDING THE REPRESENTATION OF THE CAPTURED PORTIONS OF THE REAL-WORLD ENVIRONMENT AND THE FIRST AFFORDANCE, RECEIVE, VIA THE ONE OR MORE INPUT DEVICES, AN INPUT CORRESPONDING TO A SELECTION OF THE FIRST AFFORDANCE — 812

PRESENT, IN THE COMPUTER-GENERATED ENVIRONMENT, A SECOND REPRESENTATION OF THE USER INTERFACE OF THE SECOND ELECTRONIC DEVICE DIFFERENT THAN THE FIRST REPRESENTATION OF THE USER INTERFACE, IN ACCORDANCE WITH THE INPUT — 814

FIG. 8A

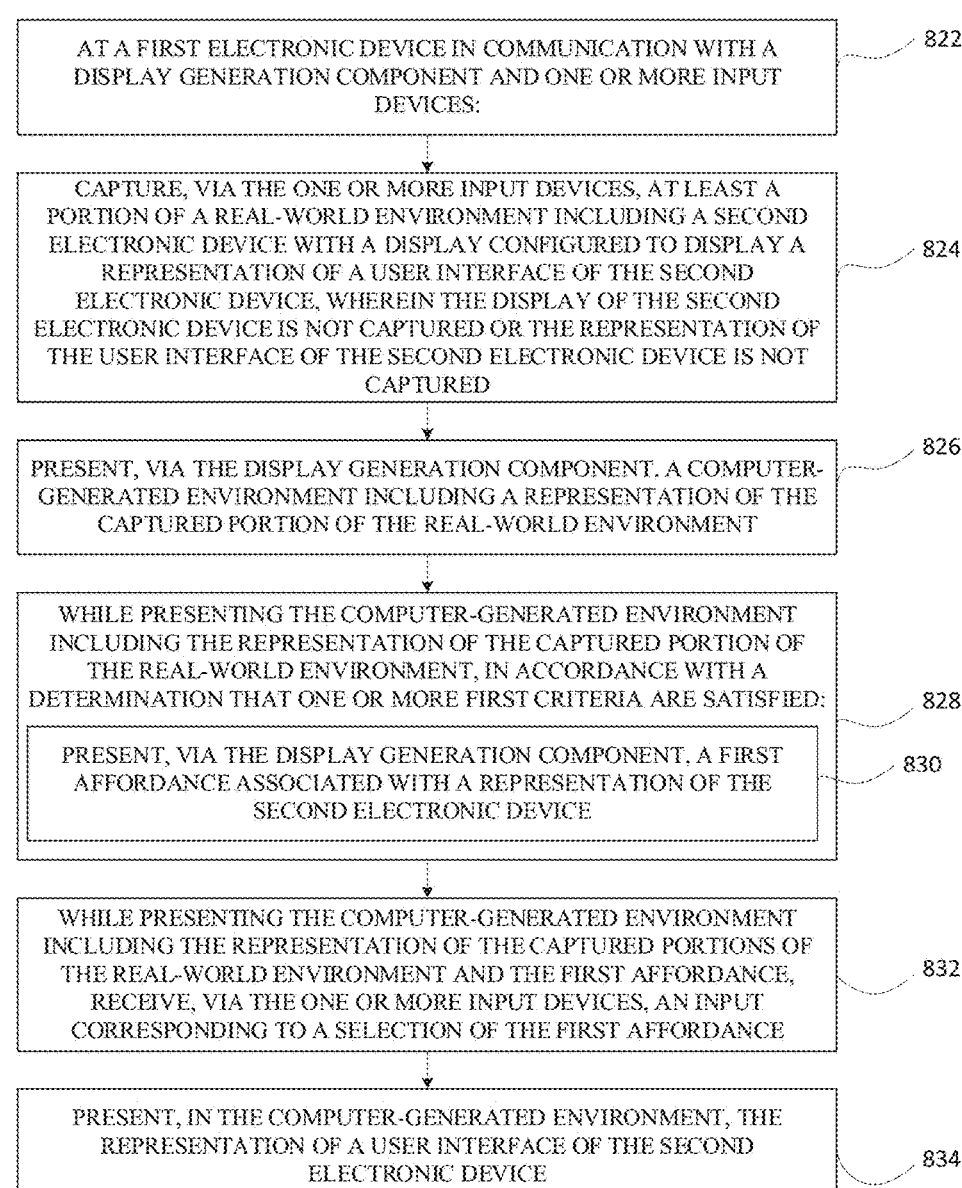

820

822

AT A FIRST ELECTRONIC DEVICE IN COMMUNICATION WITH A DISPLAY GENERATION COMPONENT AND ONE OR MORE INPUT DEVICES:

824

CAPTURE, VIA THE ONE OR MORE INPUT DEVICES, AT LEAST A PORTION OF A REAL-WORLD ENVIRONMENT INCLUDING A SECOND ELECTRONIC DEVICE WITH A DISPLAY CONFIGURED TO DISPLAY A REPRESENTATION OF A USER INTERFACE OF THE SECOND ELECTRONIC DEVICE, WHEREIN THE DISPLAY OF THE SECOND ELECTRONIC DEVICE IS NOT CAPTURED OR THE REPRESENTATION OF THE USER INTERFACE OF THE SECOND ELECTRONIC DEVICE IS NOT CAPTURED

826

PRESENT, VIA THE DISPLAY GENERATION COMPONENT, A COMPUTER-GENERATED ENVIRONMENT INCLUDING A REPRESENTATION OF THE CAPTURED PORTION OF THE REAL-WORLD ENVIRONMENT

828

WHILE PRESENTING THE COMPUTER-GENERATED ENVIRONMENT INCLUDING THE REPRESENTATION OF THE CAPTURED PORTION OF THE REAL-WORLD ENVIRONMENT, IN ACCORDANCE WITH A DETERMINATION THAT ONE OR MORE FIRST CRITERIA ARE SATISFIED:

830

PRESENT, VIA THE DISPLAY GENERATION COMPONENT, A FIRST AFFORDANCE ASSOCIATED WITH A REPRESENTATION OF THE SECOND ELECTRONIC DEVICE

832

WHILE PRESENTING THE COMPUTER-GENERATED ENVIRONMENT INCLUDING THE REPRESENTATION OF THE CAPTURED PORTIONS OF THE REAL-WORLD ENVIRONMENT AND THE FIRST AFFORDANCE, RECEIVE, VIA THE ONE OR MORE INPUT DEVICES, AN INPUT CORRESPONDING TO A SELECTION OF THE FIRST AFFORDANCE

834

PRESENT, IN THE COMPUTER-GENERATED ENVIRONMENT, THE REPRESENTATION OF A USER INTERFACE OF THE SECOND ELECTRONIC DEVICE

FIG. 8B

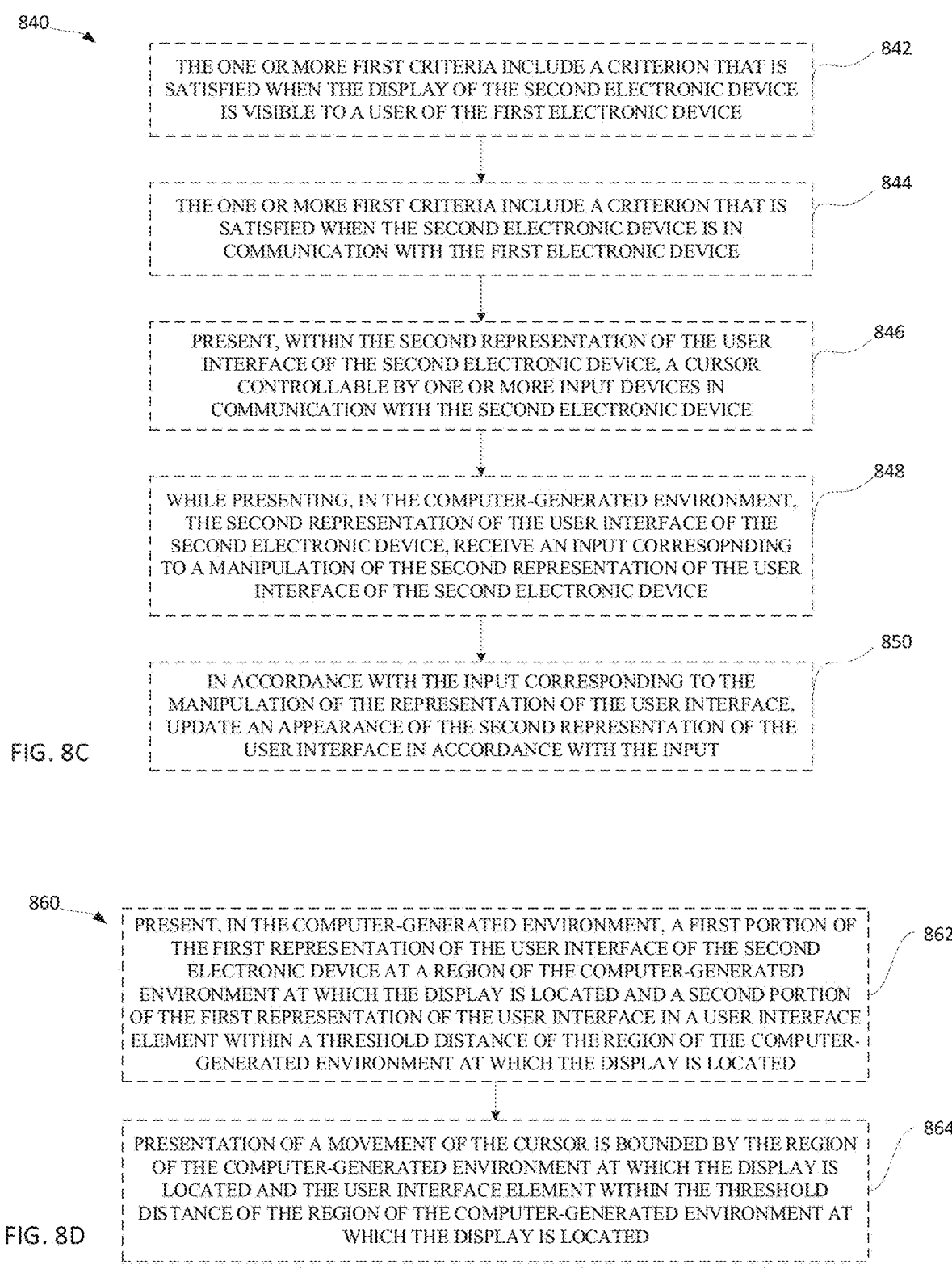

840

THE ONE OR MORE FIRST CRITERIA INCLUDE A CRITERION THAT IS SATISFIED WHEN THE DISPLAY OF THE SECOND ELECTRONIC DEVICE IS VISIBLE TO A USER OF THE FIRST ELECTRONIC DEVICE
842

THE ONE OR MORE FIRST CRITERIA INCLUDE A CRITERION THAT IS SATISFIED WHEN THE SECOND ELECTRONIC DEVICE IS IN COMMUNICATION WITH THE FIRST ELECTRONIC DEVICE
844

PRESENT, WITHIN THE SECOND REPRESENTATION OF THE USER INTERFACE OF THE SECOND ELECTRONIC DEVICE, A CURSOR CONTROLLABLE BY ONE OR MORE INPUT DEVICES IN COMMUNICATION WITH THE SECOND ELECTRONIC DEVICE
846

WHILE PRESENTING, IN THE COMPUTER-GENERATED ENVIRONMENT, THE SECOND REPRESENTATION OF THE USER INTERFACE OF THE SECOND ELECTRONIC DEVICE, RECEIVE AN INPUT CORRESOPNDING TO A MANIPULATION OF THE SECOND REPRESENTATION OF THE USER INTERFACE OF THE SECOND ELECTRONIC DEVICE
848

IN ACCORDANCE WITH THE INPUT CORRESPONDING TO THE MANIPULATION OF THE REPRESENTATION OF THE USER INTERFACE, UPDATE AN APPEARANCE OF THE SECOND REPRESENTATION OF THE USER INTERFACE IN ACCORDANCE WITH THE INPUT
850

PRESENT, IN THE COMPUTER-GENERATED ENVIRONMENT, A FIRST PORTION OF THE FIRST REPRESENTATION OF THE USER INTERFACE OF THE SECOND ELECTRONIC DEVICE AT A REGION OF THE COMPUTER-GENERATED ENVIRONMENT AT WHICH THE DISPLAY IS LOCATED AND A SECOND PORTION OF THE FIRST REPRESENTATION OF THE USER INTERFACE IN A USER INTERFACE ELEMENT WITHIN A THRESHOLD DISTANCE OF THE REGION OF THE COMPUTER-GENERATED ENVIRONMENT AT WHICH THE DISPLAY IS LOCATED
862

PRESENTATION OF A MOVEMENT OF THE CURSOR IS BOUNDED BY THE REGION OF THE COMPUTER-GENERATED ENVIRONMENT AT WHICH THE DISPLAY IS LOCATED AND THE USER INTERFACE ELEMENT WITHIN THE THRESHOLD DISTANCE OF THE REGION OF THE COMPUTER-GENERATED ENVIRONMENT AT WHICH THE DISPLAY IS LOCATED
864

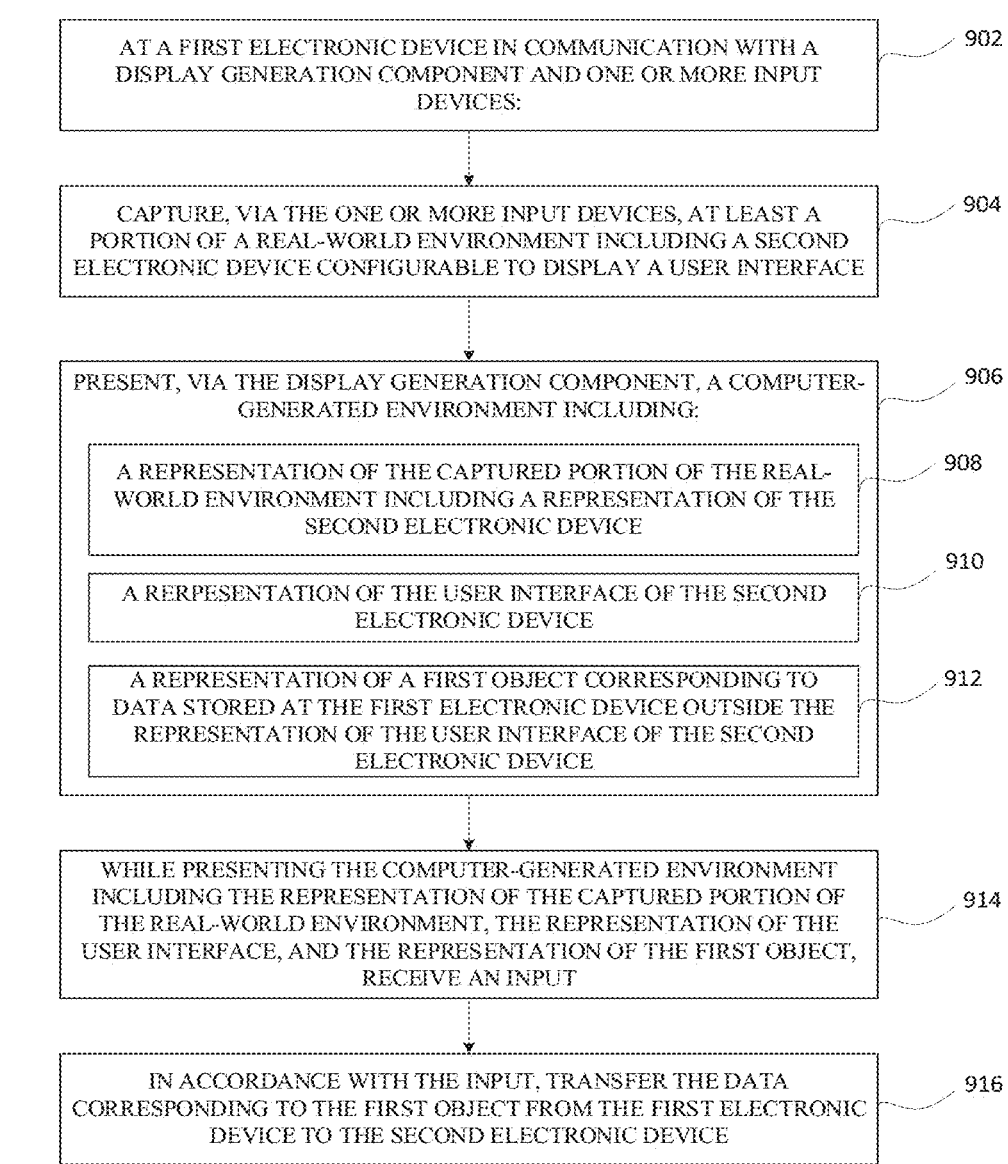

902 — AT A FIRST ELECTRONIC DEVICE IN COMMUNICATION WITH A DISPLAY GENERATION COMPONENT AND ONE OR MORE INPUT DEVICES:

904 — CAPTURE, VIA THE ONE OR MORE INPUT DEVICES, AT LEAST A PORTION OF A REAL-WORLD ENVIRONMENT INCLUDING A SECOND ELECTRONIC DEVICE CONFIGURABLE TO DISPLAY A USER INTERFACE

906 — PRESENT, VIA THE DISPLAY GENERATION COMPONENT, A COMPUTER-GENERATED ENVIRONMENT INCLUDING:

908 — A REPRESENTATION OF THE CAPTURED PORTION OF THE REAL-WORLD ENVIRONMENT INCLUDING A REPRESENTATION OF THE SECOND ELECTRONIC DEVICE

910 — A RERPESENTATION OF THE USER INTERFACE OF THE SECOND ELECTRONIC DEVICE

912 — A REPRESENTATION OF A FIRST OBJECT CORRESPONDING TO DATA STORED AT THE FIRST ELECTRONIC DEVICE OUTSIDE THE REPRESENTATION OF THE USER INTERFACE OF THE SECOND ELECTRONIC DEVICE

914 — WHILE PRESENTING THE COMPUTER-GENERATED ENVIRONMENT INCLUDING THE REPRESENTATION OF THE CAPTURED PORTION OF THE REAL-WORLD ENVIRONMENT, THE REPRESENTATION OF THE USER INTERFACE, AND THE REPRESENTATION OF THE FIRST OBJECT, RECEIVE AN INPUT

916 — IN ACCORDANCE WITH THE INPUT, TRANSFER THE DATA CORRESPONDING TO THE FIRST OBJECT FROM THE FIRST ELECTRONIC DEVICE TO THE SECOND ELECTRONIC DEVICE

FIG. 9A

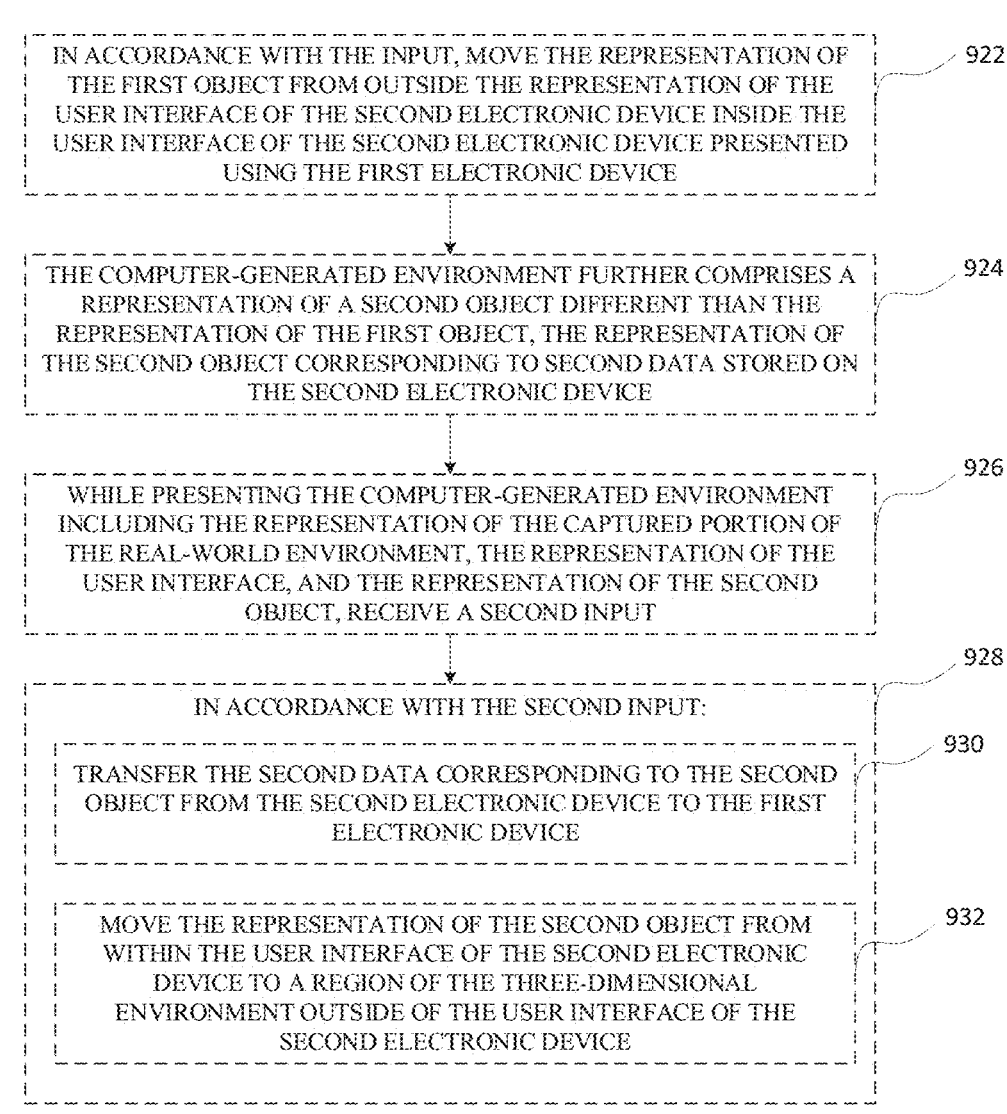

920

IN ACCORDANCE WITH THE INPUT, MOVE THE REPRESENTATION OF THE FIRST OBJECT FROM OUTSIDE THE REPRESENTATION OF THE USER INTERFACE OF THE SECOND ELECTRONIC DEVICE INSIDE THE USER INTERFACE OF THE SECOND ELECTRONIC DEVICE PRESENTED USING THE FIRST ELECTRONIC DEVICE ⟋ 922

THE COMPUTER-GENERATED ENVIRONMENT FURTHER COMPRISES A REPRESENTATION OF A SECOND OBJECT DIFFERENT THAN THE REPRESENTATION OF THE FIRST OBJECT, THE REPRESENTATION OF THE SECOND OBJECT CORRESPONDING TO SECOND DATA STORED ON THE SECOND ELECTRONIC DEVICE ⟋ 924

WHILE PRESENTING THE COMPUTER-GENERATED ENVIRONMENT INCLUDING THE REPRESENTATION OF THE CAPTURED PORTION OF THE REAL-WORLD ENVIRONMENT, THE REPRESENTATION OF THE USER INTERFACE, AND THE REPRESENTATION OF THE SECOND OBJECT, RECEIVE A SECOND INPUT ⟋ 926

IN ACCORDANCE WITH THE SECOND INPUT: ⟋ 928

TRANSFER THE SECOND DATA CORRESPONDING TO THE SECOND OBJECT FROM THE SECOND ELECTRONIC DEVICE TO THE FIRST ELECTRONIC DEVICE ⟋ 930

MOVE THE REPRESENTATION OF THE SECOND OBJECT FROM WITHIN THE USER INTERFACE OF THE SECOND ELECTRONIC DEVICE TO A REGION OF THE THREE-DIMENSIONAL ENVIRONMENT OUTSIDE OF THE USER INTERFACE OF THE SECOND ELECTRONIC DEVICE ⟋ 932

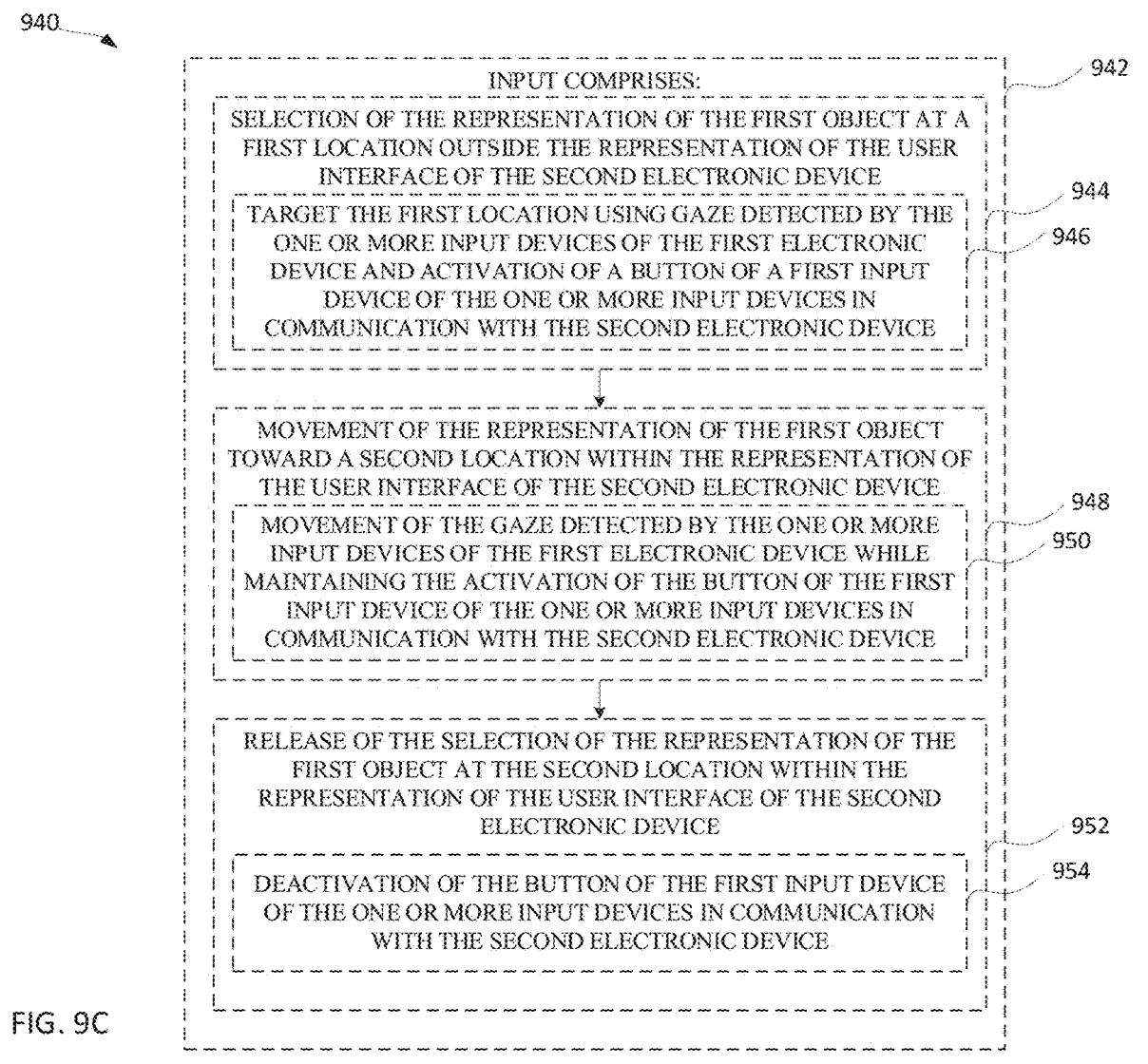

INPUT COMPRISES: ⎯ 942

SELECTION OF THE REPRESENTATION OF THE FIRST OBJECT AT A
FIRST LOCATION OUTSIDE THE REPRESENTATION OF THE USER
INTERFACE OF THE SECOND ELECTRONIC DEVICE ⎯ 944

TARGET THE FIRST LOCATION USING GAZE DETECTED BY THE
ONE OR MORE INPUT DEVICES OF THE FIRST ELECTRONIC
DEVICE AND ACTIVATION OF A BUTTON OF A FIRST INPUT
DEVICE OF THE ONE OR MORE INPUT DEVICES IN
COMMUNICATION WITH THE SECOND ELECTRONIC DEVICE ⎯ 946

MOVEMENT OF THE REPRESENTATION OF THE FIRST OBJECT
TOWARD A SECOND LOCATION WITHIN THE REPRESENTATION OF
THE USER INTERFACE OF THE SECOND ELECTRONIC DEVICE ⎯ 948

MOVEMENT OF THE GAZE DETECTED BY THE ONE OR MORE
INPUT DEVICES OF THE FIRST ELECTRONIC DEVICE WHILE
MAINTAINING THE ACTIVATION OF THE BUTTON OF THE FIRST
INPUT DEVICE OF THE ONE OR MORE INPUT DEVICES IN
COMMUNICATION WITH THE SECOND ELECTRONIC DEVICE ⎯ 950

RELEASE OF THE SELECTION OF THE REPRESENTATION OF THE
FIRST OBJECT AT THE SECOND LOCATION WITHIN THE
REPRESENTATION OF THE USER INTERFACE OF THE SECOND
ELECTRONIC DEVICE ⎯ 952

DEACTIVATION OF THE BUTTON OF THE FIRST INPUT DEVICE
OF THE ONE OR MORE INPUT DEVICES IN COMMUNICATION
WITH THE SECOND ELECTRONIC DEVICE ⎯ 954

FIG. 9C

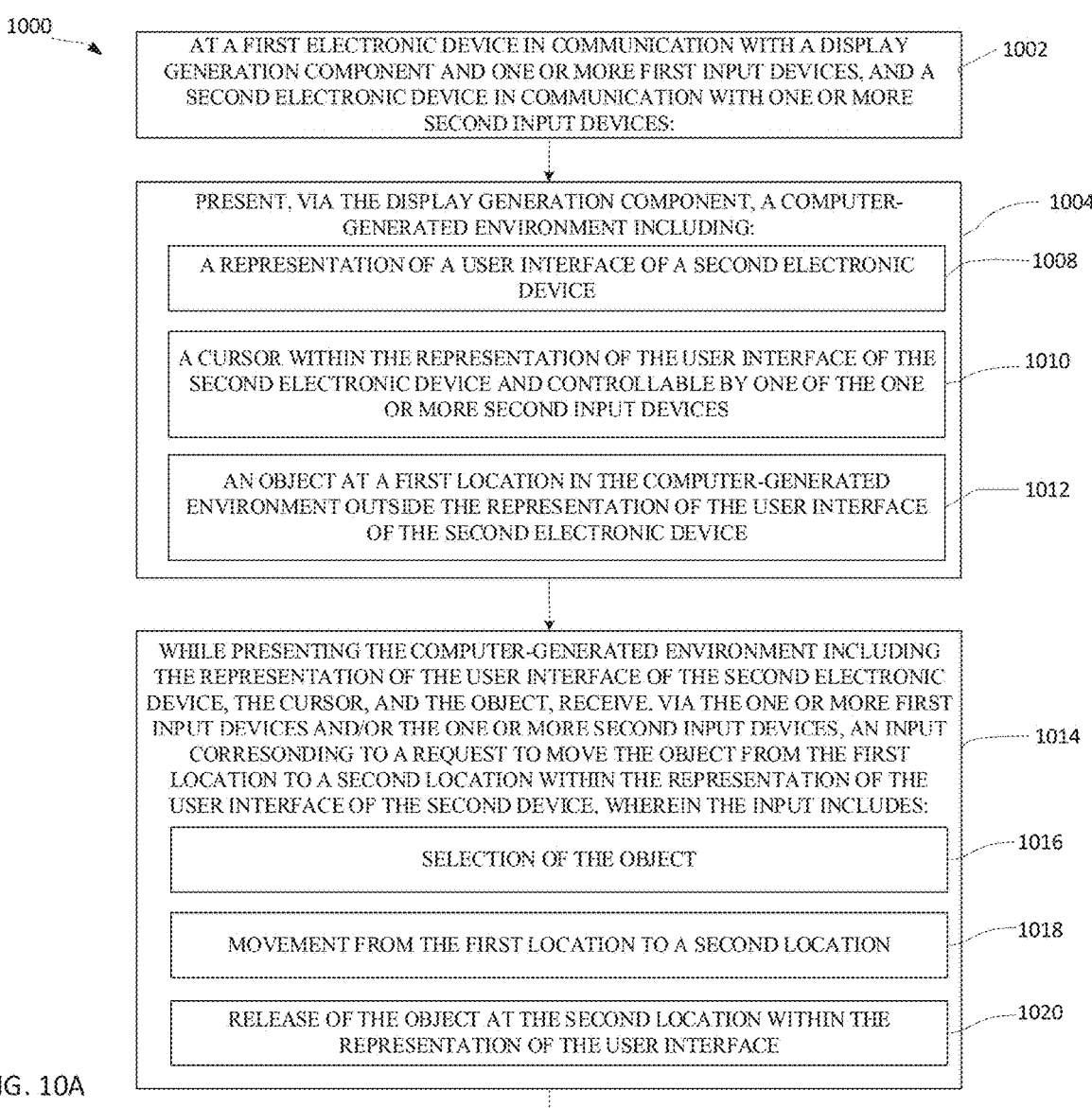

1000

1002 — AT A FIRST ELECTRONIC DEVICE IN COMMUNICATION WITH A DISPLAY GENERATION COMPONENT AND ONE OR MORE FIRST INPUT DEVICES, AND A SECOND ELECTRONIC DEVICE IN COMMUNICATION WITH ONE OR MORE SECOND INPUT DEVICES:

1004 — PRESENT, VIA THE DISPLAY GENERATION COMPONENT, A COMPUTER-GENERATED ENVIRONMENT INCLUDING:

1008 — A REPRESENTATION OF A USER INTERFACE OF A SECOND ELECTRONIC DEVICE

1010 — A CURSOR WITHIN THE REPRESENTATION OF THE USER INTERFACE OF THE SECOND ELECTRONIC DEVICE AND CONTROLLABLE BY ONE OF THE ONE OR MORE SECOND INPUT DEVICES

1012 — AN OBJECT AT A FIRST LOCATION IN THE COMPUTER-GENERATED ENVIRONMENT OUTSIDE THE REPRESENTATION OF THE USER INTERFACE OF THE SECOND ELECTRONIC DEVICE

1014 — WHILE PRESENTING THE COMPUTER-GENERATED ENVIRONMENT INCLUDING THE REPRESENTATION OF THE USER INTERFACE OF THE SECOND ELECTRONIC DEVICE, THE CURSOR, AND THE OBJECT, RECEIVE, VIA THE ONE OR MORE FIRST INPUT DEVICES AND/OR THE ONE OR MORE SECOND INPUT DEVICES, AN INPUT CORRESONDING TO A REQUEST TO MOVE THE OBJECT FROM THE FIRST LOCATION TO A SECOND LOCATION WITHIN THE REPRESENTATION OF THE USER INTERFACE OF THE SECOND DEVICE, WHEREIN THE INPUT INCLUDES:

1016 — SELECTION OF THE OBJECT

1018 — MOVEMENT FROM THE FIRST LOCATION TO A SECOND LOCATION

1020 — RELEASE OF THE OBJECT AT THE SECOND LOCATION WITHIN THE REPRESENTATION OF THE USER INTERFACE

FIG. 10A

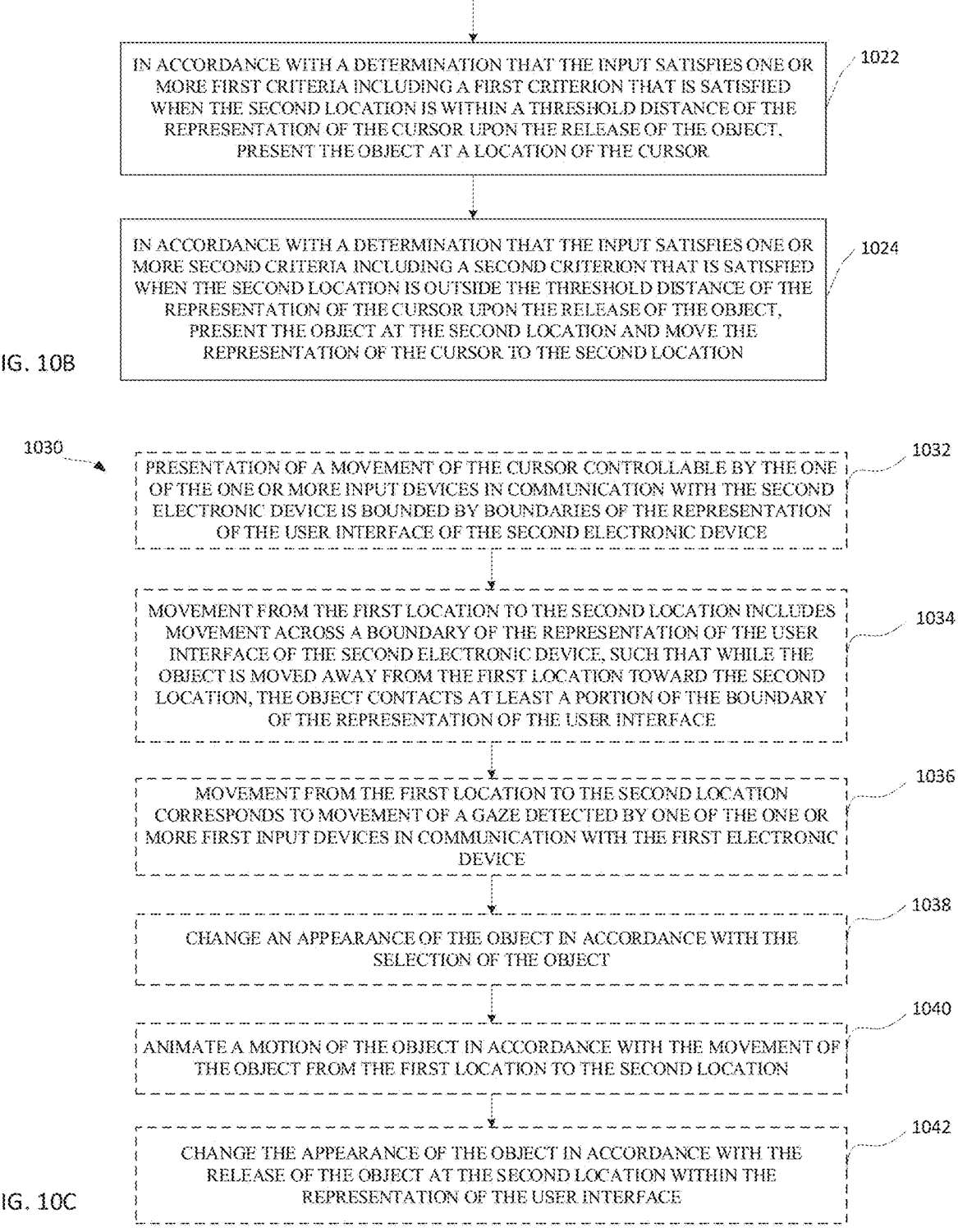

IN ACCORDANCE WITH A DETERMINATION THAT THE INPUT SATISFIES ONE OR MORE FIRST CRITERIA INCLUDING A FIRST CRITERION THAT IS SATISFIED WHEN THE SECOND LOCATION IS WITHIN A THRESHOLD DISTANCE OF THE REPRESENTATION OF THE CURSOR UPON THE RELEASE OF THE OBJECT, PRESENT THE OBJECT AT A LOCATION OF THE CURSOR — 1022

IN ACCORDANCE WITH A DETERMINATION THAT THE INPUT SATISFIES ONE OR MORE SECOND CRITERIA INCLUDING A SECOND CRITERION THAT IS SATISFIED WHEN THE SECOND LOCATION IS OUTSIDE THE THRESHOLD DISTANCE OF THE REPRESENTATION OF THE CURSOR UPON THE RELEASE OF THE OBJECT, PRESENT THE OBJECT AT THE SECOND LOCATION AND MOVE THE REPRESENTATION OF THE CURSOR TO THE SECOND LOCATION — 1024

PRESENTATION OF A MOVEMENT OF THE CURSOR CONTROLLABLE BY THE ONE OF THE ONE OR MORE INPUT DEVICES IN COMMUNICATION WITH THE SECOND ELECTRONIC DEVICE IS BOUNDED BY BOUNDARIES OF THE REPRESENTATION OF THE USER INTERFACE OF THE SECOND ELECTRONIC DEVICE — 1032

MOVEMENT FROM THE FIRST LOCATION TO THE SECOND LOCATION INCLUDES MOVEMENT ACROSS A BOUNDARY OF THE REPRESENTATION OF THE USER INTERFACE OF THE SECOND ELECTRONIC DEVICE, SUCH THAT WHILE THE OBJECT IS MOVED AWAY FROM THE FIRST LOCATION TOWARD THE SECOND LOCATION, THE OBJECT CONTACTS AT LEAST A PORTION OF THE BOUNDARY OF THE REPRESENTATION OF THE USER INTERFACE — 1034

MOVEMENT FROM THE FIRST LOCATION TO THE SECOND LOCATION CORRESPONDS TO MOVEMENT OF A GAZE DETECTED BY ONE OF THE ONE OR MORE FIRST INPUT DEVICES IN COMMUNICATION WITH THE FIRST ELECTRONIC DEVICE — 1036

CHANGE AN APPEARANCE OF THE OBJECT IN ACCORDANCE WITH THE SELECTION OF THE OBJECT — 1038

ANIMATE A MOTION OF THE OBJECT IN ACCORDANCE WITH THE MOVEMENT OF THE OBJECT FROM THE FIRST LOCATION TO THE SECOND LOCATION — 1040

CHANGE THE APPEARANCE OF THE OBJECT IN ACCORDANCE WITH THE RELEASE OF THE OBJECT AT THE SECOND LOCATION WITHIN THE REPRESENTATION OF THE USER INTERFACE — 1042

FIG. 10C

SYSTEM AND METHOD OF AUGMENTED REPRESENTATION OF AN ELECTRONIC DEVICE

CROSS-REFERENCE TO RELATED APPLICATIONS

This application is a continuation of International Application No. PCT/US2022/075482, filed Aug. 25, 2022, which claims the benefit of U.S. Provisional Application No. 63/238,030, filed Aug. 27, 2021, the contents of which are herein incorporated by reference in their entireties for all purposes.

FIELD OF THE DISCLOSURE

This relates generally to systems and methods of augmented electronic devices.

BACKGROUND OF THE DISCLOSURE

Many types of computing system are available, such as a mobile phone, a tablet, a touchpad, a portable or desktop computer, a portable media player, and a wearable device. Computing systems may include a display or a touch screen to enable user interactions. However, these computing systems are limited by the physical constraints of the display or touch screen.

SUMMARY OF THE DISCLOSURE

Some embodiments of the disclosure are directed to an augmented representation of a first electronic device. In some embodiments, a three-dimensional representation of a first electronic device (e.g., an augmented device) is presented using a second electronic device in a three-dimensional environment (e.g., in a computer-generated environment). In some embodiments, the three-dimensional environment includes captured portions of a real-world environment, optionally including the first electronic device. In some embodiments, the augmented representation of the first electronic device includes presenting a representation of the display of the first electronic device with a different characteristic (e.g., an expanded size). In some embodiments, the augmented representation of the first electronic device includes presenting virtual user interface element (e.g., a window, pane, container, etc.) representing an extension of the display of the first electronic device. In some embodiments, the virtual user interface element is presented concurrently with the display of the first electronic device (or a representation of the display of the first electronic device). The representation of the augmented device includes a display of the augmented user interface (e.g., corresponding to the user interface of the first electronic device). In some embodiments, the augmented device is optionally configured to display some or all of the user interfaces operating on the first electronic device. In some embodiments, a portion of the user interfaces (e.g., a first application) can be presented in a virtual user interface element (e.g., a window) of the augmented device and a portion of the user interfaces (e.g., a second application) can be presented in a representation of the display of the first electronic device. In some embodiments, manipulations of and/or interactions are possible with the augmented representation of the first electronic device. In some embodiments, the manipulations of and/or interactions with the augmented representation of the first electronic device also impact the operation of the first electronic device. For example, launching, moving, resizing, and/or providing input to an application using the augmented representation of the first electronic device can cause the corresponding behavior to be executed on the first electronic device.

In some embodiments, in addition to presenting the augmented device, the second electronic device may concurrently present one or more additional user interfaces within the three-dimensional environment. For example, the one or more user interfaces can include one or more application windows. In some embodiments, a movement of a first virtual object of the one or more virtual objects displayed in the augmented user interface of the augmented device to a first application window of the one or more application windows within the three-dimensional environment (e.g., outside of the augmented device/augmented user interface) optionally causes a transfer of object data (e.g., file data) corresponding to the first virtual object from the first electronic device to the second electronic device. In some embodiments, a movement of a second virtual object of the one or more virtual objects presented in the first application window within the three-dimensional environment optionally causes a transfer of object data (e.g., file data) corresponding to the second virtual object from the second electronic device to the first electronic device. In other words, in addition to presenting a visual representation of an object (e.g., data representing a graphical representation of the object) in a different location, additional data can be transferred. For example, a representation icon representing a file can be presented in a new location and the contents of the file can be transferred as well (e.g., storing the file contents in memory on a different electronic device).

Some embodiments of the disclosure are directed to user-interactions with and/or manipulations of an augmented device presented within a three-dimensional environment on an electronic device. In some embodiments, the augmented device corresponds to a first electronic device in communication with one or more physical input devices (e.g., a keyboard, trackpad, etc.). The three-dimensional environment is presented using a second electronic device, the second electronic device including one or more input devices (e.g., physical input devices that require tactile input from the users and/or motion tracking devices such as accelerometers, gyroscopes, eye or finger/hand tracking devices, etc.). In some embodiments, user interactions (e.g., user input, such as touch, tap, motion/reorientation of the eyes or of the second electronic device, etc.) received at the second electronic device may cause the presentation of the augmented device and/or cause the presentation of the augmented device to be updated according to the input. In some embodiments, the augmented user interface of the augmented device includes a cursor controllable by the one or more input devices in communication with the first electronic device (e.g., a cursor controlled by a mouse or trackpad). In some embodiments, user interactions with the augmented user interface (e.g., one or more virtual user interface elements and/or one or more virtual objects) using the cursor may cause the presentation of the augmented user interface to be updated according to the cursor input. In some embodiments, the user input received at the one or more input devices in communication with the first electronic device is communicated to the second electronic device in real time (e.g., less than 50 ms delay), such that input received at both the first electronic device and the second electronic device are synchronized for interacting with the augmented device in the three-dimensional environment presented using the second electronic device (e.g., using a combination of inputs at the first electronic device and at the second electronic device).

Interacting with the augmented device in the three-dimensional environment may include movement of one or more virtual objects and resetting a position of the cursor within the augmented user interface of the augmented device. In some embodiments, a user's gaze may be tracked by the second electronic device as an input for targeting and/or selecting an object within the three-dimensional environment. For example, gaze can be used to identify one or more virtual objects using another selection input, or select a virtual object when gaze is maintained for a threshold period of time. In some embodiments, gaze can also identify a target location for movement of an object or cause a movement of one or more virtual objects following the gaze. In some embodiments, the cursor controlled by the one or more input devices in communication with the first electronic device may be used to select a first virtual object of the one or more virtual objects, and the user's gaze may be used to move the selected first virtual object within portions of the augmented device user interface. In some embodiments, the first virtual object may be moved by the gaze from the augmented user interface of the augmented device to an application window presented within the three-dimensional environment outside the augmented device user interface. In some embodiments, the first virtual object may be moved by the gaze from the application window presented within the three-dimensional environment (e.g., outside the augmented user interface) to the augmented user interface of the augmented device. In some embodiments, a user's gaze may indicate a target for selection and/or movement, and another input device (e.g., mouse button or trackpad) can be used for selection and deselection. In some such embodiments, in response to detecting a conclusion of cursor input at the one or more input devices in communication with the first electronic device (e.g., liftoff from the trackpad or releasing a mouse button, or a subsequent press of the trackpad or mouse button), the first virtual object can be released within the augmented device. In some such embodiments, if the gaze is within a threshold distance of a current location of the cursor (at the time of release), the first virtual object is presented at the current location of the cursor within the augmented user interface. In some such embodiments, in response to detecting conclusion of the cursor input, if the gaze is outside the threshold distance of the current location of the cursor, the first virtual object and the cursor are presented at a current location of the gaze within the augmented user interface (e.g., the cursor is presented at a new location and ceases to be presented at the location of the cursor at the time of release of the first virtual object.

The full descriptions of these embodiments are provided in the Drawings and the Detailed Description, and it is understood that this Summary does not limit the scope of the disclosure in any way.

BRIEF DESCRIPTION OF THE DRAWINGS

For improved understanding of the various embodiments described herein, reference should be made to the Detailed Description below along with the following drawings. Like reference numerals often refer to corresponding parts throughout the drawings.

FIGS. 8A-8D illustrate flow diagrams illustrating example processes for presenting an augmented device corresponding to an electronic device according to embodiments of the disclosure.

FIGS. 9A-9C illustrate flow diagrams illustrating example processes for moving an object between an augmented device corresponding to a first electronic device and an application window running on a second electronic device according to embodiments of the disclosure.

FIGS. 10A-10C illustrate flow diagrams illustrating example processes for altering a position of a cursor within an augmented device corresponding to a first electronic device while moving an object between the augmented device and an application window running on a second electronic device according to embodiments of the disclosure.

DETAILED DESCRIPTION

Figure 1:
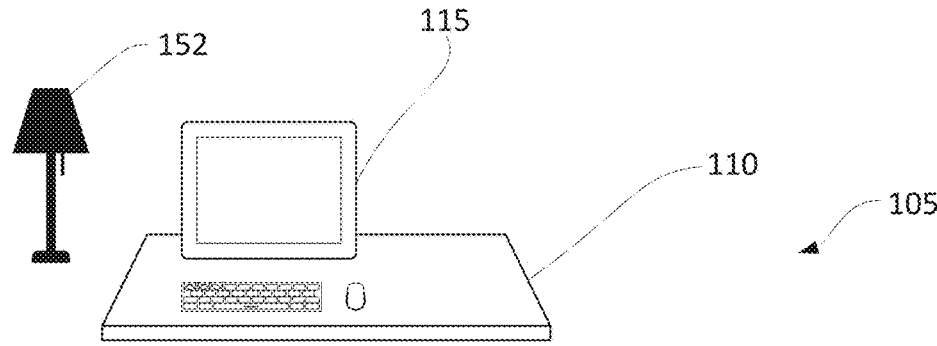
FIG. 1 illustrates an electronic device displaying an extended reality environment according to embodiments of the disclosure.
Figure 1:
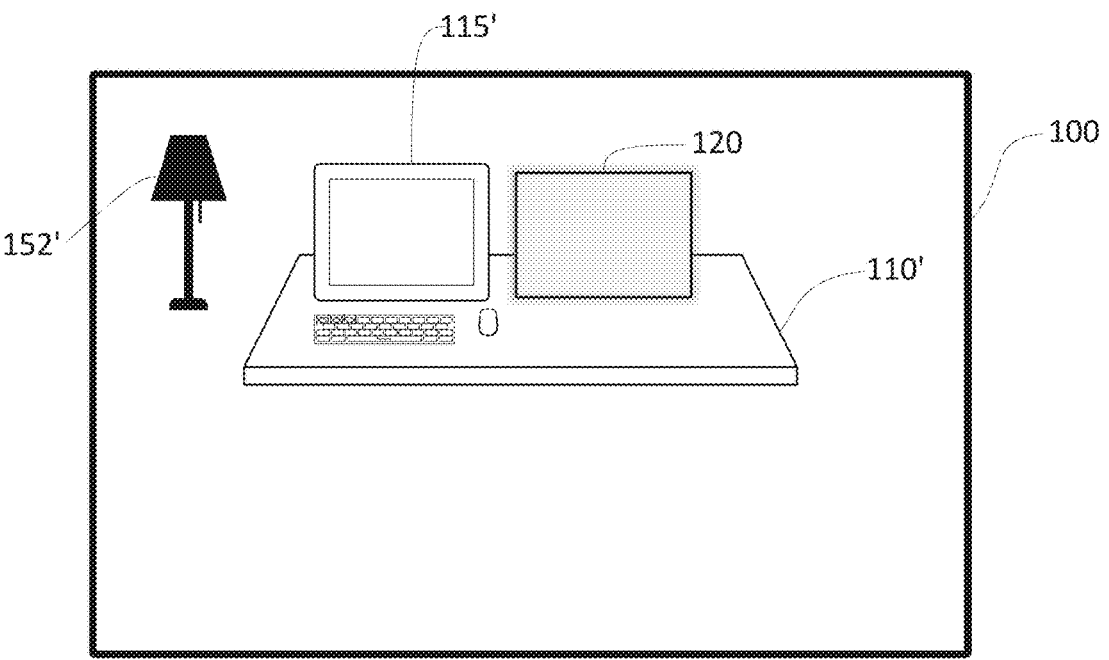

Some embodiments of the disclosure are directed to an augmented representation of a first electronic device. In some embodiments, a three-dimensional representation of a first electronic device (e.g., an augmented device) is presented using a second electronic device in a three-dimensional environment (e.g., in a computer-generated environment). In some embodiments, the three-dimensional environment includes captured portions of a real-world environment, optionally including the first electronic device. In some embodiments, the augmented representation of the first electronic device includes a representation of the display of the first electronic device with a different characteristic (e.g., an expanded size). In some embodiments, the augmented representation of the first electronic device includes a virtual user interface element (e.g., a window, pane, container, etc.) representing an extension of the display of the first electronic device. In some embodiments, the virtual user interface element is presented concurrently with the display of the first electronic device (or a representation of the display of the first electronic device). In some embodiments, the representation of the augmented device includes an augmented user interface (e.g., corresponding to the user interface of the first electronic device). In some embodiments, the augmented device is optionally configured to display some or all of the user interfaces operating on the first electronic device. In some embodiments, a portion of the user interfaces (e.g., a first application) can be presented in a virtual user interface element (e.g., a window) of the augmented device and a portion of the user interfaces (e.g., a second application) can be presented in a representation of the display of the first electronic device. In some embodiments, manipulations of and/or interactions with the augmented representation of the first electronic device are possible. In some embodiments, the manipulations of and/or interactions with the augmented representation of the first electronic device also impact the operation of the first electronic device. For example, launching, moving, resizing, and/or providing input to an application using the augmented representation of the first electronic device can cause the corresponding behavior to be executed on the first electronic device.

In some embodiments, in addition to presenting the augmented device, the second electronic device may concurrently present one or more additional user interfaces within the three-dimensional environment. For example, the one or more user interfaces can include one or more application windows. In some embodiments, a movement of a first virtual object of the one or more virtual objects displayed in the augmented user interface of the augmented device to a first application window of the one or more application windows within the three-dimensional environment (e.g., outside of the augmented device/augmented user interface) optionally causes a transfer of object data (e.g., file data) corresponding to the first virtual object from the first electronic device to the second electronic device. In some embodiments, a movement of a second virtual object of the one or more virtual objects presented in the first application window within the three-dimensional environment to the augmented user interface of the augmented device optionally causes a transfer of object data (e.g., file data) corresponding to the second virtual object from the second electronic device to the first electronic device. In other words, in addition to presenting a visual representation of an object (e.g., data representing a graphical representation of the object) in a different location, additional data can be transferred. For example, an icon representing a file can be presented in a new location and the contents of the file can be transferred as well (e.g., storing the file contents in memory on a different electronic device).

Some embodiments of the disclosure are directed to user-interactions with and/or manipulations of an augmented device presented within a three-dimensional environment on an electronic device. In some embodiments, the augmented device corresponds to a first electronic device in communication with one or more physical input devices (e.g., a keyboard, trackpad, etc.). The three-dimensional environment is presented using a second electronic device, the second electronic device including one or more input devices (e.g., physical input devices that require tactile input from the users and/or motion tracking devices such as accelerometers, gyroscopes, eye or finger/hand tracking devices, etc.). In some embodiments, user interactions (e.g., user input, such as touch, tap, motion/reorientation of the eyes or of the second electronic device, etc.) received at the second electronic device may cause the presentation of the augmented device to be generated and/or updated according to the input. In some embodiments, the augmented user interface of the augmented device includes a cursor controllable by the physical or other input device in communication with the first electronic device (e.g., a cursor controlled by a mouse or trackpad). In some embodiments, user interactions with the augmented user interface (e.g., one or more virtual user interface elements and/or one or more virtual objects) using the cursor may cause the presentation of the augmented user interface to be updated according to the cursor input. In some embodiments, the user input received at the physical or other input device in communication with the first electronic device is communicated to the second electronic device in real time (e.g., less than 50 ms delay), such that input received at both the first electronic device and the second electronic device are synchronized for interacting with the augmented device in the three-dimensional environment presented using the second electronic device (e.g., using a combination of inputs at the first electronic device and at the second electronic device).

Interacting with the augmented device in the three-dimensional environment may include movement of one or more virtual objects and resetting a position of the cursor within the augmented user interface of the augmented device. In some embodiments, a user's gaze may be tracked by the second electronic device as an input for targeting and/or selecting an object within the three-dimensional environment. For example, gaze can be used to identify one or more virtual objects using another selection input, or select a virtual object when gaze is maintained for a threshold period of time. In some embodiments, gaze can also identify a target location for movement of an object or cause a movement of one or more virtual objects following the gaze. In some embodiments, the cursor controlled by the physical or other input device in communication with the first electronic device may be used to select a first virtual object of the one or more virtual objects, and the user's gaze may be used to move the selected first virtual object within portions of the augmented device user interface. In some embodiments, the first virtual object may be moved by the gaze from the augmented user interface of the augmented device to an application window presented within the three-dimensional environment outside the augmented device user interface. In some embodiments, the first virtual object may be moved by the gaze from the application window presented within the three-dimensional environment (e.g., outside the augmented user interface) to the augmented user interface of the augmented device. In some embodiments, a user's gaze may indicate a target for selection and/or movement, and another input device (e.g., mouse button or trackpad) can be used for selection and deselection. In some such embodiments, in response to detecting a conclusion of cursor input at the physical or other input device in communication with the first electronic device (e.g., liftoff from the trackpad or releasing a mouse button, or a subsequent press of the trackpad or mouse button), the first virtual object can be released within the augmented device. In some such embodiments, if the gaze is within a threshold distance of a current location of the cursor (at the time of release), the first virtual object is presented at the current location of the cursor within the augmented user interface. In some such embodiments, in response to detecting conclusion of the cursor input, if the gaze is outside the threshold distance of the current location of the cursor, the first virtual object and the cursor are presented at a current location of the gaze within the augmented user interface (e.g., the cursor is presented at a new location and ceases to be presented at the location of the cursor at the time of release of the first virtual object.

FIG. 1 illustrates an electronic device 100 displaying an extended reality (XR) environment (e.g., a computer-generated environment) according to embodiments of the disclosure. In some embodiments, electronic device 100 is a hand-held or mobile device, such as a tablet computer, laptop computer, smartphone, or head-mounted display. Additional examples of device 100 are described below with reference to the architecture block diagram of FIG. 2. As shown in FIG. 1, electronic device 100 and tabletop 110 are located in the physical environment 105. The physical environment may include physical features such as a physical surface (e.g., floor, walls) or a physical object (e.g., table, lamp, etc.). In some embodiments, electronic device 100 may be configured to capture areas of physical environment 105 including tabletop 110, lamp 152, desktop computer 115 and input devices 116 (illustrated in the field of view of electronic device 100). In some embodiments, in response to a trigger, the electronic device 100 may be configured to display a virtual object 120 in the computer-generated environment (e.g., represented by an application window illustrated in FIG. 1) that is not present in the physical environment 105, but is displayed in the computer-generated environment positioned on (e.g., anchored to) the top of a computer-generated representation 110' of real-world table top 110. For example, virtual object 120 can be displayed on the surface of the tabletop 110' in the computer-generated environment displayed via device 100 in response to detecting the planar surface of tabletop 110 in the physical environment 105.

It should be understood that virtual object 120 is a representative virtual object and one or more different virtual objects (e.g., of various dimensionality such as two-dimensional or three-dimensional virtual objects) can be included and rendered in a three-dimensional computer-generated environment. For example, the virtual object can represent an application or a user interface displayed in the computer-generated environment. In some embodiments, the virtual object 120 is optionally configured to be interactive and responsive to user input, such that a user may virtually touch, tap, move, rotate, or otherwise interact with, the virtual object. Additionally, it should be understood that, as used herein, the three-dimensional (3D) environment (or 3D virtual object) may be a representation of a 3D environment (or three-dimensional virtual object) projected or presented at an electronic device.

In the discussion that follows, an electronic device that is in communication with a display generation component and one or more input devices is described. It should be understood that the electronic device optionally is in communication with one or more other physical user-interface devices, such as touch-sensitive surface, a physical keyboard, a mouse, a joystick, a hand tracking device, an eye tracking device, a stylus, etc. Further, as described above, it should be understood that the described electronic device, display and/or touch-sensitive surface are optionally distributed amongst two or more devices. Therefore, as used herein, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

In some embodiments, the electronic device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2:
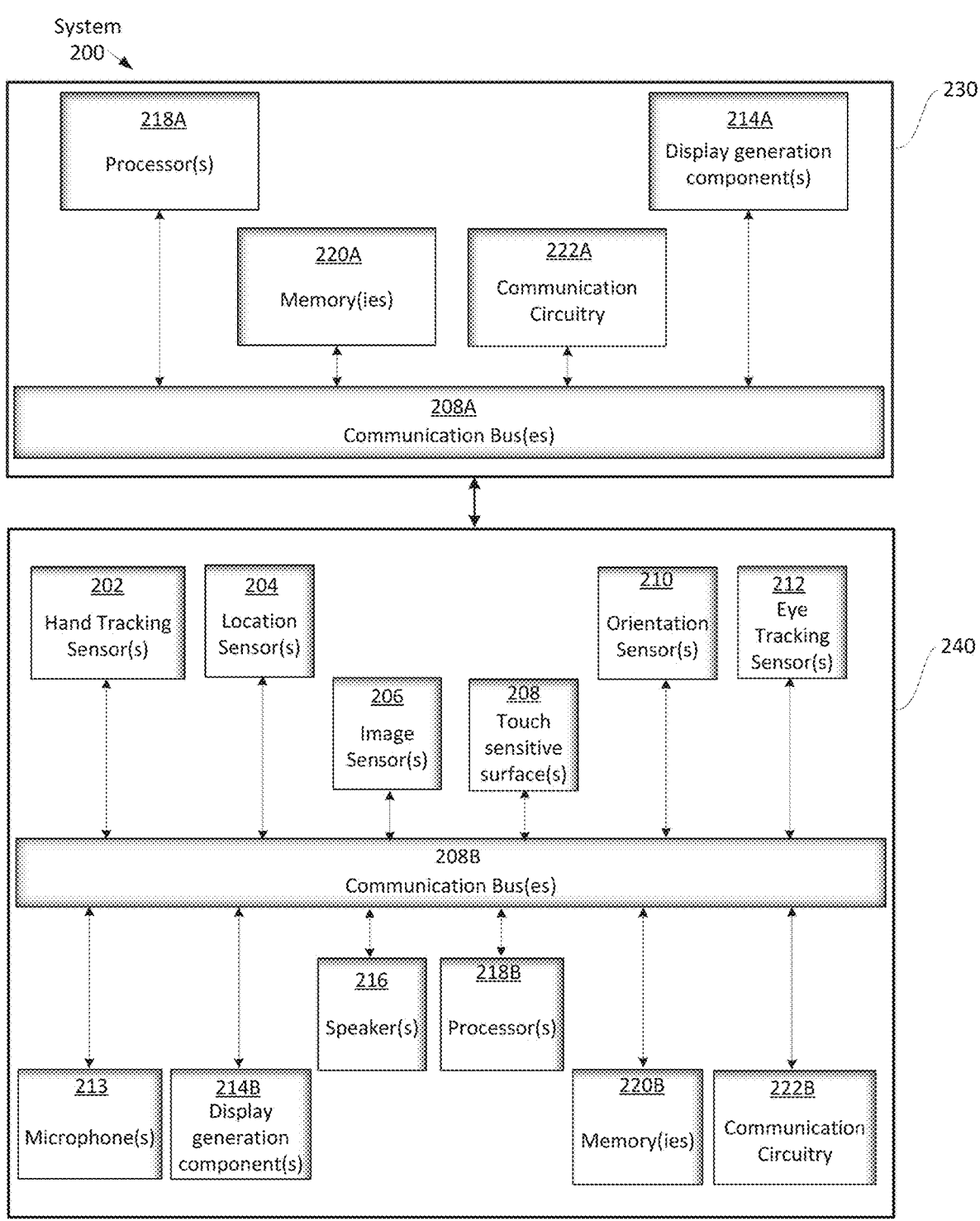
FIG. 2 illustrates a block diagram of an exemplary architecture for a system or device according to embodiments of the disclosure.

FIG. 2 illustrates a block diagram of an exemplary architecture for a system or device 220 according to embodiments of the disclosure. In some embodiments, device 200 is a mobile device, such as a mobile phone (e.g., smart phone), a tablet computer, a laptop computer, a desktop computer, a head-mounted display, an auxiliary device in communication with another device, etc. In some embodiments, device 200 includes various sensors (e.g., one or more hand tracking sensor(s), one or more location sensor(s), one or more image sensor(s), one or more touch-sensitive surface(s), one or more motion and/or orientation sensor(s), one or more eye tracking sensor(s), one or more microphone(s) or other audio sensors, etc.), one or more display generation component(s), one or more speaker(s), one or more processor(s), one or more memories, and/or communication circuitry. One or more communication buses are optionally used for communication between the above-mentioned components of device 200.

In some embodiments, as illustrated in FIG. 2, system/device 200 can be divided between multiple devices. For example, a first device 230 optionally includes processor(s) 218A, memory or memories 220A, communication circuitry 222A, and display generation component(s) 214A optionally communicating over communication bus(es) 208A. A second device 240 (e.g., corresponding to device 200) optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display generation component(s) 214B, one or more speaker(s) 216, one or more processor(s) 218B, one or more memories 220B, and/or communication circuitry 222B. One or more communication buses 208B are optionally used for communication between the above-mentioned components of device 240. In some embodiments, first device 230 and second device 240 communicate via a wired or wireless connection (e.g., via communication circuitry 222A-222B) between the two devices.

Communication circuitry 222A, 222B optionally includes circuitry for communicating with electronic devices, networks, such as the Internet, intranets, a wired network and/or a wireless network, cellular networks, and wireless local area networks (LANs). Communication circuitry 222A, 222B optionally includes circuitry for communicating using near-field communication (NFC) and/or short-range communication, such as Bluetooth®.

Processor(s) 218A, 218B may include one or more general processors, one or more graphics processors, and/or one or more digital signal processors. In some embodiments, memory 220A, 220B is a non-transitory computer-readable storage medium (e.g., flash memory, random access memory, or other volatile or non-volatile memory or storage) that stores computer-readable instructions configured to be executed by processor(s) 218A, 218B to perform the techniques, processes, and/or methods described below. In some embodiments, memory 220A, 220B can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some embodiments, the storage medium is a transitory computer-readable storage medium. In some embodiments, the storage medium is a non-transitory computer-readable storage medium. For example, the non-transitory computer-readable storage medium can include, but is not limited to, magnetic, optical, and/or semiconductor storages. In some embodiments, such storage may include magnetic disks, optical discs based on CD, DVD, or Blu-ray technologies, as well as persistent solid-state memory such as flash, solid-state drives, and the like.

In some embodiments, display generation component(s) 214A, 214B include a single display (e.g., a liquid-crystal display (LCD), organic light-emitting diode (OLED), or other types of display). In some embodiments, display generation component(s) 214A, 214B includes multiple displays. In some embodiments, display generation component(s) 214A, 214B can include a display with touch capability (e.g., a touch screen), a projector, a holographic projector, a retinal projector, etc. In some embodiments, device 240 includes touch-sensitive surface(s) 209 for receiving user inputs, such as tap inputs and swipe inputs or other gestures. In some embodiments, display generation component(s) 214B and touch-sensitive surface(s) 209 form touch-sensitive display(s) (e.g., a touch screen integrated with device 240 or external to device 240 that is in communication with device 240).

Device 240 optionally includes image sensor(s) 206. In some embodiments, image sensors(s) 206 optionally include one or more visible light image sensors, such as charged coupled device (CCD) sensors, and/or complementary metal-oxide-semiconductor (CMOS) sensors operable to obtain images of physical objects from the real-world environment. Image sensor(s) 206 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206 also optionally include one or more cameras configured to capture movement of physical objects in the real-world environment. Image sensor(s) 206 also optionally include one or more depth sensors configured to detect the distance of physical objects from device 240. In some embodiments, information from one or more depth sensors can allow the device to identify and differentiate objects in the real-world environment from other objects in the real-world environment. In some embodiments, one or more depth sensors can allow the device to determine the texture and/or topography of objects in the real-world environment.

In some embodiments, device 240 uses CCD sensors, event cameras, and depth sensors in combination to detect the physical environment around device 240. In some embodiments, image sensor(s) 206 include a first image sensor and a second image sensor. The first image sensor and the second image sensor work in tandem and are optionally configured to capture different information of physical objects in the real-world environment. In some embodiments, the first image sensor is a visible light image sensor, and the second image sensor is a depth sensor. In some embodiments, device 240 uses image sensor(s) 206 to detect the position and orientation of device 240 and/or display generation component(s) 214 in the real-world environment. For example, device 240 uses image sensor(s) 206 to track the position and orientation of display generation component(s) 214B relative to one or more fixed objects in the real-world environment.

In some embodiments, device 240 includes microphone(s) 213 or other audio sensors. Device 240 uses microphone(s) 213 to detect sound from the user and/or the real-world environment of the user. In some embodiments, microphone(s) 213 includes an array of microphones (a plurality of microphones) that optionally operate in tandem, such as to identify ambient noise or to locate the source of sound in space of the real-world environment.

Device 240 includes hand tracking sensor(s) 202 and/or eye tracking sensor(s) 212, in some embodiments. Hand tracking sensor(s) 202 are configured to track the position/location of one or more portions of the user's hands, and/or motions of one or more portions of the user's hands with respect to the extended reality environment, relative to the display generation component(s) 214B, and/or relative to another defined coordinate system. In some embodiments, eye tracking sensor(s) 212 are configured to track the position and movement of a user's gaze (eyes, face, or head, more generally) with respect to the real-world or extended reality environment and/or relative to the display generation component(s) 214B. In some embodiments, hand tracking sensor(s) 202 and/or eye tracking sensor(s) 212 are implemented together with the display generation component(s) 214B. In some embodiments, the hand tracking sensor(s) 202 and/or eye tracking sensor(s) 212 are implemented separate from the display generation component(s) 214B.

In some embodiments, the hand tracking sensor(s) 202 can use image sensor(s) 206 (e.g., one or more IR cameras, 3D cameras, depth cameras, etc.) that capture three-dimensional information from the real-world including one or more hands (e.g., of a human user). In some embodiments, the hands can be resolved with sufficient resolution to distinguish fingers and their respective positions. In some embodiments, one or more image sensor(s) 206 are positioned relative to the user to define a field of view of the image sensor(s) 206 and an interaction space in which finger/hand position, orientation and/or movement captured by the image sensors are used as inputs (e.g., to distinguish from a user's resting hand or other hands of other persons in the real-world environment). Tracking the fingers/hands for input (e.g., for detecting gestures, touch, tap, etc.) can be advantageous in that it does not require the user to touch, hold or wear any sort of beacon, sensor, or other marker.

In some embodiments, eye tracking sensor(s) 212 includes at least one eye tracking camera (e.g., infrared (IR)

cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some embodiments, both eyes are tracked separately by respective eye tracking cameras and illumination sources, and a focus/gaze can be determined from tracking both eyes. In some embodiments, one eye (e.g., a dominant eye) is tracked by a respective eye tracking camera/illumination source(s).

Device 240 includes location sensor(s) 204 for detecting a location of device 240 and/or display generation component(s) 214B. For example, location sensor(s) 204 can include a GPS receiver that receives data from one or more satellites and allows device 240 to determine the device's absolute position in the physical world.

Device 240 includes orientation sensor(s) 210 for detecting orientation and/or movement of device 240 and/or display generation component(s) 214B. For example, device 240 uses orientation sensor(s) 210 to track changes in the position and/or orientation of device 240 and/or display generation component(s) 214B, such as with respect to physical objects in the real-world environment. Orientation sensor(s) 210 optionally include one or more gyroscopes and/or one or more accelerometers.

It should be understood that system/device 200 is not limited to the components and configuration of FIG. 2, but can include fewer, alternative, or additional components in multiple configurations. In some embodiments, system 200 can be implemented in a single device. A person using system 200, is optionally referred to herein as a user of the device. Attention is now directed towards exemplary concurrent displays of a two-dimensional representation of content items and corresponding three-dimensional previews of the content items. As discussed below, the two-dimensional representation of the content items can be displayed on a first electronic device (e.g., via a content creation application) and the three-dimensional previews of the content items can be concurrently displayed at a second electronic device (e.g., via a three-dimensional graphic rendering application). In some embodiments, the processes of generating the three-dimensional preview of the content items described below can be performed by processors 218A, 218B of the devices 230 and 240.

Figure 3A:
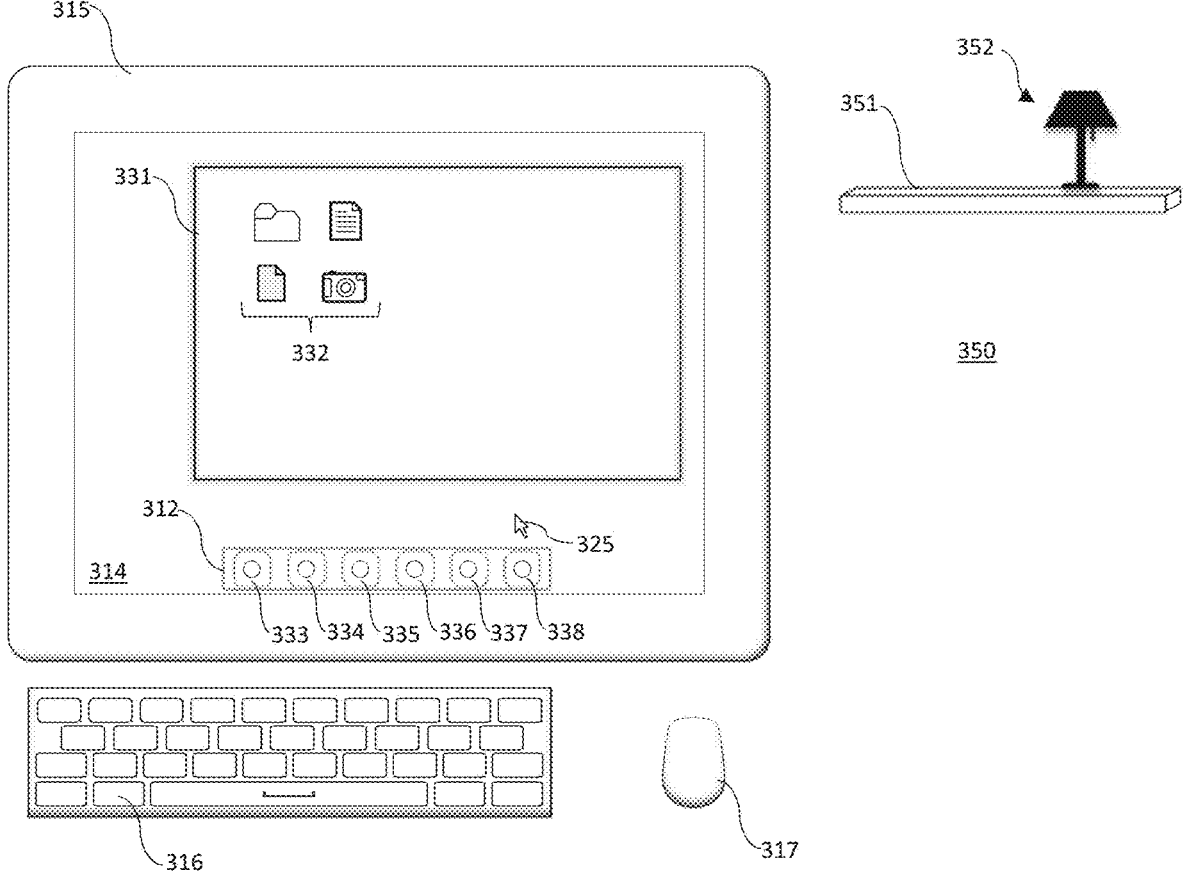
FIG. 3A illustrates an exemplary real-world environment including a first electronic device and one or more input devices according to some embodiments of the disclosure.

FIG. 3A illustrates an exemplary real-world environment 350 including a first electronic device 315, a first input device 316, and a second input device 317 according to some embodiments of the disclosure. The first electronic device 315 may be similar to device 100 or 230, and/or may be a tablet computing device, laptop computing device or desktop computing device, among other possible computing devices. FIG. 3A illustrates a real-world environment (e.g., a room) 350 including shelf 351 and lamp 352 disposed in a rear portion of the real-world environment 350, for example. In some embodiments, the electronic device 315 displays user interface 314 (e.g., displayed via display generation component 214A in FIG. 2). For example, the user interface 314 optionally includes a home screen (e.g., background desktop), one or more file or application windows 331, and/or one or more applications or files (e.g., represented by file or application icons or objects 332 and/or by icons 333-338 in dock 312) that are optionally running or configured to be run on the electronic device 315. As shown in the example of FIG. 3A, the application window 331 may be a folder holding one or more files/applications represented by objects 332, for example. It should be understood that the user interface elements (e.g., objects 332, icons 333-338 and/or application window 331) of FIG. 3A are merely representative, and that additional, fewer, or different user interface elements may be included within user interface 314. Additionally, the user interface elements may include additional or alternative visual characteristics (e.g., different shapes, objects, symbols, text, number and the like). For example, the application window 331 may represent any window corresponding to an application running on the electronic device 315 (e.g., a file manager application, a web browser application, a content creation application, a file viewer application, etc.) and configured to be displayed on the user interface 314. Additionally or alternatively, for example, the objects 332 and/or icons 333-338 may represent any object corresponding to data (e.g., data files, shortcuts, hyperlinks, images, photographs, etc.) stored on the electronic device 315 (e.g., stored in memory or memories 220A in FIG. 2).

In some embodiments, the first input device 316 and the second input device 317 are in communication with the electronic device 315. For example, the first input device 316 may be a wireless or wired keyboard and the second input device 317 may be a wireless or wired mouse, touchpad, etc., optionally configured to control a cursor 325 displayed within the user interface 314 of the electronic device 315 and/or selection by the cursor or another targeting mechanism. It should be understood that the input devices 316 and 317 of FIG. 3A are merely representative, and that additional, fewer, or different input devices may be in communication with the electronic device 315. In some embodiments, the first and the second input devices 316 and 317 may be integral to the first electronic device 315 (e.g., the first electronic device 315 is a laptop computer including a built int keyboard and trackpad). Additionally, as discussed herein, the first electronic device 315 may communicate with additional electronic devices.

In some embodiments, the user may perform one or more interactions with the user interface 314 of the electronic device 315. For example, as shown in FIG. 3A, the user may be interacting with one or more objects 332 within the application window 331 (e.g., opening, viewing, editing, etc. one or more files, images, videos, etc. in a corresponding application). In some embodiments, a respective object of the one or more objects 332 may be a graphical data file corresponding to three-dimensional data (e.g., describing a content item targeting a three-dimensional operating system (e.g., designed for presentation in a three-dimensional graphical environment)). In some embodiments, the first electronic device 315 is in communication with a second electronic device (e.g., corresponding to device 100 or 240) that is configured to generate and present a three-dimensional environment (e.g., an extended reality environment via a three-dimensional graphical rendering application (not shown) running on the second electronic device).

In some embodiments, it may be advantageous to provide a fully functional working environment in three-dimensions representative of interactions with the first electronic device in the real-world environment. Accordingly, providing an augmented representation of the user interface of the first electronic device in the three-dimensional may be particularly useful for interactions with the user interface of the first electronic device without the constraints of physical display of the first electronic device. For example, as described herein, the augmented device or augmented representation of the user interface of a device can provide for changing the size of the user interface beyond the dimensions of the physical display of the electronic device (e.g., enlarging the user interface or providing multiple regions for display of the user interface beyond the region corresponding to the display of the first electronic device). In some embodiments, it may be advantageous to present one or more objects (e.g., objects corresponding to three-dimensional graphical data) of the first electronic device 315 in three-dimensions. For example, two-dimensional content can be viewed or edited in three-dimensions, whereas the display of the first electronic device is limited to two-dimensions. For example, a user creating content for display in a three-dimensional environment may view the content in three-dimensions. In some embodiments, it may be advantageous to transfer data (e.g., move or copy one or more objects/data files) between the first electronic device 315 and the second electronic device, as described herein in more detail.

Figure 3B:
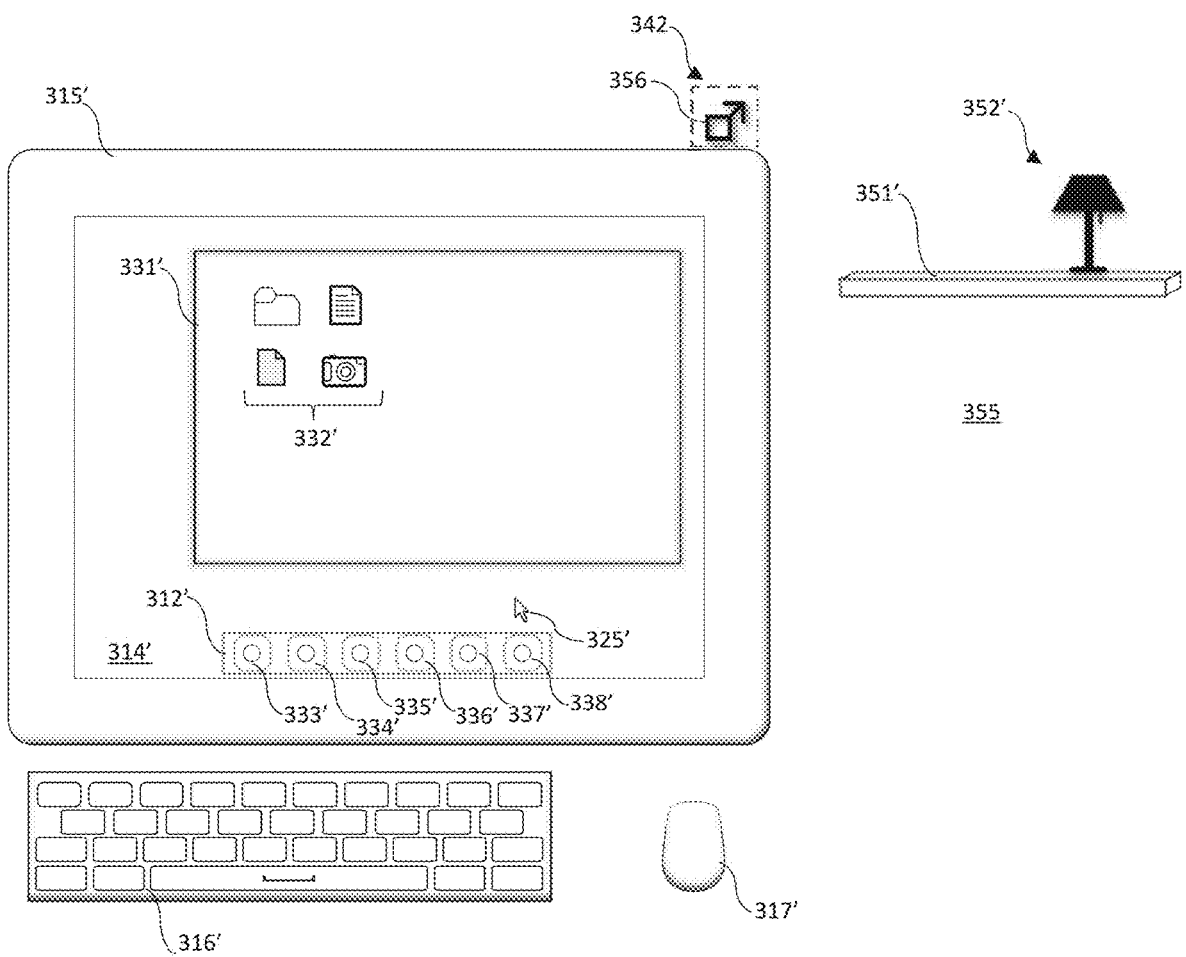
FIG. 3B illustrates an example of an extended reality environment presented to the user using a second electronic device according to embodiments of the disclosure.

FIG. 3B illustrates an example of an extended reality environment 355 presented to the user using a second electronic device (e.g., corresponding to electronic device 240 in FIG. 2) according to embodiments of the disclosure. As mentioned above, the first electronic device (e.g., first electronic device 315 in FIG. 3A) may communicate with the second electronic device. The first electronic device may communicate with the second electronic device via any suitable communication means, such as, for example, wire or cable transfer (e.g., universal serial bus), wireless transfer (e.g., Wi-Fi or Bluetooth®), etc., forming a communication channel. The second electronic device may refer to a head mountable system/device and/or projection-based system/ device (including a hologram-based system/device) config- ured to generate and present a three-dimensional environ- ment, such as, for example, heads-up displays (HUDs), head mounted displays (HMDs), windows having integrated dis- play capability, displays formed as lenses designed to be placed on a person's eyes (e.g., similar to contact lenses). In the example of FIG. 3B, the user is optionally wearing the second electronic device, such that the three-dimensional environment can be defined by X, Y and Z axes as viewed from a perspective of the second electronic device (e.g., a viewpoint associated with the second electronic device, which may be a head-mounted display, for example).

As shown in FIG. 3B, the three-dimensional computer- generated environment 355 can include a first electronic device 315 displaying the user interface 314 of FIG. 3A (or a representation of the first electronic device 315' and/or the user interface 314' of the first electronic device 315). The three-dimensional environment 355 may also include the user interface elements of the user interface 314 or a representation of the user interface elements of user inter- face 314 (e.g., optionally including representations of icons 333'-338', dock 312', application window 331', objects 332', and/or cursor 325'). Additionally or alternatively, the three- dimensional environment 355 includes the first and second input devices 316 and 317 (or a representation of the first and second input devices 316' and 317'). Although not shown in FIGS. 3A-3B, the first electronic device and the one or more input devices may be resting on a table (or a representation of the table) that can be presented in the environment. Additionally or alternatively, the three-dimen- sional environment 355 includes portions of the real-world environment 350 including a shelf 351 and a lamp 352 or representations of the shelf 351' and the lamp 352'. As used herein, particularly with reference to figures illustrating three-dimensional environments (e.g., FIGS. 3B-7B), refer- ences to three-dimensional representations of physical devices, user interfaces, and/or physical objects (e.g., denoted using apostrophe or double apostrophe) optionally refer to the physical devices, user interfaces displayed on physical devices and/or physical objects of the real-world environment represented in the three-dimensional environ- ment. For example, in some embodiments, the representa- tions may be a direct view of a physical object or device presented through a transparent display and/or a view of the physical object or device displayed using pass-through images or video.

In some embodiments, the three-dimensional environ- ment 355 includes a first affordance 356. In some embodi- ments, the first affordance 356 may be presented in prox- imity to an edge of the display of the first electronic device 315 (e.g., within a threshold distance of the edge of the display). For example, as shown in FIG. 3B, the first affordance 356 is presented above the first electronic device 315 or representation thereof (e.g., within a threshold dis- tance of a corner the first electronic device 315 or represen- tation thereof). In some embodiments, the first affordance 356 may be presented at a depth within the three-dimen- sional environment 355 such that it appears in the same plane as the display of the first electronic device 315 or representation thereof. It should be understood that the first affordance 356 may be positioned differently within the three-dimensional environment. For example, the first affor- dance 356 may be presented on, near, below or in front of the first electronic device 315 or representation thereof and/or at other locations (e.g., a predefined distance away from the second electronic device) within the three-dimensional envi- ronment 355, among other possibilities.

In some embodiments, the second electronic device may be configured to present the first affordance when one or more first criteria are satisfied. In some embodiments, in response to detecting the one or more first criteria are satisfied, the second electronic device presents the first affordance in the three-dimensional environment. In some embodiments, satisfying the one or more first criteria cor- responds to detecting the first electronic device 315 is in condition for displaying an augmented user interface. In some embodiments, the one or more first criteria can include a criterion that is satisfied when the first electronic device is detected by one or more sensors of the second electronic device (e.g., when the first electronic device is captured by one or more image sensors or cameras of the second electronic device). In some embodiments, the one or more first criteria include a criterion that is satisfied when the first electronic device is in communication with the second electronic device (e.g., a wired or wireless communication channel is established). In some embodiments, the one or more first criteria include a criterion that is satisfied when the first electronic device is displaying a user interface (e.g., user interface 314). In some embodiments, the one or more first criteria include a criterion that is satisfied when the first electronic device is a qualifying electronic device (e.g., some electronic devices may have capability for operating in the context of an augmented device, but other electronic devices may not). In some embodiments, the one or more first criteria include a criterion that is satisfied when the first and second electronic devices are authorized to share infor- mation (e.g., privacy settings, user information, user data, etc.). In some embodiments, some or all of the above criteria must be satisfied for the second electronic device before the first affordance is displayed.

In some embodiments, the first affordance 356 is select- able to launch an augmented representation of the first electronic device. For example, as shown in FIG. 3B, the user may select (directly or indirectly) the first affordance 356, as represented by selection 342. For example, the user's fingers/hands may be tracked using hand tracking sensors, and a direct input using the hand can actuate the first affordance (e.g., touching, tapping, or pinching and releasing). As another example, a user may target the first affordance using gaze tracked using eye tracking sensors, and a selection input using the hands (e.g., a pinch and release or other gesture) or other selection inputs can actuate the first affordance. In some embodiments, the first or second input devices 316 and 317 can be used to actuate the first affordance (e.g., clicking with mouse, keyboard shortcut, etc.).

Figure 3C:
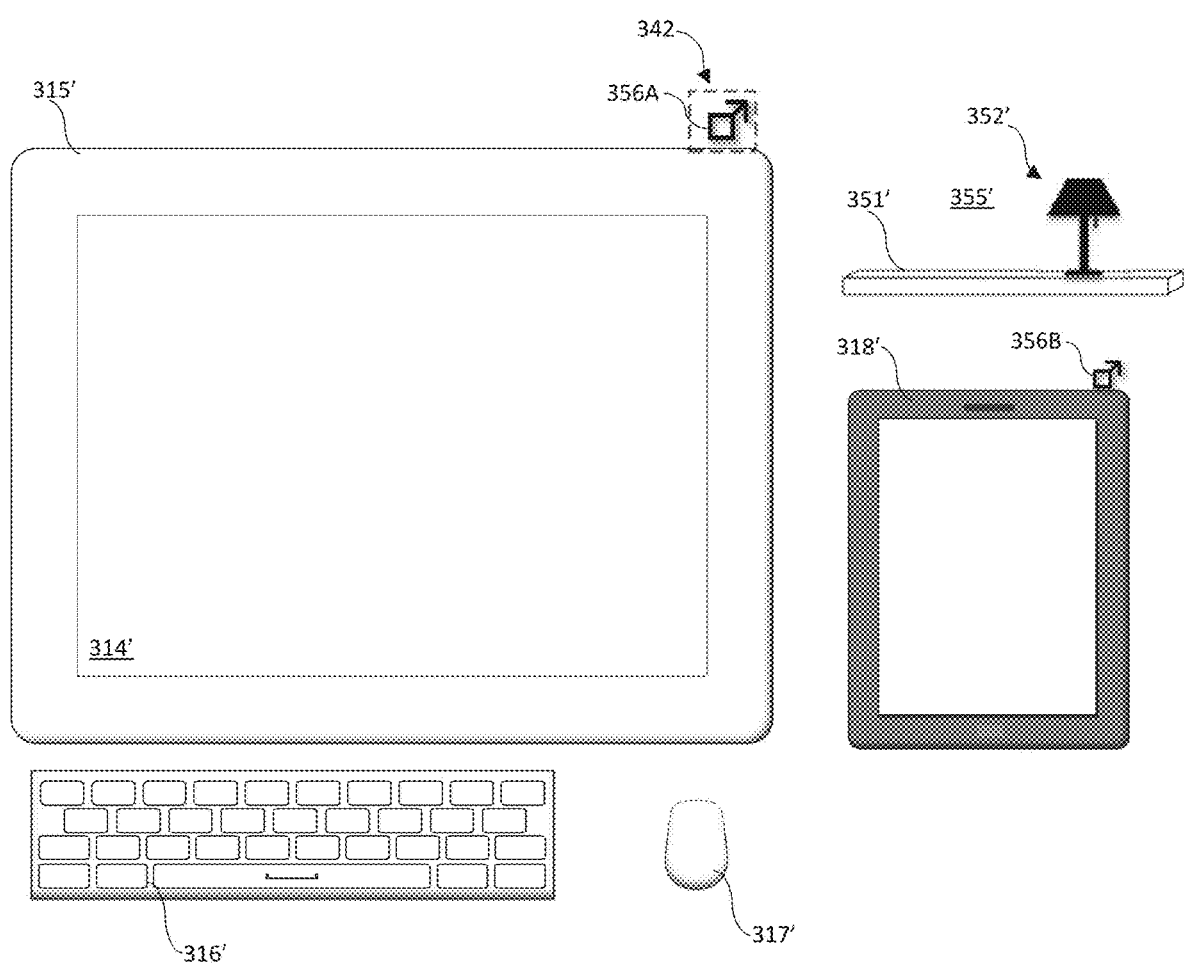
FIG. 3C illustrates another example of an extended reality environment presented to the user using a second electronic device according to embodiments of the disclosure.

FIG. 3C illustrates another example of an extended reality environment 355' presented to the user using a second electronic device (e.g., corresponding to electronic device 240 in FIG. 2) according to embodiments of the disclosure. As discussed above with reference to FIG. 3B, the first affordance 356 is optionally presented within the three-dimensional environment 355 in accordance with detection of a first electronic device 315 in condition for presentation of an augmented user interface (e.g., when one or more first criteria are satisfied). In some embodiments, the second electronic device may be configured to detect more than one electronic device at a time (e.g., during one or more scans of the real-world environment 350 using image sensors 206). For example, as shown in FIG. 3C, the real-world environment optionally includes a third electronic device (e.g., corresponding to representation 318'), which may be a tablet computer, in communication with the second electronic device and/or the first electronic device 315. Accordingly, the three-dimensional environment 355 includes presenting the third electronic device (or displaying the representation of the third electronic device 318'), for example. In some embodiments, the third electronic device is optionally functioning as a secondary display for the first electronic device 315. In some embodiments, the third electronic device is optionally a third input device for the first electronic device 315.

In some embodiments, as shown in the example of FIG. 3C, when the one or more first criteria are satisfied for the first electronic device 315, the first affordance 356A is displayed for the first electronic device as described with reference to FIG. 3B. In some embodiments, as shown in the example of FIG. 3C, when one or more second criteria are satisfied for the third electronic device, the second affordance 356B is displayed for the third electronic device. It should be understood that, in some embodiments, the first criteria and the second criteria may be the same. As shown in FIG. 3C, the representation of the first electronic device 315' and the representation of the third electronic device 318' are presented with affordances 356A and 356B that are selectable (using direct or indirect selection) to launch augmented devices having user interfaces corresponding to those of the first electronic device 315 and the third electronic device, respectively, within the three-dimensional environment 355. In some embodiments, when the third electronic device functions as an extended display for the first electronic device 315, selection of the affordance 356A or 356B launches the augmented representations of both the first electronic device 315 and the third electronic device.

Although FIGS. 3B-3C illustrate electronic devices with visible displays, it is understood that, in some embodiments, the affordance for launching an augmented device user interface can be used even without a visible display or without a user interface displayed on the display of the electronic device. In some embodiments, the display of the first electronic device may not be visible because the user of the second electronic device is viewing the first electronic device from a perspective in which the display is not visible. In some embodiments, the display of the first electronic device may not be visible because the display is occluded by another object (e.g., a laptop is closed, the screen is covered, etc.). In some embodiments, the display and/or the first electronic device may not be displaying the user interface in a given state. For example, in a low-power or off state, in a shut-off state, in sleep state, in a locked-screen state, etc., the user interface (e.g., user interface 314) of the first electronic device 315 is not visible in the real-world environment. In some embodiments, the first electronic device 315 may not include a display (e.g., a computer tower with no attached monitor). In some such embodiments, the second electronic device is optionally configured to present the first affordance for launching the augmented representation of the first electronic device 315', despite the real-world user interface (s) of the first electronic device 315 not being visible, for example. In such some embodiments, data communicated along the communication channel between the second electronic device and the first electronic device 315 is optionally synchronized so that the second electronic device can present the user interface of the first electronic devices (e.g., whether augmented or not). In some embodiments, the second electronic device is configured to access data corresponding to (e.g., data defining/describing an appearance of) a user interface of the first electronic device (including one or more user interface elements of the user interface) and one or more objects (e.g., applications, files, images, etc.) of the first electronic device. When the user selects (e.g., directly or indirectly selects) the first affordance 356A, as represented by selection 342 in FIG. 3C, the second electronic device may utilize the data corresponding to the user interface(s) and the one or more objects to generate and present an augmented representation of the user interface of the first electronic device (e.g., optionally including a user interface that would be presented on the first electronic device in the real-world environment).

Figure 3D:
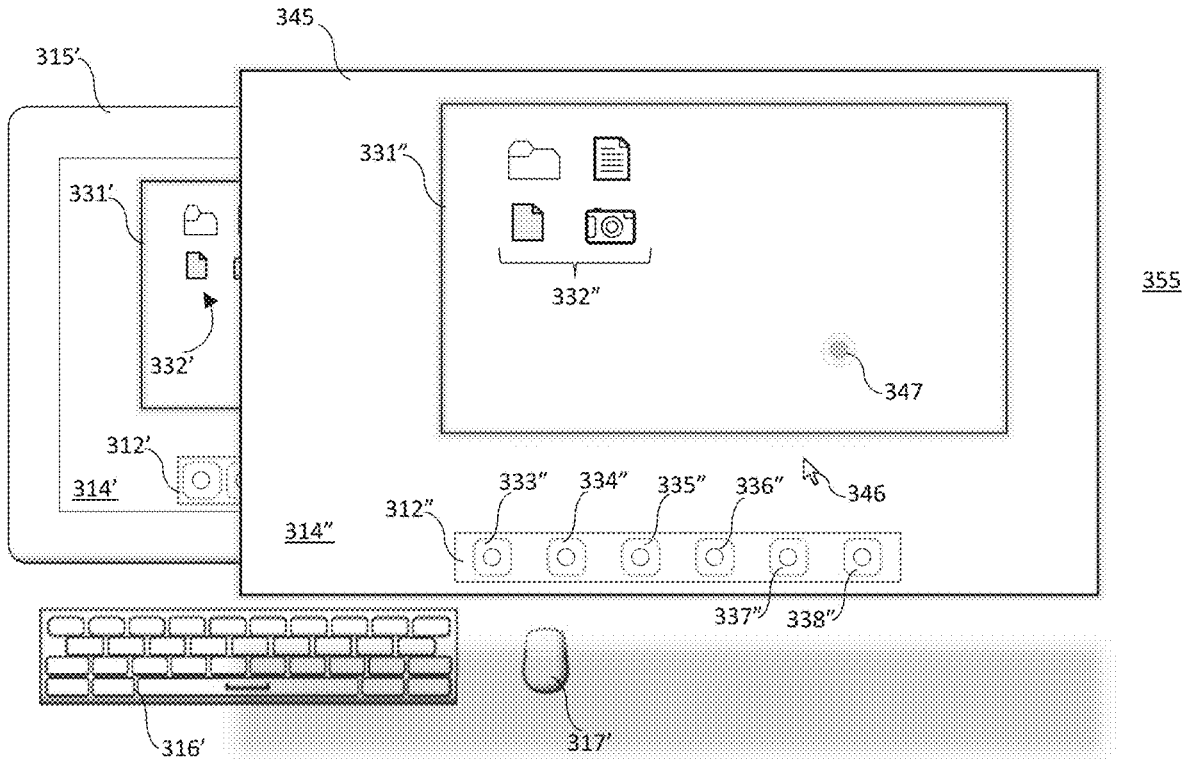
FIG. 3D illustrates an example augmented device corresponding to the first electronic device presented to the user using the second electronic device according to embodiments of the disclosure.

FIG. 3D illustrates an augmented device 345 (augmented representation of a first electronic device 315) corresponding to the representation of first electronic device 315' presented to the user using the second electronic device according to embodiments of the disclosure. As discussed herein, in some embodiments, the augmented device ("augmented device," "augmented representation of the first electronic device") 345 of FIG. 3D is presented within the three-dimensional environment 355 in response to selection of the first affordance 356, 356A. As shown in FIG. 3D, in some embodiments, the augmented device 345 is optionally presented in front of the representation of first electronic device 315'. Although the representation of first electronic device 315' is partially visible in the example of FIG. 3D, it should be understood that, in some embodiments, the augmented device 345 may be presented within the three-dimensional environment 355 to entirely occlude the display of the representation of first electronic device 315' (e.g., such that the display of the representation of first electronic device 315' is optionally no longer visible). In other words, in some embodiments, the position of the display of the augmented device is co-located with the display in the real-world environment. In some embodiments, augmented device 345 may not occlude the representation of first electronic device 315'. In some embodiments, the size of the augmented user interface is equivalent to the size of the display of the first electronic device 315. In some embodiments, the size of the augmented user interface is equivalent to the size of the display of the first electronic device 315 and the bezel areas around the display (e.g., expanding the size of the augmented user interface slightly beyond the dimensions of the real-world display, but constraining the size of the augmented user interface to the dimensions of the first electronic device. In some embodiments, as described herein, the size of the augmented user interface is greater than the size of the first electronic device.

As shown in FIG. 3D, in some embodiments, the second electronic device may utilize data corresponding to the user interface 314 of the first electronic device 315 to generate the augmented device 345, such that a user interface 314" ("user interface," "augmented user interface," "virtual user interface") of the augmented device 345 optionally possesses the same or a similar appearance as the user interface 314 configured to be displayed on the first electronic device 315, for example. In some embodiments, the appearances of the augmented user interface 314" of the augmented device 345 and the user interface of the first electronic device are optionally different, as discussed in more detail with reference to FIG. 3E, for example. As shown in FIG. 3D, the user interface 314" of the augmented device 345 is optionally a three-dimensional rendering of the real-world user interface 314 of the first electronic device 315, such that the user interface 314" comprises some or all of the user interface elements and/or objects of the real-world user interface of the first electronic device. For example, the user interface 314", which may include a home screen of the augmented device 345, optionally comprises augmented (e.g., virtual) representations of the application window 331" (e.g., corresponding to the application window 331'), the one or more objects 332" (e.g., corresponding to the one or more objects 332'), the icons 333"-339" (e.g., corresponding to the icons 333'), and the dock 312" (e.g., corresponding to the dock 312'). As discussed herein, in some embodiments, user interactions with one or more virtual user interface elements and/or virtual objects of the augmented device 345 optionally cause corresponding interactions to occur as interactions with one or more corresponding user interface elements and/or corresponding objects of the real-world first electronic device 315, for example.

As shown in FIG. 3D, the user interface 314" of the augmented device 345 may further comprise a (virtual) cursor 346, which optionally corresponds to real-world cursor (e.g., 325) of the first electronic device. As discussed herein, the cursor 346 is optionally controllable by the second input device 317, such that input received at the second input device (e.g., clicks/taps, movement, etc.) influences the cursor 346 displayed in the user interface of the augmented device 345. As discussed herein, the cursor 346 is optionally controllable to interact with one or more user interface elements and/or objects within the augmented user interface 314" (e.g., controllable to move/drag one or more objects, icons and/or application windows within the user interface 314"). In some embodiments, movement of the cursor is optionally bounded by the boundaries of the user interface 314" of the augmented device 345. For example, as the cursor 346 is moved within the user interface 314" of the augmented device 345, if the cursor 346 is moved to a boundary of the user interface 314", movement of the cursor beyond the boundary is optionally prevented, such that cursor 346 is displayed at the boundary as the second input device 317 controlling the cursor 346 is moved in a direction beyond the boundary, as discussed in more detail with reference to FIGS. 6A-6D.

As shown in FIG. 3D, the user interface 314" of the augmented device 345 is optionally provided with a representation of the user's gaze 347 (e.g., the viewpoint associated with the eyes of the user of the second electronic device). In some embodiments, the gaze of the user can be represented within the three-dimensional environment 355 to assist the user with accurately and precisely focusing on one element within the augmented user interface 314" of the augmented device 345. In some embodiments, the gaze can be represented in a similar manner as a cursor (e.g., a dot or other shape, as shown in FIG. 3D). In some embodiments, the gaze of the user may not be visually represented in three-dimensional environment 355. In some embodiments, the user's gaze may be indicated by changing the appearance of a user interface element, object or affordance within the three-dimensional environment 355 that currently has focus (e.g., brightening, highlighting, enlarging, etc. the user interface element, object or affordance that has current focus from the user's eyes), without otherwise representing gaze (e.g., there may be no indication of gaze when a user looks at window 331" without a user focusing on specific objects 332"). As discussed herein, the cursor input received at the first electronic device 315 (e.g., via the second input device 317) may be integrated with gaze input received at the second electronic device (e.g., via eye tracking sensors 212) to improve user interactions with a real-world electronic device and to thus advantageously allow for seamless control and interaction with the augmented device 345.

In some embodiments, presenting of the augmented device 345 optionally causes the display of the first electronic device 315 to power down in the real-world environment. For example, in other words, launching of the augmented device 345 optionally causes the user interface 314 of the first electronic device 315 to cease being displayed within the real-world environment 350 and thus the three-dimensional environment 355. In some embodiments, the augmented device 345 is optionally configurable to operate in a low-power state (e.g., because the second electronic device is configurable to operate in a low-power state). In some such embodiments, for example, the display of the first electronic device 315 is powered down and/or the augmented device 345 optionally updates over fewer operating intervals to save battery power of the second electronic device.

Figure 3E:
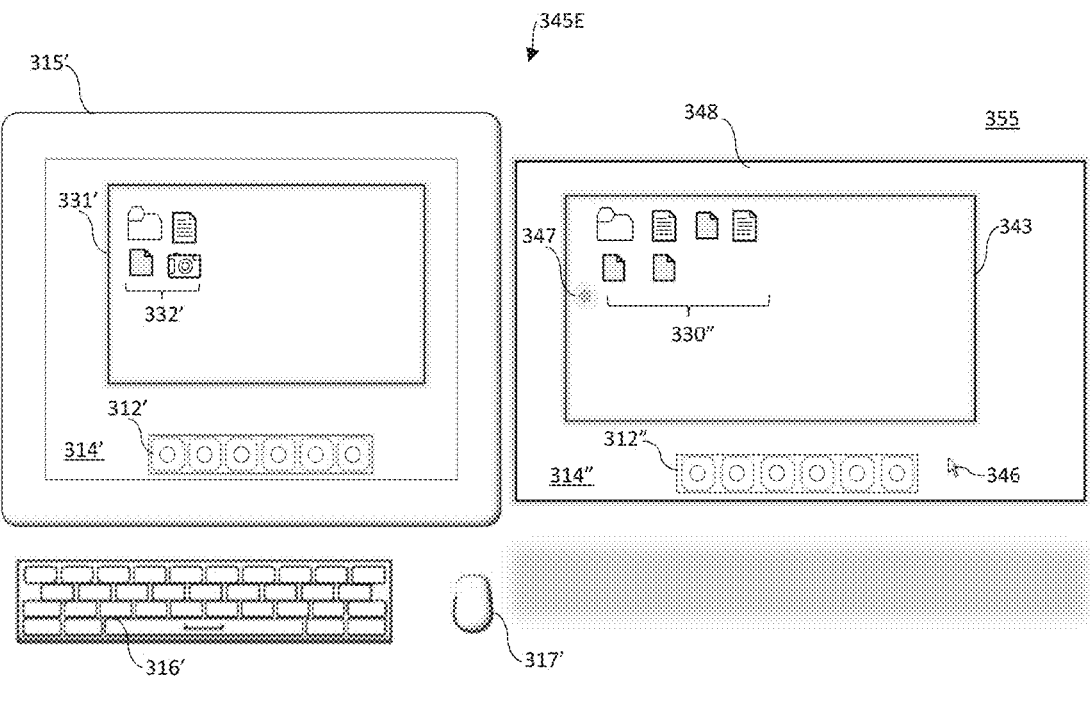
FIG. 3E illustrates an example augmented device including an extended display presented to the user using the second electronic device according to embodiments of the disclosure.

In some embodiments, the augmented representation of the first electronic device includes a virtual user interface element (e.g., a window, pane, container, etc.) representing an extension of the display of the first electronic device. In some embodiments, the virtual user interface element is presented concurrently with the display of the first electronic device (or a representation of the display of the first electronic device). In some embodiments, a portion of the user interfaces (e.g., a first application) can be presented in a virtual user interface element (e.g., a window) of the augmented device and a portion of the user interfaces (e.g., a second application) can be presented in a representation of the display of the first electronic device. FIG. 3E illustrates an augmented device 345E including an extended display presented to the user using the second electronic device according to embodiments of the disclosure. In some embodiments, as shown in FIG. 3E, selection of the first affordance (e.g., selection of affordance 356 or 356A/356B) causes presentation of the augmented device 345E within the three-dimensional environment 355. The augmented device 345E includes an extension 348 of the display adjacent to the display of the representation of first electronic device 315', for example. Although the representation of first electronic device 315' appears the same in FIG. 3E as in FIG. 3B, it should be understood that, in some embodiments, the first electronic device 315' in the augmented device 345 has an appearance like augmented device 345E in FIG. 3D. In some embodiments, the augmented representation of the first electronic device includes presenting extension 348 of the display as a virtual user interface element (e.g., a window, pane, container, etc.), and presented concurrently with the display of the first electronic device. In some embodiments, a portion of the user interface of the real-world first electronic device can be presented in the virtual user interface element of extension 348 and a portion of the user interfaces can be presented in a representation of the display of the first electronic device 315'. For example, although FIG. 3E includes window 331' and objects 332' in the representation of the display of the first electronic device, extension 348 can include another window 343 with additional objects/icons 330" or representing a different application running on the first electronic device that may not have been visible on the display of the first electronic device (e.g., minimized or occluded on the display of the first electronic device). In some embodiments, dock 312" in extension 348 includes the same user interface elements as dock 312'. In some embodiments, dock 312" in extension 348 includes different user interface elements as dock 312'. In some embodiments, dock 312" in extension 348 and dock 312' share some user interface elements and have some different user interface elements.

In some embodiments, the user may select among different manifestations of an augmented device. For example, the user may select whether to launch an augmented device with one display (e.g., optionally enlarged compared with the physical display of the first electronic device in the real-world), whether to launch an augmented device with an extended display, or whether to launch a different type of augmented display. In some embodiments, upon selection of the first affordance 356, 356A, a menu comprising a plurality of configuration options may be presented to the user allowing the user to configure the augmented device. For example, the menu may provide the user with a first option for launching the augmented device 345 as a representation of the first electronic device 315' (e.g., as shown in FIG. 3D), a second option for launching the augmented device 345E as an extended display of the first electronic device 315' (e.g., as shown in FIG. 3E), among other possibilities. In some embodiments, additional options can be presented in the menu in which the extended display appears along a different edge of the display of the first electronic device (e.g., above, on the left side, etc.). In some embodiments, another option can be presenting the augmented device including a mirrored display (e.g., the contents of the user interface 314' of the first electronic device 315' are duplicated and displayed in the augmented user interface 314" of the augmented device. The user may then select a respective option (e.g., directly or indirectly) from the menu which optionally dictates the mode of operation of the augmented device 345 presented within the three-dimensional environment 355.

As shown in FIG. 3E, in some embodiments, while the augmented device 345E includes an extended display 348, the cursor 346, which is optionally controllable by the second input device 317, may be displayed within the user interface 314" of the extended display 348. As discussed in more detail with reference to FIGS. 7A-7B, because the augmented device 345E in the example of FIG. 3E includes an extended display (e.g., as a second, virtual display device for the first electronic device 315'), the cursor 346 is controllable by the second input device 317 to be movable between the two user interfaces 314' and 314" of the augmented device 345E, for example. Additionally, in some embodiments, the cursor 346 is controllable by the second input device 317 to move one or more objects (e.g., objects 332') and/or application windows (e.g., application window 331' or window 343) between the user interfaces 314' and 314" of the augmented device 345.

Figure 3F:
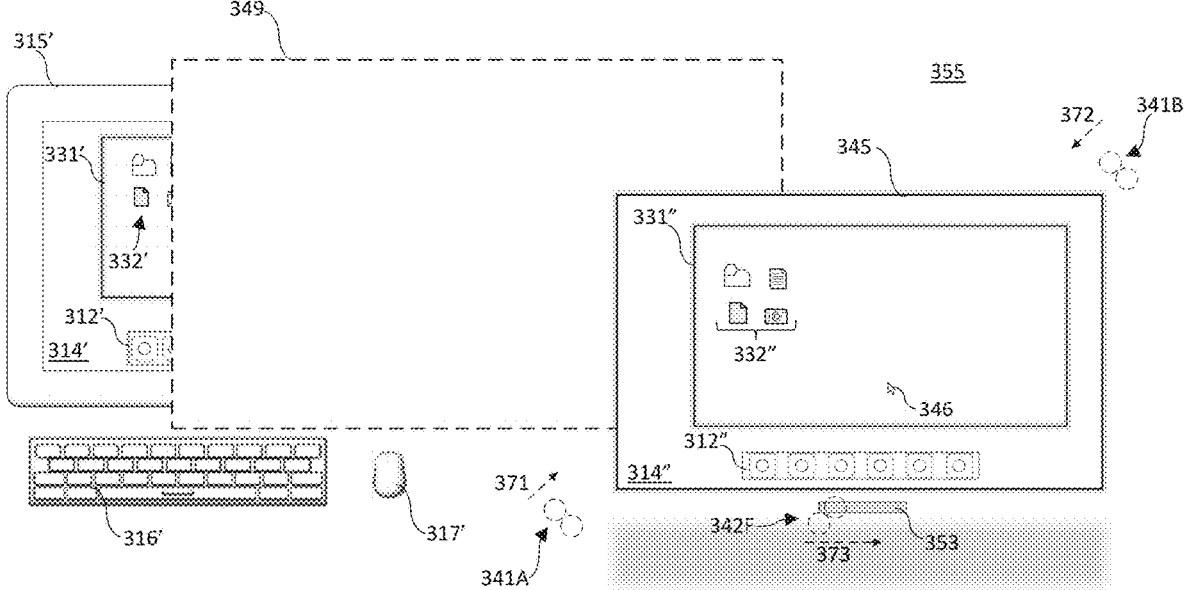
FIG. 3F illustrates example user interactions with the augmented device within the extended reality environment according to embodiments of the disclosure.

As described herein, in some embodiments, a user may interact with the augmented device to modify characteristics of the virtual displays of the augmented device. FIG. 3F illustrates exemplary user interactions with the augmented device 345 within the extended reality environment 355 according to embodiments of the disclosure. In some embodiments, as shown in the example of FIG. 3F, the augmented device 345 of FIG. 3D is optionally movable within the three-dimensional environment 355. For example, in some embodiments, the augmented device 345 may be repositioned within the three-dimensional environment 355 using a direct or indirect manipulation (e.g., a gaze and pinch (e.g., using two fingers)) of a handle affordance displayed for one or more augmented device displays. For example, the user may desire to move the augmented device 345 presented in FIG. 3D to a different position in the environment (e.g., to a different position on a desk, to a different surface within the user's real-world environment, etc.). In some embodiments, the augmented device 345 may include a handle 353, optionally disposed below the augmented device 345, as shown in the example of FIG. 3F. It should be understood that the handle 353 may be alternatively disposed at or in other areas, such as, for example, above the augmented device 345, along a different edge of the augmented device 345, vertically to a side of the augmented device 345, etc. In some embodiments, an edge of the augmented device 345 can behave as a handle affordance (e.g., directly or indirectly selecting the edge rather than affordance 353).

In some embodiments, the user may provide a pinch input at or while targeting the handle 353 with gaze, as shown by pinch 342F, corresponding to a selection/gripping of the handle 353, as an example. Movement of the hand while maintaining the selection (e.g., while holding the pinch) can cause movement of the augmented device 345 in accordance with the movement of the hand. In some embodiments, the appearance of the handle 353 may change when selected. For example, in response to the input corresponding to a selection/gripping of the handle 353, the handle 353 may become highlighted, indicating to the user that the augmented device 345 may be moved. As shown in the example of FIG. 3F, while gripping/holding the handle 353, the user may reposition the augmented device 345 within the three-dimensional environment 468 (e.g., relative to the position of the augmented device in FIG. 3D, represented by 349 in FIG. 3F), as shown by dashed arrow 373 and as shown by the new position of the augmented device relative to the initial position. The user interface 314" and its contents are moved with the augmented device 345 in accordance with the input moving the handle 353. Thus, the user may move the augmented device 345 and the various elements of the augmented user interface 314" within the three-dimensional environment 355 by selecting and moving the handle 353. In some embodiments, releasing the pinch can cause the augmented device 345 to be released (e.g., ceases movement in accordance with movement of the hand). In some embodiments, after the user is done moving the augmented device 345 (e.g., after the pinch input 342F is released, ceasing selection of the handle 353), the handle 353 may return to its original appearance prior to selection (e.g., cease to be highlighted). In some embodiments, the handle 353 may cease to be displayed within the three-dimensional environment 355 after release of the pinch input 342F.

Although FIG. 3F illustrates movement of the augmented device of FIG. 3D, in some embodiments, the augmented device cannot be moved in a manner that causes display of the real-world first electronic device. For example, the movement of the augmented device may be limited to avoid confusion of displaying two instances of the same user interface or to avoid the user unintentionally physically contacting the first electronic device when the augmented device is not collocated with the first electronic device in the three-dimensional environment. Additionally or alternatively, although FIG. 3F illustrates movement of the augmented device of FIG. 3D, in some embodiments, similar inputs can be used to move the augmented device 345E of FIG. 3E. In some embodiments, similar inputs can be used to move the extended display of FIG. 3E relative to the display of first electronic device. For example, the input can be used to move the extended display 348 from the right side of the representation of electronic device 315' to the left side (or top side) of the representation of electronic device 315', without moving the representation of the first electronic device 315').

In some embodiments, the user may change the size of the display of an augmented device 345 within the three-dimensional environment 355. Increasing the size, for example, can provide additional area to display additional or alternative features of one or more elements displayed within the augmented user interface. In some embodiments, for example, the user may change the size of the augmented device 345 to change a size of the user interface 314" (e.g., to enlarge the user interface corresponding to the enlarged display dimensions of the augmented device). In some embodiments, the user may increase or decrease the size of the augmented device 345 via eye gaze and/or using hand/finger manipulations. For example, as shown in the example of FIG. 3F, a user's gaze may target the augmented device 345 (e.g., gazing at a respective location within the augmented user interface 314") and the user may perform a hand operation to expand or shrink the augmented device 345. The hand operation can include pinching two fingers of a first hand and pinching two fingers of a second hand and moving the two hands closer together or further apart while holding the pinching of both hands. The direction of the motion can determine whether to increase or decrease the size of the augmented device 345. In some embodiments, moving of the hands together (decreasing the distance between the pairs of pinched fingers, as indicated by arrows 371 and 372) decreases the size of the augmented device 345. For example, as shown in FIG. 3F, the augmented device 345 is shown decreased in size relative to a size of dashed rectangle 349 (e.g., relative to the size of the augmented device shown in FIG. 3D). In some embodiments, moving of the hands apart (increasing the distance between the pairs of pinched fingers) increases the size of the augmented device 345. In some embodiments, an amount of change in size of the augmented device 345 is a function (linear or non-linear) of the amount of change in distance between the two hands. In some embodiments, to expand or shrink the size of the augmented device 345, the pinching with two fingers begins at opposite sides of the device 345, as shown by pinch inputs 341A and 341B. In some embodiments, the pinching of fingers of both hands must occur within a threshold period of time. In some embodiments, direct interaction of pinching two corners can be used in a similar manner to change the size of the augmented device.

As shown in the example of FIG. 3F, in some embodiments, changing the size of the augmented device 345 changes the size of the augmented user interface 314" including the one or more objects 332", the application window 331" and the dock 312". In this way, a scaling of the augmented device 345 causes the scaling of other elements within the augmented device 345, which maintains consistency between the size of the augmented device 345 and the size of the augmented user interface 314", which could otherwise interfere with the visibility of the elements displayed in the augmented user interface 314" (e.g., if the application window 331" did not shrink) and/or of the ability to interact with the elements (e.g., move one or more objects 332", which may be difficult to do when the size and/or position of the one or more objects changes). It should be noted that, in some embodiments, increases or decreases in the size of the augmented device 345, and thus increases or decreases in the size of the elements of the augmented user interface 314", presented at the second electronic device, is not received or construed as being an input corresponding to a request to edit or modify the actual size of the corresponding elements at the first electronic device 315'. For example, while the application window 331" may be increased or decreased in size in accordance with an increase or decrease in size of the augmented window 335, the corresponding real-world application window (e.g., 331) displayed on the first electronic device remains unchanged (e.g., the size of the application window does not increase or decrease). In some embodiments, however, the size of the corresponding elements at the first electronic device may change in size, and optionally the amount of change in size may be scaled down (e.g., according to the ratio of size between the elements of the real-world user interface (e.g., 314) and the elements of the augmented user interface 314" in the three-dimensional environment).

In some embodiments, as shown in the example of FIG. 3F, changes to the size of the augmented device 345, including changes to the sizes of the augmented user interface 314" including the one or more objects 332", the application window 331" and the dock 312", are optionally constrained when there is only one augmented device 345 presented using the second electronic device. For example, input directed to decreasing a size of the augmented device when there is only a single augmented device user interface 314" (e.g., there is not extended display 348 of FIG. 3E) is optionally constrained by the physical display size (e.g., the size of the user interface 314') of the first electronic device 315'. In other words, in some embodiments, the size of the display of the augmented device 345 optionally cannot be decreased to a size smaller than the display of the first electronic device 315'.

In some embodiments, the above principles optionally apply to changes in size of the extended display 348 of the augmented device 345E of FIG. 3E. For example, input directed to decreasing a size of the extended display 348 of the augmented device 345E is optionally constrained by the physical display size (e.g., the size of the user interface 314') of the first electronic device 315'. In other words, in some embodiments, the size of the display of the extended display 348 optionally cannot be decreased to a size smaller than the display of the first electronic device 315'.

Figure 3G:
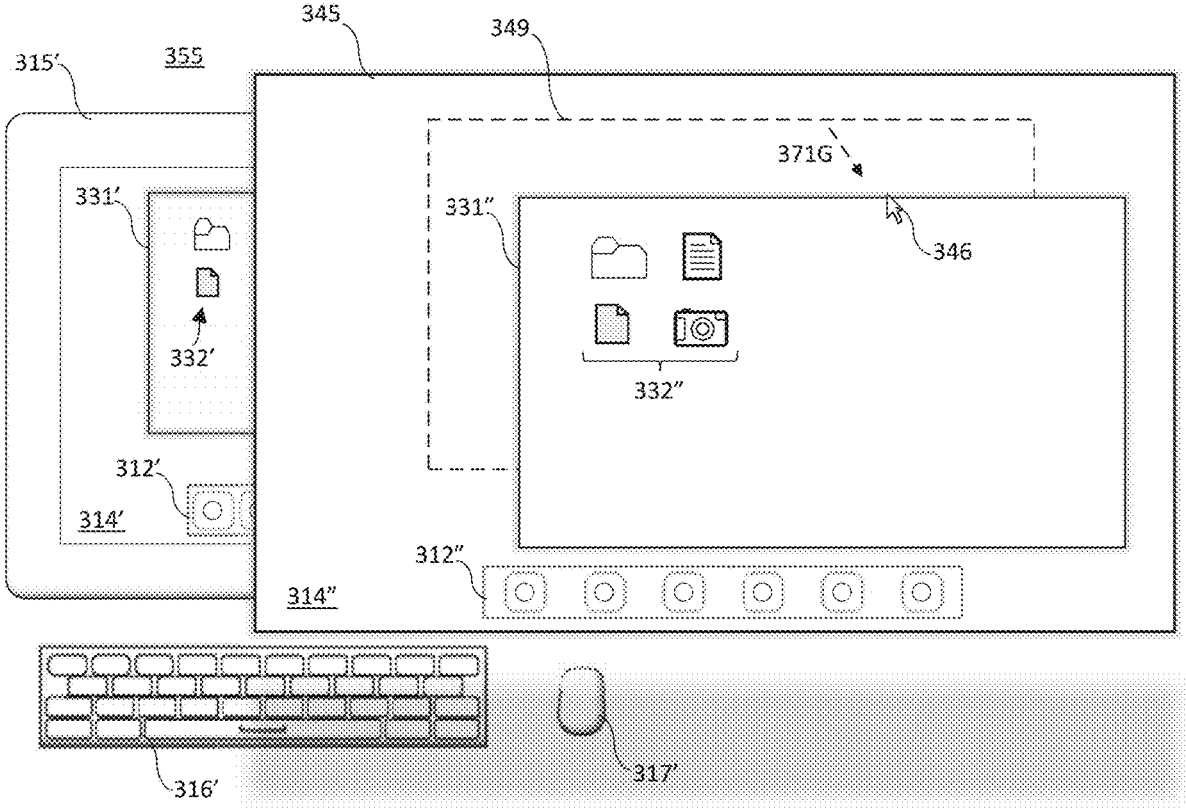
FIG. 3G illustrates an example user interaction with one or more user interface elements of the augmented device according to embodiments of the disclosure.

FIG. 3G illustrates an example user interaction with one or more user interface elements of the augmented device 345 according to embodiments of the disclosure. In some embodiments, the user may interact with one or more elements of the augmented user interface 314" using the cursor 346, which is optionally controllable by the second input device 317. As shown in the example of FIG. 3G, in some embodiments, the user can use the cursor 346 (e.g., via click and drag input received at the second input device 317) to move one or more elements within the augmented user interface 314". For example, the user can select the first application window 331" using the cursor 346 and reposition the first application window 331" within the augmented user interface 314″ of the augmented device 345 by dragging the first application window 331″, as represented by dashed arrow 371G. The user can then release selection of the first application window 331″ (e.g., release click input at the second input device 317) to drop the first application window 331″ at the new position within the augmented user interface with respect to the position indicated by 349, for example.

In some embodiments, the user can, using the cursor 346, select and move one or more of the objects 332″ within the augmented user interface 314″ (e.g., reposition one or more of the objects to a location outside of the first application window 331″). In some embodiments, movement of one or more elements of the augmented user interface 314″ optionally causes a corresponding repositioning of one or more elements of the real-world user interface of the first electronic device. For example, a repositioning of the first application window 331″ may cause a repositioning of the corresponding application window at the first electronic device in real time (e.g., within a threshold amount of time) in accordance with the repositioning at the augmented device 345. As another example, a movement of one or more objects 332″ from the first application window 331″ to another location within the augmented device 345 (e.g., to the home screen or to another application window) may cause a movement of the corresponding one or more objects to another location at the first electronic device in real time (e.g., within a threshold amount of time) in accordance with the movement at the augmented device 345.

In some embodiments, the use of the cursor 346 to target and change the size of a specific element (e.g., click and drag to expand a window size) within the augmented user interface 314″ optionally does not cause the change in size to be applied to all elements of the augmented user interface 314″. For example, a click and drag of a corner of the first application window 331″ in the augmented user interface 314″ to increase or decrease the size of the first application window 331″ does not cause the sizes of the one or more objects 332″ within the first application window 331″ to increase or decrease in size as well. In some embodiments, for example, an increase or decrease in size of one element within the augmented user interface 314″ optionally causes the change in size to be applied to the corresponding element within the real-world user interface of the first electronic device in real-time (e.g., within a threshold amount of time, such as 50 ms).

As described herein, a transfer of files between a first electronic device and a second electronic device may be provided using inputs to the first and/or second electronic devices. In some embodiments, the functionality for transferring files between the two electronic devices can be enabled during display of the augmented device as described with respect to FIGS. 3A-3G. In some embodiments, the functionality for transferring files between the two electronic devices can be enabled while presenting the representation of the first electronic device without presenting an augmented device. It may be advantageous for the user to view the exchange of files between the first electronic device (optionally via the augmented device 345) and the second electronic device within an extended reality environment. As discussed below, various methodologies are provided for interacting with and manipulating one or more elements of the user interface of the first electronic device (e.g., optionally of the augmented user interface of the augmented device), and for exchanging data between the first electronic device and the second electronic device in the three-dimensional environment.

FIGS. 4A-4D illustrate example user interactions of moving an object from an application window 448 running on the second electronic device to a first device (e.g., the augmented device 445) according to embodiments of the disclosure. Although primarily described with reference to FIGS. 4A-4D as interactions with an augmented device, it is understood that the interactions can be similarly made with the representation of the first electronic device (e.g., without an augmented device) in some embodiments.

FIGS. 4A-4D illustrates a three-dimensional environment 455 presented using a second electronic device. In some embodiments, three-dimensional environment 455 includes an augmented device 445 concurrently presented with one or more additional user interfaces outside of the augmented device. Additionally or alternatively, input devices 416 and 417 (or representations thereof) may be concurrently presented in the three-dimensional environment 455 with the augmented device 445 and/or additional user interfaces outside of the augmented device. For example, the one or more user interfaces can include one or more windows, such as application window 448. The application window 448, which may optionally be a file manager application, includes a representation of a first file 461 and a representation of a second file 462. Files 461 and 462 can correspond to files stored in memory at the second electronic device (e.g., stored in memory or memories 220B). The augmented device 445 can include user interface 414″ (e.g., corresponding to user interface 314″). User interface 414″ can include a home screen application window 431″ (e.g., corresponding to the application window 331″), the one or more objects 432″ (e.g., corresponding to the one or more objects 332″), and the dock 412″ (e.g., corresponding to the dock 312″).

As discussed herein, it should be understood that, in some embodiments, objects displayed within the three-dimensional environment (e.g., representations of files, images, applications, etc.) represent real-world object data stored (e.g., in memory) on the first electronic device and/or the second electronic device. For example, objects displayed within an application window running on the second electronic device (e.g., displayed within the second application window) optionally correspond to real-world files, images, applications, etc. stored in memory on the second electronic device. As another example, objects displayed within the augmented user interface or within an application window displayed on the augmented user interface optionally correspond to real-world files, images, applications, etc. stored in memory on the first electronic device.

Figures 4A, 4B:
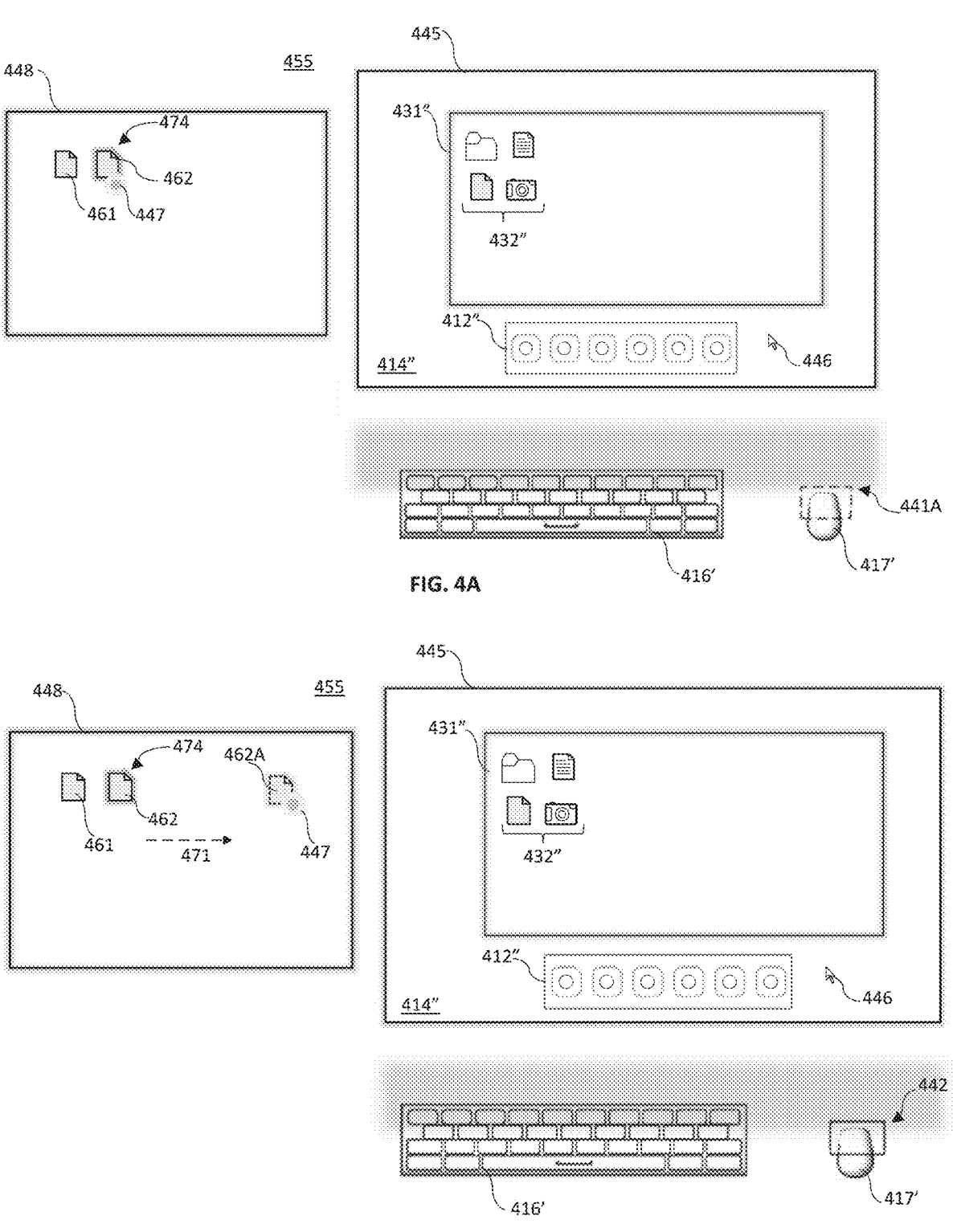
FIGS. 4A-4D illustrate example user interactions of moving an object from an application window running on the second electronic device to a first electronic device (e.g., an augmented device) according to embodiments of the disclosure.

Attention is now directed to methodology for transferring data corresponding to the second file 462 from the second electronic device to the first electronic device via interactions directed to the augmented device 445 in the three-dimensional environment 455. As shown in the example of FIG. 4A, the user may target the second file 462 using gaze 447. In some embodiments, the gaze is optionally within a threshold distance of the second file 462 for the second file to be targeted by the second electronic device. For example, the gaze is directed toward a location within 2 cm of the planar surface of the second file 462 for the second file to be targeted by the second electronic device. In some embodiments, as shown in FIG. 4A, the gaze is optionally directed at least partially toward a portion of the second file 462 for the second file to be targeted by the second electronic device. As shown, the cursor 446, controllable by the second input device 417, is displayed within the augmented user interface 414″. As discussed above, in some embodiments, the cursor 446 is bounded by the boundaries of the user interface 414″ of the augmented device 445, such that the cursor is not controllable to navigate to the second application window 448 and move the second file 462 from the second application window 448 to the augmented user interface 414". As discussed below, the second file 462 may be moved to the augmented user interface 414" using a combination of gaze and selection input detected at the second input device 417.

In some embodiments, as shown in FIG. 4A, while the user targets the second file 462 using gaze, the user may provide a selection input using the second input device 417 (e.g., a click input of a mouse or trackpad), as represented by selection 441A, for example. In some embodiments, in response to receiving the click input at the second input device 417, the appearance of the second file 462 may change to indicate to the user that the second file has been selected, and the second filed can now be moved using subsequent input. For example, the second file 462 optionally becomes highlighted, as represented by highlighting 474, to indicate to the user that the second file 462 has been selected. In some embodiments, the change in appearance of the selected file can be maintained while the file remains selected (e.g., until the file is deselected).

FIG. 4B illustrates an example user interaction of moving an object from the second application window 448 toward the augmented device 445 using gaze according to embodiments of the disclosure. Continuing the example of FIG. 4A, the second file 462 may be moved from the second application window 448 to the augmented device 445 using gaze 447. In some embodiments, after selection of the second file 462, as represented by highlight 474, the user may initiate movement of the second file 462 by moving the user's gaze 447 toward the augmented device 445 (e.g., the target of the movement). As shown in the example of FIG. 4B, in some embodiments, during the movement of the second file, a shadow representation of the second file 462A may be presented within the second application window 448 within the three-dimensional environment 455 to indicate to the user that movement of the second file 462 has been initiated. In such some embodiments, the shadow representation of the second file 462A may be presented within a threshold amount of time (e.g., 50 ms) of the initiation of the movement of the gaze 447, for example, or after the gaze moves a threshold distance from the initial position of the second file upon selection.

It should be understood that, in some embodiments, a position of the shadow representation of the second file 462A may be updated incrementally and/or according to predefined time intervals (e.g., every 50 ms) relative to a current position of the user's gaze 447. For example, the gaze may change position within the three-dimensional environment 455 quickly (e.g., due to a darting of the eyes) as the second file 462 is moved from the second application window 448 to the augmented user interface 414". Displaying the shadow representation of the second file 462A at a position within the second application window 448 that is determined relative to the current position of the gaze 447 (e.g., by applying a moving-average filter to all gaze positions captured during the predefined time interval) may prevent the shadow representation of the second file 462A from being rapidly moved within the second application window 448, which could otherwise appear disorderly and disorienting, for example.

As shown in FIG. 4B, as the user moves the gaze 447 toward the augmented device 445, as represented by dashed arrow 471, the shadow representation of the second file 462A moves in accordance with the movement of the gaze 447. It should be understood that, in some embodiments, the shadow representation of the second file 462A is displayed within a threshold distance of the actual (or approximate) location of the gaze 447. As shown in FIG. 4B, in some embodiments, while the gaze 447 moves the shadow representation of the second file 462A toward the augmented device 445, the selection input (e.g., click input) at the second input device 417 is optionally maintained, as indicated by selection 442. For example, while the user moves the gaze 447, the user continues to hold down the click input on the second input device 417. In some embodiments, the requirement for providing a constant selection input during movement of an object optionally prevents premature release/dropping of the object (and thus the object data corresponding to the representation of the object) in other areas of the three-dimensional environment 455. For example, because the gaze 447 at least partially determines a final location of the second file 462 at an end of the movement input, providing the requirement for detecting liftoff of the selection input before actually moving the second file 462 to the final location models normal computer interactions using cursors, for example. In this way, a movement of an object using gaze from an application window on the second electronic device to the user interface of the augmented device optionally only occurs if the selection input at the second input device 417 is maintained. This may prevent the object from being unintentionally moved or transferred to other application windows within the three-dimensional environment, for example, which could otherwise interfere with one or more actions associated with the other application windows (e.g., an application running in the application window), which may require corrective action be taken by the user.

Figures 4C, 4D:
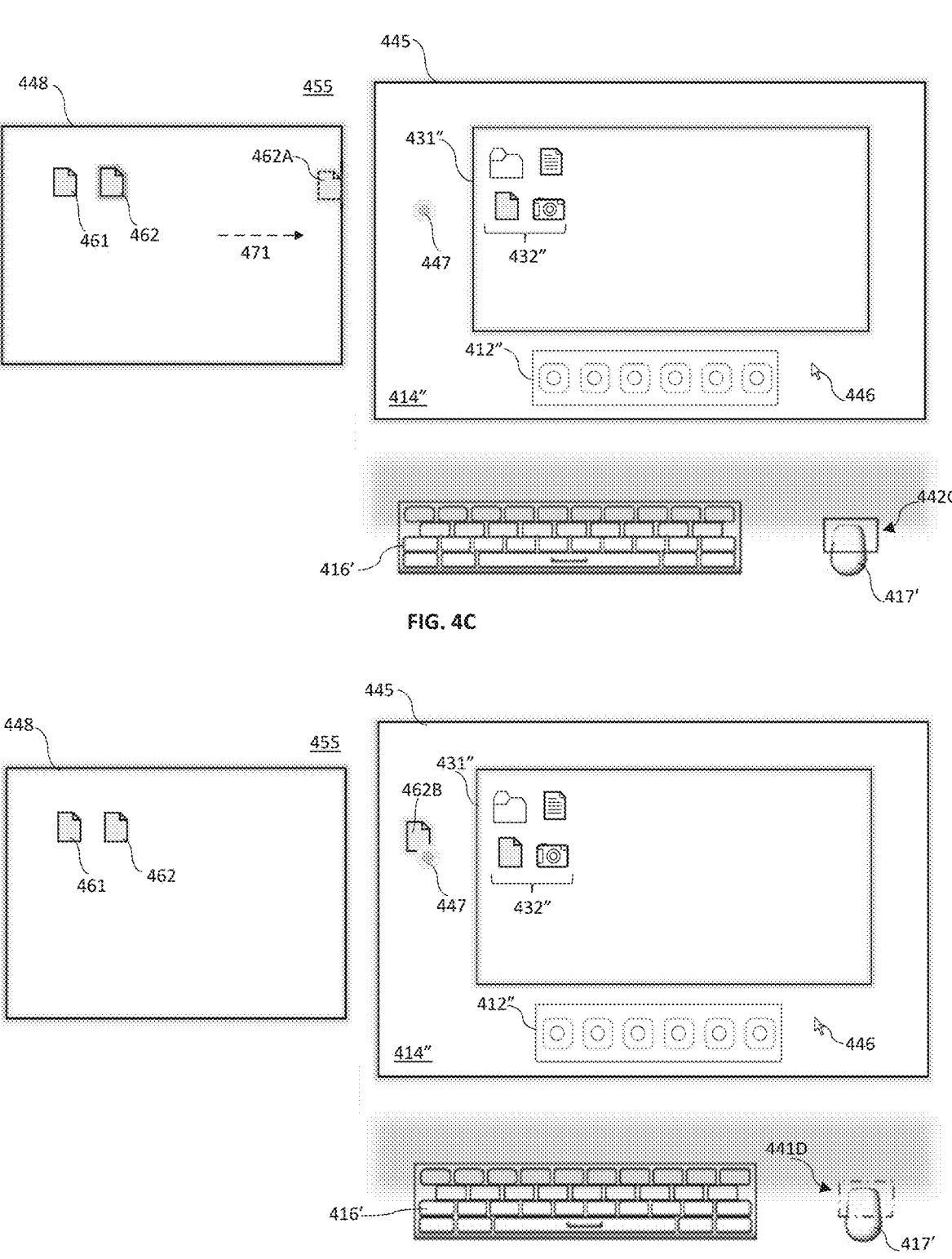

FIG. 4C illustrates an example user interaction of moving an object to the augmented device 445 using gaze according to embodiments of the disclosure. Continuing the example of FIG. 4B, the second file 462 may be moved from the second application window 448 to the augmented device 445 using gaze 447. As shown in the example of FIG. 4C, the user's gaze 447 is optionally directed toward the augmented device 445 (e.g., is directed toward a respective location within augmented user interface 414"). In some embodiments, as shown in FIG. 4C, as the user's gaze 447 (and thus the shadow representation of the second file 462A) continues moving toward the augmented device 445, as shown by dashed arrow 471, when the gaze 447 crosses a boundary of the second application window 448, the shadow representation of the second file 462A is optionally prevented from crossing the boundary. For example, as shown in FIG. 4C, display of the shadow representation of the second file 462A is maintained within the second application window 448 while the gaze 447 has crossed the boundary and is directed at the augmented user interface 414". In some embodiments, the shadow representation of the second file 462 can pass from application window 448 to the augmented device 445.

As discussed above, in some embodiments, the selection input, represented by selection 442C, is maintained at the second input device 417' as the user moves the gaze 414" toward the target (e.g., the respective location within the augmented user interface 414").

FIG. 4D illustrates an example user interaction of dropping the object at a respective location within the user interface 414" of the augmented device 445 according to embodiments of the disclosure. Continuing the example of FIG. 4C, the second file 462 may be dropped at the respective location within the user interface 414" of the augmented device 445 in accordance with the movement described above. In some embodiments, release of the selection input provided at the second input device 417 optionally causes (a copy of) the second file 462 to be dropped at the current location of the gaze 447.

As shown in the example of FIG. 4D, in some embodiments, in response to detecting liftoff of the selection input (e.g., liftoff of the click input) provided at the second input device 417, as represented by release/liftoff 441D, a second representation of the second file 462B may be presented at the current location of the gaze 447. In some embodiments, as shown, the shadow representation of the second file (e.g., 462A) may no longer be displayed within the second application window 448 (or within the augmented device 445). In some embodiments, presenting the second representation of the second file 462B optionally corresponds to transferring of object data (e.g., file data) corresponding to the second file 462 from the second application window running on the second electronic device to the home screen (e.g., user interface 414) of the first electronic device in the real-world environment. In this way, the three-dimensional representation of the second file 462 presented in the three-dimensional environment 455 may be moved, in the manner discussed above, to the user interface 414" of the augmented device 445 to thus transfer real-world data corresponding to the second file 462 from the second electronic device to the first electronic device (e.g., transferring the file data from the memory of the second electronic device to the memory of the first electronic device in addition to moving the graphical representation of the file from the application window 448 to the augmented display). Additionally, in some embodiments, the second file transferred in this manner is visible within the user interface of the first electronic device in the real-world (e.g., even without viewing the first electronic device using the second electronic device). In some embodiments, the object data may be deleted by the second electronic device in response to the second file 462 being moved to augmented device 445. In some embodiments, the object data transferred from the second electronic device to the first electronic device is optionally a copy of the object data, rather than a one-way transferal, such that the object data is maintained on the second electronic device (e.g., without deleting the object data from the second electronic device). For example, in response to movement of the second file 462 to the augmented user interface 414" of the augmented device 445, the file data corresponding to the second file 462 exists on both the first electronic device (as represented by second representation 462B) and the second electronic device. Thus, one advantage of the disclosed method is that object data may be transferred between a real-world first electronic device and a real-world second electronic device by interacting with the augmented representation of the first electronic device in a three-dimensional environment. Another advantage is the seamless integration of a set of input devices of a first real-world electronic device with a set of input devices of a second real-world electronic device, which allows for input received at both sets of input devices to be directed to the same one or more objects within a three-dimensional environment.

Although, as described above, the user maintains the selection input at the second input device 417 during the movement, it is understood that in some embodiments, the selection of the second file can be completed by a first selection input and the release of the second file can be completed by a second selection input. For example, a first press and release of the mouse button or a first press and release of the trackpad, among other possible inputs, can cause selection of the second file and a subsequent press and release can cause the deselection of the second file (e.g., the placement of the second file at the new location and/or the transfer of the file data from the second electronic device to the first electronic device.

In some embodiments, the first input device 416 may also be used to provide input for moving an object from the second electronic device to the first electronic device via interaction with the augmented device 445. For example, after selection of a particular object (e.g., selection of the second file 462 using gaze 447 and click input provided at the second input device 417), the user may provide a first combination of keys on the first input device 416, which may be a keyboard, for example, corresponding to a request to duplicate the data corresponding to the particular object (e.g., make a copy of the file data corresponding to the second file 462). In some embodiments, after inputting the first combination of keys on the first input device 416, the gaze 447 may be directed toward a respective location within the augmented user interface 414", as similarly shown in FIG. 4C, for example. In some such embodiments, the selection input (e.g., holding down of click input 442C in FIG. 4C) is optionally not required as the gaze 447 is moved from the second application window 448 toward the augmented user interface 414". At the respective location within the augmented user interface 414", the user may provide a second combination of keys different from the first combination of keys on the first input device 416. In response to receiving the second combination of keys, a copy of the object (e.g., the second representation of the second file 462B) may be presented at or near the current location of the gaze 447 at the respective location within the user interface 414", as similarly shown in FIG. 4D, for example. In this way, a representation of an object in an application window at the second electronic device can seamlessly and intuitively be moved to the augmented device 445 using a combination of inputs provided at the first input device 416, the second input device 417 and the second electronic device, such that data (e.g., file data) corresponding to the object is advantageously transferred from the second electronic device to the first electronic device (e.g., 315) in the real world.

FIGS. 5A-5D illustrate exemplary user interactions of moving an object from an application window running on the second electronic device to the augmented device including a cursor according to embodiments of the disclosure. As discussed above with reference to FIGS. 4A-4D, in some embodiments, an object (e.g., a data file) can be transferred from the second electronic device to the first electronic device by interacting with the augmented device 445 in the three-dimensional environment 455. As discussed below, in some embodiments, such interactions can be impacted by a respective location of the cursor (e.g., cursor 446) within the augmented user interface of the augmented device.

Figure 5A:
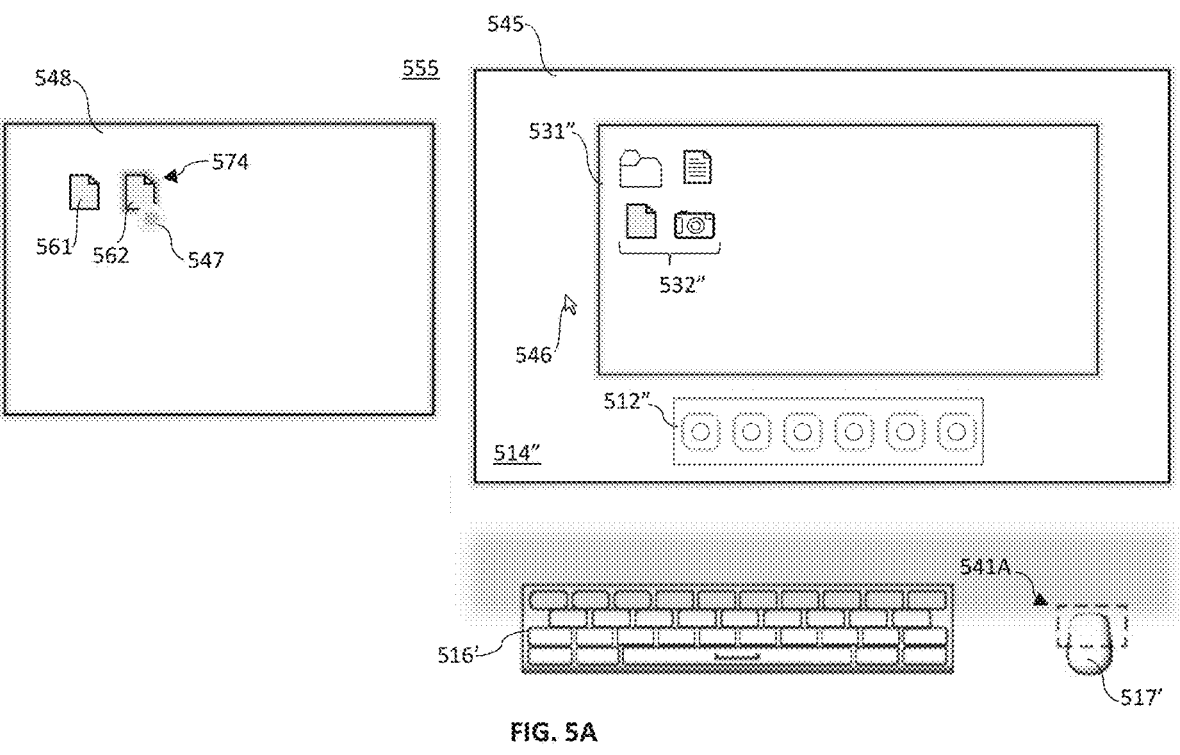
FIGS. 5A-5D illustrate example user interactions of moving an object from an application window running on the second electronic device to the augmented device including a cursor, according to embodiments of the disclosure.

FIG. 5A illustrates an example user interaction of initiating movement of an object 562 from the application window 548 to the augmented device 545 according to embodiments of the disclosure. As shown in the example of FIG. 5A, in some embodiments, a second application window 548 corresponding to a respective application running on the second electronic device is optionally presented within the three-dimensional environment 555. As discussed above, the user's gaze 547 is optionally directed toward the second object 562 to select the second object 562 for moving (e.g., transferring file data corresponding to the second object 562) from the second electronic device to the augmented user interface 414" of the augmented device 445 (and thus from the second electronic device to the first electronic device).

As shown in the example of FIG. 5A, while the user's gaze 547 is directed toward the second file 562, a selection input (e.g., a click input) may be provided at the second input device 517 (or a representation of second input device 517'), as represented by selection 541A, to select the second file 562. In some embodiments, as discussed above, in response to receiving the selection input 541A, an appearance of the second file 562 optionally changes (e.g., becomes highlighted, as shown by highlight 574) to indicate to the user that the second file 562 is selected and can be moved from the second application window 548 to the user interface 414" of the augmented device. As shown in FIG. 5A, the cursor 546, which is controllable by the second input device 517, is displayed within the augmented user interface 414". As discussed below, in some embodiments, a final location of the second file 562 after movement of the second file 562 to the augmented device 545 is optionally determined based on a distance between a location of the gaze 547 and a location of the cursor 546 at the time of release.

Figure 5B:
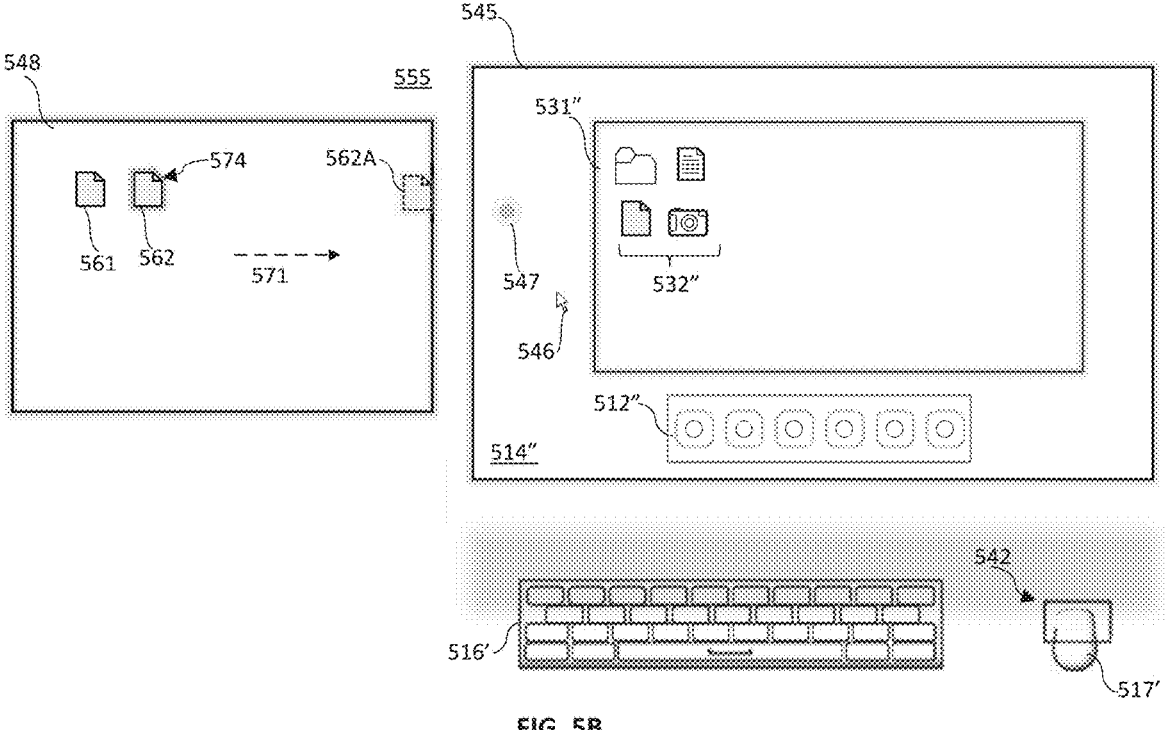

FIG. 5B illustrates an example user interaction of moving an object from the second application window 548 toward the augmented device 545 using gaze according to embodiments of the disclosure. Continuing the example of FIG. 5A, the second file 562 may be moved from the second application window 548 to the user interface 514" of the augmented device 545 using gaze 547. As discussed above, as the user's gaze 547 moves from the second application window 548 toward a respective location within the augmented user interface 514" (e.g., toward the target for movement of the object data corresponding to the second file 562), a shadow representation of the second file 562A may be presented within the second application window 548. In some embodiments, the shadow representation of the second file 562A optionally moves with the gaze 547 to indicate to the user that the object data corresponding to the second file 562A is being transferred to the augmented device 545 (and thus the first electronic device). In some embodiments, the shadow representation of the second file 562A can pass from application window 548 to the augmented device 545.

As shown in the example of FIG. 5B, the user's gaze 547 is moved from the initial location of the second file 562 in the second application window 548 to a respective location within the user interface 514" of the augmented device 545, as represented by dashed arrow 571. In some embodiments, as shown in FIG. 5B, movement of the shadow representation of the second file 562A is bounded by a boundary of the second application window 548, such that display of the shadow representation of the second file 562A is limited to the second application window 548. For example, the shadow representation of the second file 562A is displayed at the boundary of the second application window 548 while the gaze 547 has crossed the boundary and is displayed within the augmented user interface 514". In some embodiments, confining the display of the shadow representation of the second file 562A to within the boundaries of the second application window 548 may indicate to the user that the object data corresponding to the second file 562 has not yet been transferred to the augmented device 545, and thus the first electronic device, which optionally occurs upon detecting liftoff of the selection input at the second input device 517 for example. As shown in FIG. 5B, as the user's gaze 547 is moved from the second application window 548 to the respective location within the augmented user interface 514" in the direction of dashed arrow 571, the user may provide continuous selection input (e.g., hold down click input) at the second input device 517, as shown by selection 542, for example.

As shown in the example of FIG. 5B, the location of the gaze 547 within the augmented user interface 514" is near a current location of the cursor 546 (e.g., within a threshold distance). For example, the cursor 546 is optionally located within the augmented user interface 514" at a same position before the movement of the second file 562 was initiated (e.g., a same or similar position as that shown in FIG. 5A).

Figure 5C:
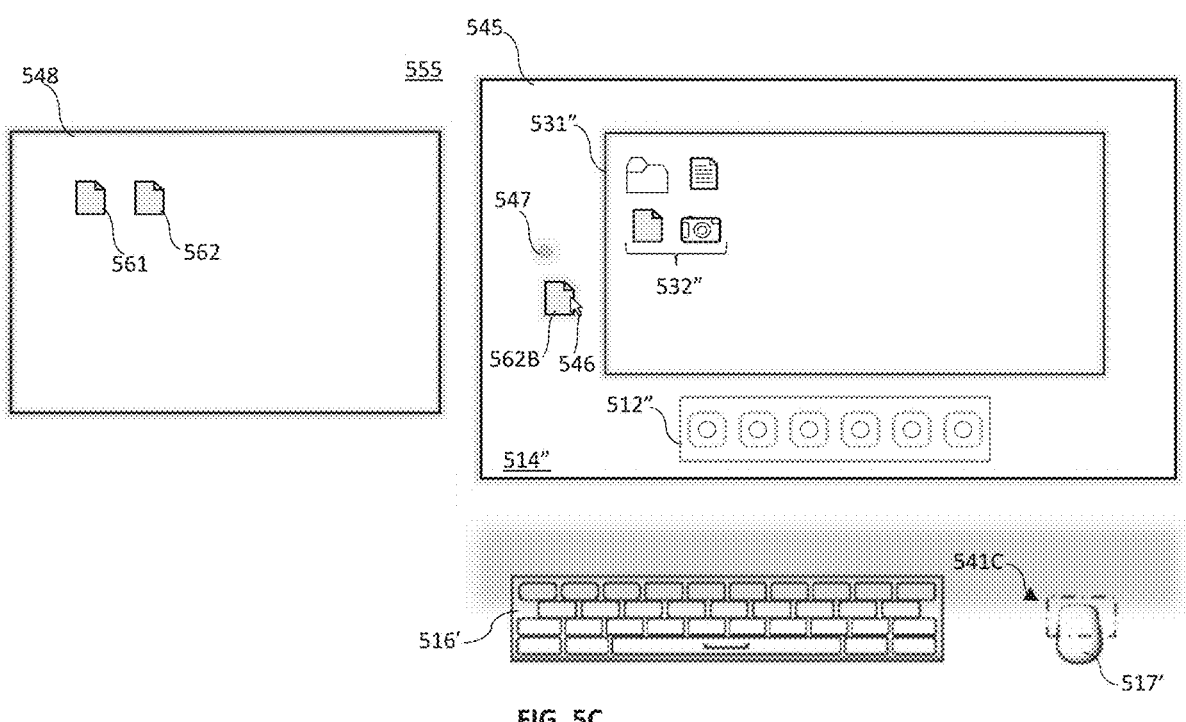

FIG. 5C illustrates an example user interaction of dropping the object at a respective location within the user interface 514" of the augmented device 545 according to embodiments of the disclosure. Continuing the example of FIG. 5B, the second file 562 may be moved to the user interface 514" of the augmented device 545 in accordance with the movement described above. In some embodiments, release of the selection input provided at the second input device 517 optionally causes the second file 562 to be dropped at the current location of the gaze at the time of release. In some embodiments, release of the selection input provided at the second input device 517 optionally causes the second file 562 to be dropped at the current location of the cursor 546. For example, the dropping the second file 562 at the current location of the cursor 546 can correspond to the cursor 546 at least partially overlapping the second file 562 or being within a threshold distance of the cursor 546 (e.g., within 5 mm).

As shown in the example of FIG. 5C, in some embodiments, the user may, while gazing at the user interface 514" of the augmented device 545, release the selection input provided at the second input device 517 to initiate dropping of the second file 562 within the user interface 514". For example, while the gaze is directed toward a respective location within the augmented user interface, as shown in FIG. 5C, the user may release the click input maintained at the second input device 517, as shown by release 541C, for example. In some embodiments, in response to detecting liftoff of the selection input 541C, a second representation of the second file 562B is optionally displayed within the augmented user interface 514" and the shadow representation of the second file (e.g., 562A) is optionally no longer displayed, indicating to the user that object data corresponding to the second file 562 has been transferred from the second electronic device to the first electronic device.

As discussed above, in the example of FIG. 5C, the cursor 546 is optionally located at the same position before the movement of the second file 562 was initiated (e.g., the same or similar position as that shown in FIG. 5A). In some embodiments, a location at which the second representation of the second file 562B is displayed in the augmented user interface 514" is the current location of the cursor 546. In some such embodiments, for example, if the gaze 547 is located within a threshold distance (e.g., less than 5 cm) of the current location of the cursor when liftoff of the selection input (e.g., release 541C) is detected at the second input device 517, the second representation of the second file 562B is optionally displayed at the current location of the cursor 546, as shown in the example of FIG. 5C. In this way, once the second representation of the second file 562B is displayed within the augmented user interface 514" (e.g., and thus once the object data corresponding to the second file 562 is transferred from the second electronic device to the first electronic device), the user can intuitively perform additional actions on the file using the cursor 546 without requiring the user to locate and move the cursor to the current file location. For example, using the second input device 517, the user can select the second representation of the second file 562B, via a click input, for example, and drag the second representation of the second file 562B to a respective location within the first application window 531" displayed within the augmented user interface 514" to thus associate the object data corresponding to the second object 562 with the application corresponding to the first application window 531". As another example, the user can select the second representation of the second file 562B, using the second input device 517, and open the object data (e.g., an image or a text document) corresponding to the second representation of the second file 562B, via a double click input, for example, and view the object data within the augmented user interface 514".

Thus, one advantage of the disclosed method is that upon movement of an object from an application window at a second electronic device to a user interface of an augmented device corresponding to a first electronic device, the object may be displayed at a location of a cursor within the user interface for easy interaction with the object after the movement using gaze and/or the second input device 517.

Figure 5D:
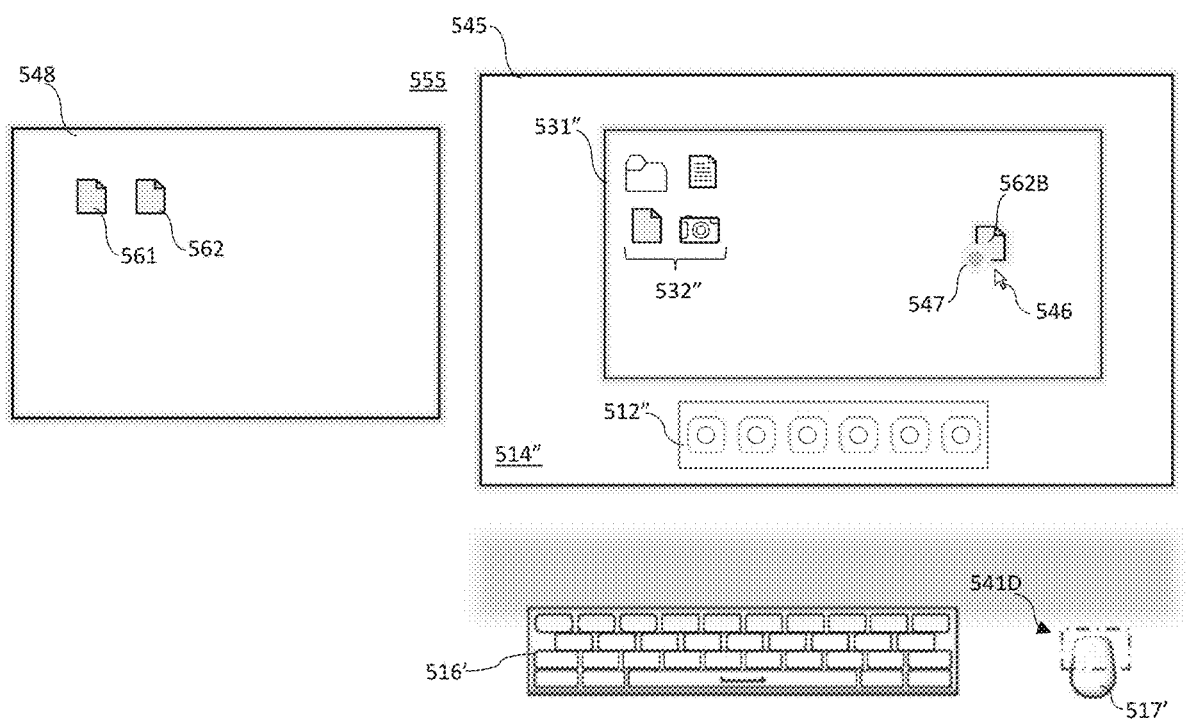

FIG. 5D illustrates an alternative example user interaction of dropping the object at a respective location within the user interface 514" of the augmented device 545 according to embodiments of the disclosure. Continuing the example of FIG. 5B, the second file 562 may be moved to the user interface 514" of the augmented device 545 in accordance with the movement described above. In some embodiments, release of the selection input provided at the second input device 517 optionally causes the second file 562 and the cursor 546 to be dropped at the current location of the gaze 547.

As shown in the example of FIG. 5D, in some embodiments, the user may, while gazing at the user interface 514" of the augmented device 545, release the selection input provided at the second input device 517 to initiate dropping of the second file 562 within the user interface 514". For example, while the gaze is directed toward a respective location within the augmented user interface, as shown in FIG. 5D, the user may release the click input maintained at the second input device 517, as shown by release 541D, for example. In some embodiments, in response to detecting liftoff of the selection input 541D, a second representation of the second file 562B is optionally displayed within the augmented user interface 514" and the shadow representation of the second file (e.g., 562A) is optionally no longer displayed, indicating to the user that object data corresponding to the second file 562 has been transferred from the second electronic device to the first electronic device.

In some embodiments, the target of the user's gaze 547 may be at a location that is far away from the current location of the cursor 546 when the second file 562 is moved from the second application window 548 to the augmented user interface 545 using the gaze 547. As shown in the example of FIG. 5D, the gaze 547 is optionally located at a different position than that shown previously in FIG. 5C (e.g., the gaze 547 is located at a respective position within the first application window 531") within the augmented user interface 514". In some embodiments, a location at which each of the second representation of the second file 562B and the cursor 546 is displayed in the augmented user interface 514" is the current location of the gaze 547. In some such embodiments, for example, if the gaze 547 is not located within the threshold distance (e.g., is greater than 5 cm) of the current location of the cursor when liftoff of the selection input (e.g., release 541D) is detected at the second input device 517, the second representation of the second file 562B is optionally displayed at the current location of the gaze 547, as shown in the example of FIG. 5D. Additionally or alternatively, the cursor 546 is optionally displayed over or within a threshold distance (e.g., 5 mm) of the second file 562 at the current location of the gaze 547. Repositioning the cursor to a location at or near the second file can enable easier interaction with the file because the user does not need to locate or move the cursor for further interaction. For example, as shown in FIG. 5D, in response to detecting liftoff of the selection input 541D, the second representation of the file 562B and the cursor 546 are displayed at or near the current location of the gaze 547, which is optionally at the respective location within the first application window 531".

As discussed above, the cursor 546, in response to detecting liftoff at the second input device 517 optionally ceases to be displayed at the position prior to detecting liftoff if the user's gaze 547 is greater than a threshold distance away from the prior position of the cursor 546. In this way, once the second representation of the second file 562B is displayed within the augmented user interface 514" (e.g., and thus once the object data corresponding to the second file 562 is transferred from the second electronic device to the first electronic device), the user can intuitively perform additional actions using the cursor 546. For example, using the second input device 517, the user can select the second representation of the second file 562B, via a click input, for example, and drag the second representation of the second file 562B to a respective location within a third application window (not shown) displayed within the augmented user interface 514" to thus associate the object data corresponding to the second object 562 with the application corresponding to the third application window. As another example, the user can select the second representation of the second file 562B, using the second input device 517, and open the object data (e.g., an image or a text document) corresponding to the second representation of the second file 562B, via a double click input, for example, and view the object data within the augmented user interface 514".

Thus, one advantage of the disclosed method is that upon movement of an object from an application window at a second electronic device to a user interface of an augmented device corresponding to a first electronic device, the object and the cursor may be displayed at a location of the user's gaze within the user interface for easy interaction with the object after the movement.

Although, as described above, the user maintains the selection input at the second input device 517 during the movement, it is understood that in some embodiments, the selection of the second file can be completed by a first selection input and the release of the second file can be completed by a second selection input. For example, a first press and release of the mouse button or a first press and release of the trackpad, among other possible inputs, can cause selection of the second file and a subsequent press and release can cause the deselection of the second file (e.g., the placement of the second file at the new location and/or the transfer of the file data from the second electronic device to the first electronic device.

FIGS. 6A-6D illustrate example user interactions of moving an object from the augmented device to an application window running on the second electronic device using the cursor according to embodiments of the disclosure. As discussed above with reference to FIGS. 4A-5D, in some embodiments, data corresponding to an object can be transferred from the second electronic device to the first electronic device in the real-world environment by interacting with the augmented device in the three-dimensional environment. As discussed below, in some embodiments, data corresponding to an object can be transferred from the first electronic device to the second electronic device by interacting with the augmented device 645.

Figures 6A, 6B:
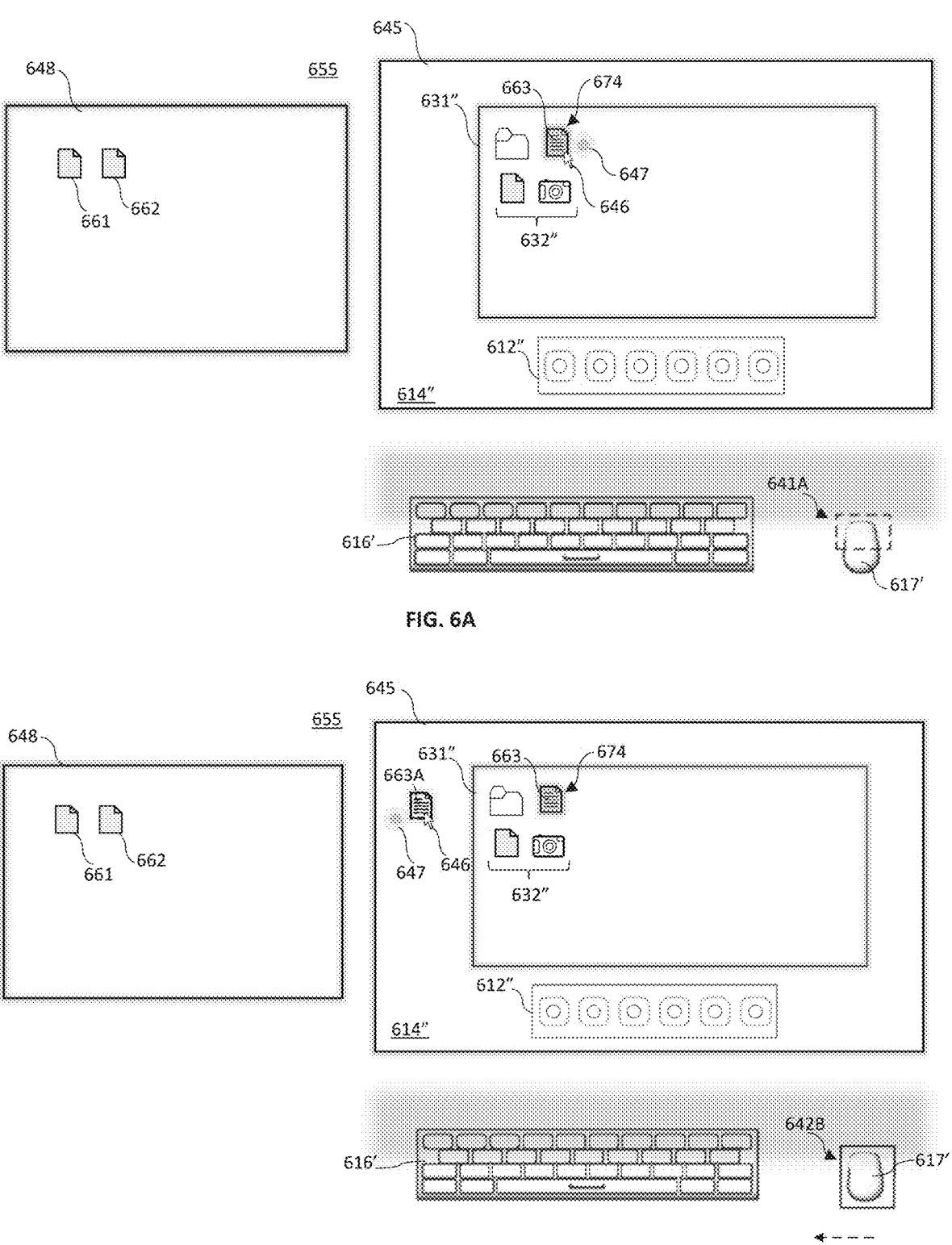
FIGS. 6A-6D illustrate example user interactions of moving an object from the augmented device to an application window running on the second electronic device using the cursor according to embodiments of the disclosure.

FIG. 6A illustrates an example user interaction of initiating movement of an object 663 from the application window 631" of the augmented device 645 to a second application window 648 at the second electronic device according to embodiments of the disclosure. In some embodiments, the first electronic device may comprise data corresponding to one or more applications, files, user interface elements, etc. stored in memory at the first electronic device (e.g., stored in memory or memories 220A). In some embodiments, the user may launch a respective application at the augmented device 645, where an application window 631" corresponding to the respective application is presented within the augmented user interface 614". As shown in the example of FIG. 6A, in some embodiments, the user can open the second application window 648, different than the first application window 631" displayed on the augmented device 645, for example, presented within the three-dimensional environment 655.

As shown in FIG. 6A, the second application window 648, which may be a file manager application, for example, optionally includes a (representation of a) first file 661 and a (representation of a) second file 662. The first application window 631" optionally includes one or more objects 632", including a (representation of a) third file 663. Attention is now directed to methodology for transferring data corresponding to the third file 663 from the first electronic device to the second electronic device via interactions directed to the augmented device 645 in the three-dimensional environment 655. As shown in the example of FIG. 6A, the user may target the third file 663 using gaze 647. In some embodiments, the gaze is optionally within a threshold distance of the third file 663 for the third file to be targeted by the second electronic device. For example, the gaze is directed toward a location within 2 cm of the planar surface of the third file 663 for the third file to be targeted by the second electronic device. In some embodiments, the gaze is optionally directed at least partially toward a portion of the third file 663 for the third file to be targeted by the second electronic device. As shown, the cursor 646, controllable by the second input device 617 (or a representation of second input device 617'), is displayed within the augmented user interface 614". As discussed above, the cursor 646 is bounded by the boundaries of the user interface 614" of the augmented device 645, such that the cursor is not controllable to navigate to the second application window 648 and move the third file 662 from the first application window 631" directly to the second application window 648. As discussed below, the third file 663 may be moved to the second application window 648 using a combination of gaze and/or cursor movement detected using the second input device 617.

In some embodiments, as shown in FIG. 6A, while the user targets the third file 663 using gaze 647 or using cursor 646, the user may select the third file 663 via a selection input (e.g., a click input) detected at the second input device 617, as represented by selection 641A, for example. In some embodiments, in response to detecting the click input at the second input device 617, the appearance of the third file 663 may change (e.g., become highlighted, as represented by highlight 674) to indicate to the user that the second file has been selected and can now be moved.

FIG. 6B illustrates an example user interaction of moving an object from the first application window 631" of the augmented device 645 toward a second application window 648 using gaze 647 or using the cursor 646 according to embodiments of the disclosure. Continuing the example of FIG. 6A, the third file 663 may be moved from the first application window 631" to the second application window 648 using gaze 647 or the cursor 646 in accordance with a first portion of the input. In some embodiments, after selection of the third file 663, as represented by highlight 674, the user may initiate movement of the third file 663 by moving gaze 647 or the cursor 646 toward the second application window 648 (e.g., the target of the movement). As shown in the example of FIG. 6B, in some embodiments, a shadow representation of the third file 663A may be presented within augmented user interface 614" of the augmented device 645 to indicate to the user that movement of the third file 663 has been initiated. In some such embodiments, the shadow representation of the third file 663A may be presented within a threshold amount of time (e.g., 50 ms) of the initiation of the movement of the cursor 646, for example. It should be understood that, in some embodiments, a position of the shadow representation of the third file 663A may be updated incrementally or in predefined time intervals (e.g., every 50 ms) in accordance with changes in movement detected at the second input device 617.

As shown in FIG. 6B, as the user moves gaze 647 or the cursor 646 toward the second application window 648 using the second input device 617, as represented by dashed arrow 671B, the shadow representation of the third file 663A moves in accordance with the movement of the cursor 646. It should be understood that, in some embodiments, the shadow representation of the third file 663A is displayed within a threshold distance of the actual (or approximate) location of gaze 647 or the cursor 646. As shown in FIG. 6B, in some embodiments, while gaze 647 or the cursor 646 moves the shadow representation of the third file 663A toward the second application window 648, the selection input (e.g., click input) at the second input device 617 is optionally maintained, as indicated by selection 642B. For example, while the user moves gaze 647 or the cursor 646, the user continues to hold down the click input on the second input device 617'.

Figures 6C, 6D:
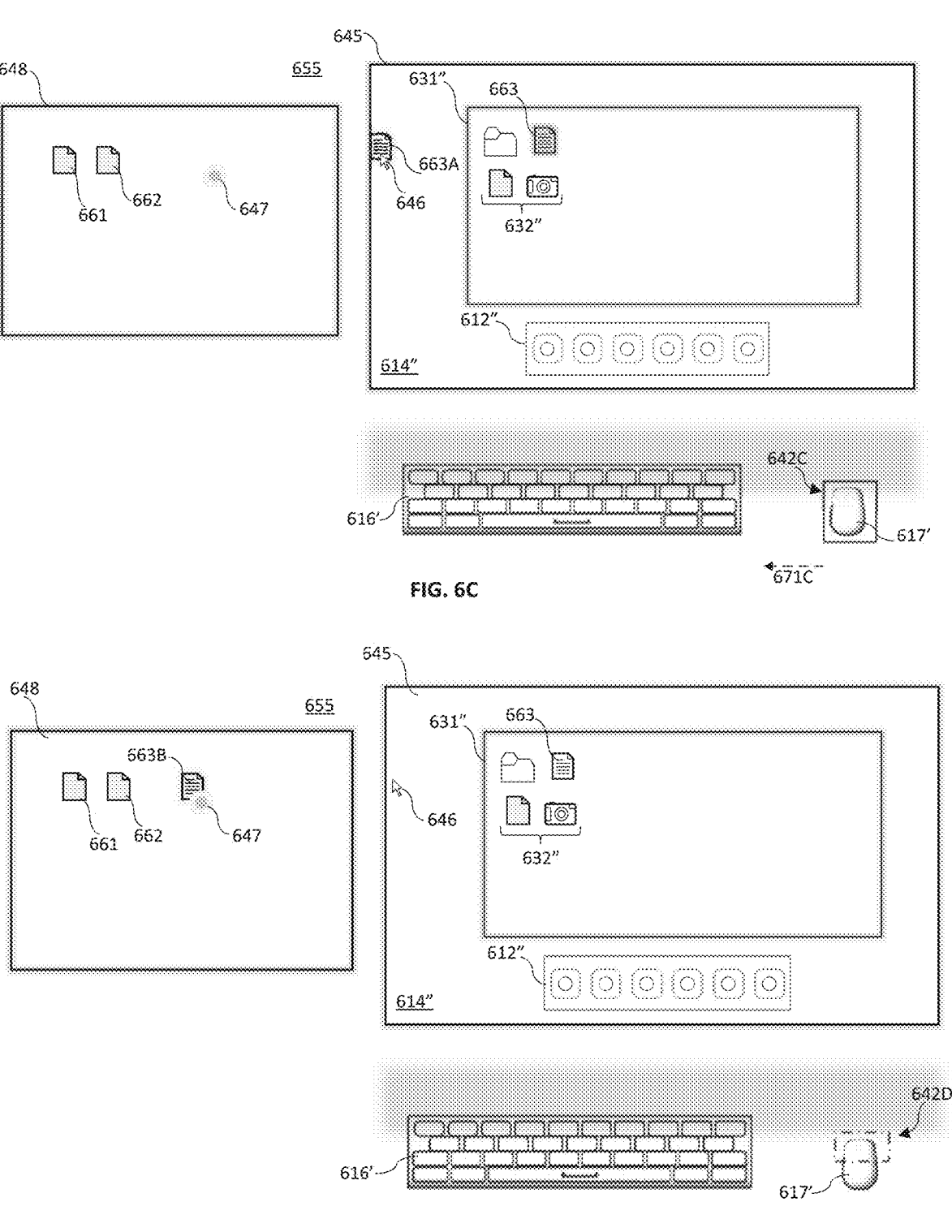

FIG. 6C illustrates an example user interaction of moving an object to the second application window 648 using gaze 647 according to embodiments of the disclosure. Continuing the example of FIG. 6B, the third file 663 may be moved from the first application window 631" to the second application window 648 using gaze 647. As shown in the example of FIG. 6C, the user's gaze 647 is optionally directed toward the second application window 648 (e.g., is directed toward a respective location within the second application window 648.) In some embodiments, as shown in FIG. 6C, as the cursor 646 (and thus the shadow representation of the third file 663A) continues moving toward the second application window 648, as shown by dashed arrow 671C, when the cursor 646 reaches a boundary of the augmented user interface 614", the cursor 646 and the shadow representation of the third file 663A are optionally prevented from crossing the boundary. For example, as shown in FIG. 6C, display of the shadow representation of the third file 663 and the cursor 646 are maintained within the user interface 614" of the augmented device 645 as the gaze 647 crosses the boundary of the user interface 614" and moves to a respective location within the second application window 648.

As discussed above, in some embodiments, the display of the cursor 646 is bounded by the boundaries of the user interface 614" of the augmented device 645. Additionally or alternatively, in some embodiments, the display of the shadow representation of the third file 663A is bounded by the boundaries of the user interface 614" of the augmented device 645. Because the representation of the third file 663 at the augmented device 645 corresponds to object data (e.g., file data) stored on the first electronic device, the shadow representation of the third file 663 is optionally confined to the display of the augmented device 645 to indicate to the user that the object data corresponding to the third file 663 has not yet been transferred to the second electronic device. In some embodiments, the shadow representation of the second file 663A and/or the cursor 646 can pass from application window 548 to the augmented device 545 in accordance with the movement of the third file 663. As discussed below, because movement and display of the cursor 646 is bounded by the boundaries of the augmented user interface 614", a second portion of the movement of the third file 663 to the second application window 648 is optionally performed using gaze 647.

FIG. 6D illustrates an example user interaction of dropping the object at a respective location within the second application window 648 within the three-dimensional environment 655 according to embodiments of the disclosure. Continuing the example of FIG. 6C, the third file 663 may be dropped at the respective location within the second application window 648 of the second electronic device in accordance with a second portion the movement input. In some embodiments, release of the selection input provided at the second input device 617 optionally causes the third file 663 to be dropped at the current location (or within a threshold distance) of the gaze 647.

As shown in the example of FIG. 6D, in some embodiments, in response to detecting liftoff of the selection input (e.g., liftoff of the click input) provided at the second input device 617, as represented by release/liftoff 642D, a second representation of the third file 663B may be presented at the current location of the gaze 647. In some embodiments, as shown, the shadow representation of the third file (e.g., 663A) may no longer be displayed within the user interface 614" of the augmented device 645. In some embodiments, presenting the second representation of the third file 663B optionally corresponds to transferring of object data (e.g., file data) corresponding to the third file 663 from the first application window 631" running on the augmented device 645 to the second application window 648 running on the second electronic device in the real-world environment. In this way, the three-dimensional representation of the third file 663 presented in the three-dimensional environment 455 may be moved, in the manner discussed above, to the user interface 414" of the augmented device 445 to thus transfer real-world data corresponding to the second file 462 from the second electronic device to the first electronic device. In some embodiments, the object data transferred from the second electronic device to the first electronic device is optionally a copy of the object data, rather than a one-way transferal, such that the object data is maintained on the first electronic device. For example, in response to movement of the third file 663 to the second application window 648 in the three-dimensional environment 655, the file data corresponding to the third file 663 exists on both the first electronic device and the second electronic device (as represented by second representation 663B). Thus, one advantage of the disclosed method is that object data may be transferred between a real-world first electronic device and a real-world second electronic device by interacting with the augmented representation of the first electronic device in a three-dimensional environment. Another advantage is the seamless integration of a set of input devices of a first real-world electronic device with a set of input devices of a second real-world electronic device, which allows for input received at both sets of input devices to be directed to the same one or more objects within a three-dimensional environment.

In some embodiments, the first input device 616 may also be used to provide input for moving an object from the first electronic device to the second electronic device via interaction with the augmented device 645. For example, after selection of a particular object (e.g., selection of the third file 663 using the cursor 646 controlled by the second input device 617), the user may provide a first combination of keys on the first input device 616, which may be a keyboard, for example, corresponding to a request to duplicate the data corresponding to the particular object (e.g., make a copy of the file data corresponding to the third file 663). In some embodiments, after inputting the first combination of keys on the first input device 616, the gaze 647 may be directed toward a respective location within the second application window 648, as similarly shown in FIG. 6C, for example. In some such embodiments, the selection input (e.g., holding down of click input 642C in FIG. 6C) is optionally not required as the gaze 647 is moved from the first application window 631" toward the second application window 648. At the respective location within the second application window 648, the user may provide a second combination of keys different from the first combination of keys on the first input device 616. In response to receiving the second combination of keys, a copy of the object (e.g., the second representation of the third file 663B) may be presented at or near the current location of the gaze 647 at the respective location within the second application window 648, as similarly shown in FIG. 6D, for example. In this way, a representation of an object in an application window at the first electronic device can seamlessly and intuitively be moved to the a second application window running on the second electronic device using a combination of inputs provided at the first input device 616, the second input device 617 and the second electronic device, such that data (e.g., file data) corresponding to the object is advantageously transferred from the first electronic device (e.g., 315) to the second electronic device in the real world.

Figures 7A, 7B:
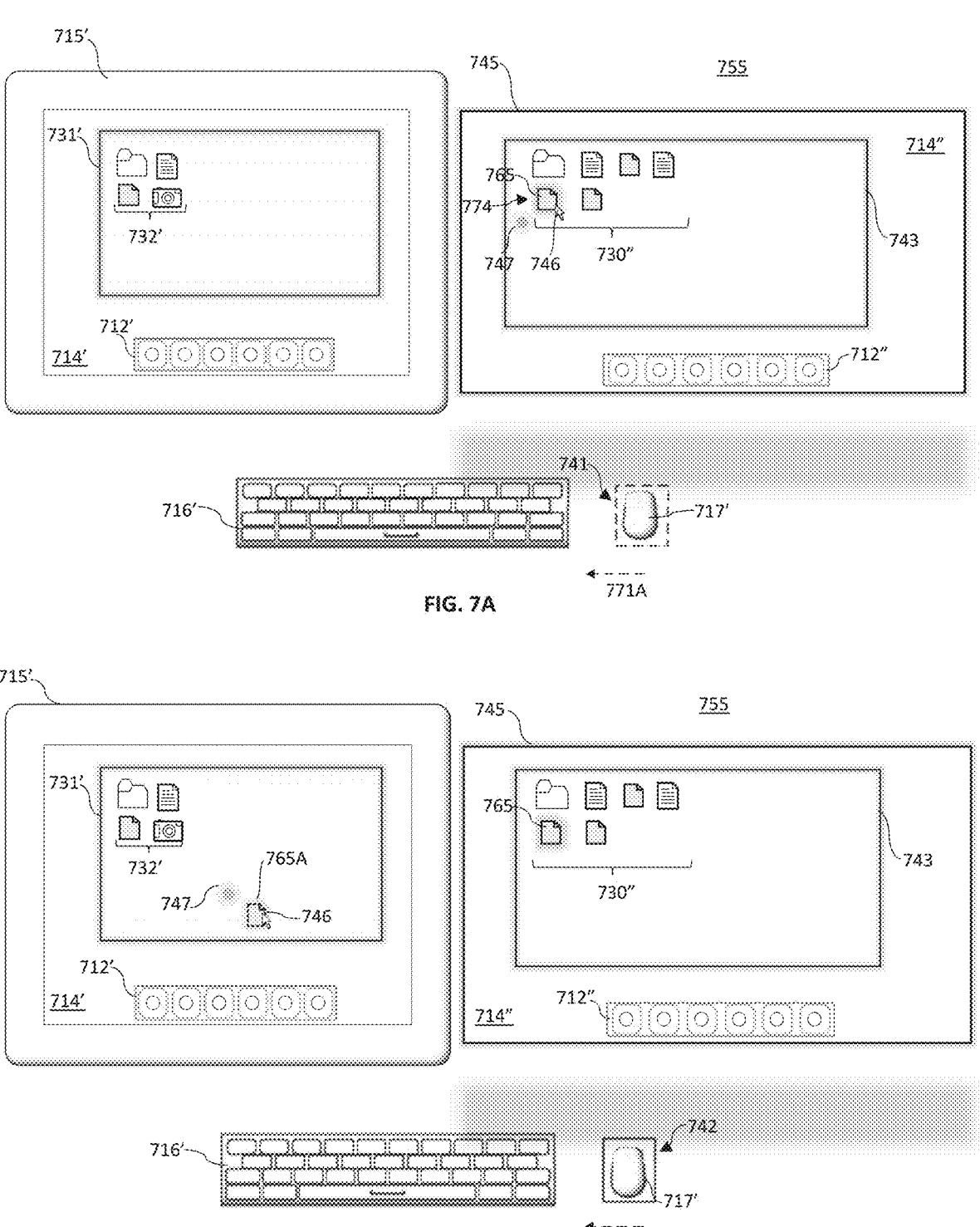
FIGS. 7A-7B illustrate example user interactions of moving a cursor between the augmented user interfaces of the augmented device when the augmented device includes an extended display according to embodiments of the disclosure.

FIGS. 7A-7B illustrate exemplary user interactions of moving an object between the augmented device 745 and a user interface of the first electronic device while the augmented device functions as an extended display according to embodiments of the disclosure. FIG. 7A illustrates an exemplary user interaction of selecting an object displayed within the augmented user interface 714" using the cursor 746 while the augmented user interface functions as an extended display for the first electronic device (representation of first electronic device 715') according to embodiments of the disclosure. As discussed previously with reference to FIG. 3E, in some embodiments, the augmented device 735 is optionally configurable to operate as an extended display for the representation of first electronic device 715'. For example, the user may launch the augmented device 745 as an extended display of the user interface 714' (e.g., the home screen) of the representation of first electronic device 715' after selection of the first affordance (e.g., first affordance 356). As shown in the example of FIG. 7A, in some embodiments, a second plurality of objects (e.g., representations of files, folders, images, etc.) 730" is optionally displayed within a third application window 743 of the user interface 714" of the augmented device 745. As discussed below, in some embodiments, one or more objects of the second plurality of objects 730" can be selected and moved between the user interface 714' of the representation of first electronic device 715' and the augmented user interface 714" of the augmented device 745 using the cursor 746.

As shown in the example of FIG. 7A, in some embodiments, a fourth file 765 (e.g., a fourth object) of the second plurality of objects 730" may be selected using the cursor 746. For example, selection input provided at the second input device (representation of second input device 717'), as represented by selection 741, optionally causes the cursor 746 to select the fourth file 765. In response to detecting the selection, an appearance of the fourth file 765 may change (e.g., the fourth file 765 optionally becomes highlighted, as represented by highlight 774) to indicate to the user that the fourth file 765 has been selected by the cursor 746, for example. The user may then initiate movement of the fourth file 765 from the third application window 743 of the augmented user interface 714" (e.g., the extended display) to the user interface 714' of the representation of first electronic device, as indicated by dashed arrow 771A, for example.

It should be understood that, in some embodiments, the fourth file 765 optionally represents object data stored on the first electronic device. Moreover, the second plurality of objects 730" optionally represent object data corresponding to files, folders, images, etc. stored on the first electronic device and/or associated with an application corresponding to the third application window 743, for example.

FIG. 7B illustrates an exemplary user interaction of moving an object from the augmented user interface 745 to the user interface of the first electronic device using the cursor 746 while the augmented user interface 745 functions as an extended display according to embodiments of the disclosure. As shown in the example of FIG. 7B, using the cursor 746 (e.g., controllable by the second input device 717, as indicated by arrow 742), the fourth file 765 can be moved from the augmented user interface 714" of the augmented device 745 to the user interface 714' of the representation of first electronic device 715', as represented by dashed arrow 771B. For example, the second plurality of objects 730", and thus the fourth file 765, may be contained within the third application window 743 or a second home screen of the first electronic device (e.g., in the real-world environment). As shown in FIG. 7B, the fourth file 765 may be moved to the first application window 731' of the user interface 714' to associate the object data corresponding to the fourth file 765 with the application corresponding to the first application window 731', for example.

As shown in the example of FIG. 7B, in response to initiation of movement of the fourth file 765 toward the first application window 731', a shadow representation of the fourth file 765A is optionally displayed at a position of the cursor 746 to indicate to the user that movement of the fourth file 765 has begun. As shown, the shadow representation of the fourth file 765A and the cursor 746 have been moved from the third application window 743 of the augmented user interface 714" to the first application window 731' at the representation of first electronic device 715'. As shown in FIG. 7B, in some embodiments, while the augmented device functions as an extended display for the representation of first electronic device 715', the cursor 746 (and thus the shadow representation 765A) can be seamlessly moved from the augmented user interface 745 to a respective location within the user interface 714' of the representation of first electronic device 715'. In some such embodiments, the cursor 746 (and thus the shadow representation 765A) is optionally no longer bounded by the boundaries of the augmented user interface 714" of the augmented device 745. In this way, while the augmented device 745 operates as an extend display of the representation of first electronic device 715', the user can intuitively use the cursor 746 to move objects (e.g., file data) between application windows displayed on the representation of first electronic device 715' and the augmented device 745.

Additionally or alternatively, in some embodiments, the user interactions directed toward the augmented device and one or more application windows and objects of the augmented device, and one or more application windows running on the second electronic device, different than those displayed on the augmented device, can be provided using hand input detected by the hand tracking sensor(s) (e.g., hand tracking sensor(s) 202) of the second electronic device. For example, the cursor presented within the augmented user interface of the augmented device may be configured to be controllable via hand and/or finger input detected at the second electronic device. In some such embodiments, the user can move the cursor by moving a position of the hand, and select and drag an object (e.g., a file) by targeting the object using gaze and pinching the object with two fingers, for example. The gaze may be directed toward a drop target (e.g., an application window running on the second electronic device (e.g., second application window 648)) and the pinch input may be released, which optionally causes a second representation of the object to be dropped at the drop target, and thus optionally causes object data corresponding to the object to be transferred to the target device (e.g., the second electronic device).

It is understood that the embodiments shown and described herein are merely exemplary and that additional and/or alternative elements may be provided within the three-dimensional environment and/or within the augmented device. It should be understood that the appearance, shape, form and size of each of the various user interface elements and objects shown and described herein are exemplary and that alternative appearances, shapes, forms and/or sizes may be provided. For example, the augmented device may be provided in an alternative shape than a rectangular shape, such as a circular shape, oval shape, etc. In some embodiments, for example, the first affordance (e.g., first affordance 356) may be selected vocally via user vocal commands (e.g., "select affordance" vocal command) and/or the augmented device may be launched vocal via user vocal commands (e.g., "launch augmented device" vocal command). Additionally or alternatively, in some embodiments, the augmented device and an application window running on the second electronic device may be configurable to operate in a workspace mode. An anchor point (not shown) is optionally provided between the augmented device and the application window in the three-dimensional environment. In some such embodiments, the augmented device and the application window may be concurrently moved (e.g., repositioned), resized, etc. within the three-dimensional environment (e.g., similar in manner to the interactions shown in FIG. 3F) at the same relative amount, magnitude, etc., in accordance with such manipulations, for example.

Additionally or alternatively, multiple augmented devices may be launched concurrently and/or files may be transferred between multiple electronic devices. As discussed previously with reference to FIG. 3C, the second electronic device (e.g., the head-mounted display) may be configured to detect multiple electronic devices, such as the first electronic device 315, which may be a desktop computer, for example, and the third electronic device 318, which may be a tablet computer, for example. Augmented devices can be launched for both the first electronic device 315 and the third electronic device 318 (e.g., by selecting both affordances 356A and 356B). In some embodiments, launching of augmented devices for both the first electronic device 315 and the third electronic device 318 may allow a user to exchange and/or transfer object data (e.g., file data, image data, application data, etc.) between the first electronic device and the second electronic device, between the second electronic device and the third electronic device, and/or between the first electronic device and the third electronic device in a similar manner as described herein with respect to FIGS. 4A-4C, 5A-5C, and 6A-6C.

Additionally or alternatively, in some embodiments, multiple head-mounted displays (e.g., each corresponding to device 240 in FIG. 2) can be used. In some such embodiments, a first electronic device (e.g., a desktop computer, laptop computer, etc.) can be presented to a first user of a second electronic device (e.g., a first head-mounted display) and can be presented to a second user of a third electronic device (e.g., a second head-mounted display). In some embodiments, either of the second and third electronic devices may be used to launch an augmented device corresponding to the first electronic device in a three-dimensional environment. In some embodiments, only one of the head-mounted devices can launch the augmented device, but the augmented device can be presented using the second and the third electronic devices. For example, the objects, application windows, user interface elements, etc. displayed on each augmented device corresponding to the first electronic device is optionally shared between the second electronic device and the third electronic device. As such, manipulations performed by one user on the second electronic device (e.g., movement of an object) is viewable by the other user on the third electronic device (e.g., the same movement of the object). It should be understood that, in some such embodiments, a criterion for detecting the first electronic device by the second electronic device and the third electronic device is optionally that each of the second electronic device and the third electronic device has received authorization to share the same data with the first electronic device, for example. The second electronic device and the third electronic device are thus optionally engaged in a shared viewing experience utilizing the same three-dimensional environment and the same data of the first electronic device (e.g., rather than duplicates of the data, which could otherwise result in contradicting transfer and/or exchange of the data).

FIGS. 8A-8D illustrate flow diagrams illustrating example processes for presenting an augmented device corresponding to an electronic device according to embodiments of the disclosure. As shown in FIG. 8A, process 800 begins at a first electronic device in communication with a display generation component (e.g., a display) and one or more input devices, at 802. In some embodiments, the first electronic device is optionally a head-mounted display similar or corresponding to device 240 of FIG. 2. As shown at 804, the first electronic device may capture, via the one or more input devices, at least a portion of a real-world environment including a second electronic device with a display configured to display a first representation of a user interface of the second electronic device. In some embodiments, the second electronic device may be a laptop computer, a desktop computer, or a tablet computer, among other possibilities, similar or corresponding to device 230 of FIG. 2. Additionally, in some embodiments, the display of the second electronic device is optionally configured to display a user interface comprising one or more user interface elements and/or one or more objects, such as user interface 315/315' of FIGS. 3A-3G, for example.

At 806, the first electronic device may present, via the display generation component, a computer-generated environment including a representation of the captured portion of the real-world environment. In some embodiments, the first electronic device may present a three-dimensional environment, such as three-dimensional environment 355 of FIGS. 3B-3G, including three-dimensional representations of one or more real-world objects, such as the second electronic device and the first representation of the user interface of the second electronic device. As shown in FIG. 8A, while presenting the computer-generated environment including the representation of the captured portion of the real-world environment, in accordance with a determination that one or more criteria are satisfied, at 808, the first electronic device may present, via the display generation component, a first affordance associated with a representation of the second electronic device, at 810. For example, in some embodiments, the first electronic device may present a first affordance, such as first affordance 356 in FIG. 3B, within the three-dimensional environment and optionally at, above, and/or near the representation of the second electronic device, where the first affordance is selectable to launch an augmented device corresponding to the second electronic device.

At 812, while presenting the computer-generated environment including the representation of the captured portions of the real-world environment and the first affordance, the first electronic device may receive, via the one or more input devices, an input corresponding to a selection of the first affordance. For example, in some embodiments, the user may select the first affordance by directly or indirectly tapping, pinching, or otherwise touching the first affordance within the three-dimensional environment, which is optionally received by hand-tracking sensors in communication with the first electronic device. As shown in FIG. 8A, the first electronic device may present, in the computer-generated environment, a second representation of the user interface of the second electronic device different than the first representation of the user interface, in accordance with the input, at 814. In some embodiments, the first electronic device may launch an augmented device, such as augmented device 345 of FIG. 3D, displaying a second representation of the user interface of the second electronic device (e.g., augmented user interface 314"), where the second representation of the user interface optionally includes one or more user interface elements (e.g., application window 331") and/or one or more objects (e.g., objects 332") of the first representation of the user interface.

In some embodiments, the second electronic device may be in a respective state in which the display and/or the representation of the user interface of the second electronic device are not visible and/or capturable by the first electronic device. In some such embodiments, the first electronic device is configurable to launch an augmented device corresponding to the second electronic device despite the display and/or the representation of the user interface not being visible and/or capturable. As shown in FIG. 8B, process 820 begins at a first electronic device in communication with a display generation component and one or more input devices, at 822. In some embodiments, the first electronic device is optionally a head-mounted display similar or corresponding to device 240 of FIG. 2. As shown at 824, the first electronic device may capture, via the one or more input devices, at least a portion of a real-world environment including a second electronic device with a display configured to display a first representation of a user interface of the second electronic device. In some embodiments, the display of the second electronic device is not captured or the representation of the user interface of the second electronic device is not captured. In some embodiments, the second electronic device may be a laptop computer, a desktop computer, or a tablet computer, among other possibilities, that is in a respective state in which the display or the user interface of the device is not captured (e.g., the device is in a low-power state, in a shut-off state, in a sleep state, etc.). Additionally, in some embodiments, the display of the second electronic device is optionally configured to display a user interface comprising one or more user interface elements and/or one or more objects, such as user interface 315/315' of FIGS. 3A-3G, for example.

At 826, the first electronic device may present, via the display generation component, a computer-generated environment including a representation of the captured portion of the real-world environment. In some embodiments, the first electronic device may present a three-dimensional environment, such as three-dimensional environment 355 of FIGS. 3B-3G, including three-dimensional representations of one or more real-world objects, such as the second electronic device and the first representation of the user interface of the second electronic device. As shown in FIG. 8B, while presenting the computer-generated environment including the representation of the captured portion of the real-world environment, in accordance with a determination that one or more criteria are satisfied, at 828, the first electronic device may present, via the display generation component, a first affordance associated with a representation of the second electronic device, at 830. For example, in some embodiments, the first electronic device may present a first affordance, such as first affordance 356 in FIG. 3B, within the three-dimensional environment and optionally at, above, and/or near the representation of the second electronic device, where the first affordance is selectable to launch an augmented device corresponding to the second electronic device.

At 832, while presenting the computer-generated environment including the representation of the captured portions of the real-world environment and the first affordance, the first electronic device may receive, via the one or more input devices, an input corresponding to a selection of the first affordance. For example, in some embodiments, the user may select the first affordance by directly or indirectly tapping, pinching, or otherwise touching the first affordance within the three-dimensional environment, which is optionally received by hand-tracking sensors in communication with the first electronic device. As shown in FIG. 8B, the first electronic device may present, in the computer-generated environment, a second representation of the user interface of the second electronic device different than the first representation of the user interface, in accordance with the input, at 834. In some embodiments, the first electronic device may launch an augmented device, such as augmented device 345 of FIG. 3D, displaying a second representation of the user interface of the second electronic device (e.g., augmented user interface 314"), where the second representation of the user interface optionally includes one or more user interface elements (e.g., application window 331") and/or one or more objects (e.g., objects 332") of the first representation of the user interface.

Additionally or alternatively, as shown in process 840 of FIG. 8C, the one or more first criteria include a criterion that is satisfied when the display of the second electronic device is visible to a user of the first electronic device, at 842. For example, in some embodiments, the display of the second electronic device is within a field of view of the user of the first electronic device (e.g., of the head-mounted display), as shown in FIG. 3A, for example. In some embodiments, at 844, the one or more first criteria include a criterion that is satisfied when the second electronic device is in communication with the first electronic device. For example, in some such embodiments, the first electronic device and the second electronic device communicate via a wired or wireless communication channel. Additionally or alternatively, at 846, the first electronic device may present, within the second representation of the user interface of the second electronic device, a cursor controllable by one or more input devices in communication with the second electronic device. At 848, while presenting, in the computer-generated environment, the second representation of the user interface of the second electronic device, the first electronic device may receive an input corresponding to a manipulation of the second representation of the user interface of the second electronic device. For example, the first electronic device may receive an input, via the cursor controllable by the one or more input devices in communication with the second electronic device, corresponding to movement of an application window (e.g., application window 331") within the augmented user interface (e.g., augmented user interface 314"). In accordance with the input corresponding to the manipulation of the representation of the user interface, at 850, the first electronic device may update an appearance of the second representation of the user interface in accordance with the input (e.g., move the application window in accordance with the cursor movement).

In some embodiments, as described with reference to FIGS. 7A-7B, the augmented device may include an extended display window (e.g., extended display 745). As shown in process 860 of FIG. 8D, the first electronic device may present, in the computer-generated environment, a first portion (e.g., user interface 714' of the first electronic device of FIG. 7A) of the first representation of the user interface of the second electronic device at a region of the computer-generated environment at which the display is located and a second portion (e.g., augmented user interface 714" of extended display window 745) of the first representation of the user interface in a user interface element within a threshold distance of the region of the computer-generated environment at which the display is located. At 864, presentation of a movement of the cursor is bounded by the region of the computer-generated environment at which the display is located and the user interface element within the threshold distance of the region of the computer-generated environment at which the display is located. For example, the cursor displayed within the augmented device, as shown in FIG. 7B, is controllable by the one or more input devices in communication with the second electronic device to move between the user interface 714' and the augmented user interface 714".

It is understood that processes 800, 820 and 840 are examples and that more, fewer, or different operations can be performed in the same or in a different order. Additionally, the operations in processes 800, 820 and 840 described above are, optionally, implemented by running one or more functional modules in an information processing apparatus such as general-purpose processors (e.g., as described with respect to FIG. 2) or application specific chips, and/or by other components of FIG. 2.

FIGS. 9A-9C illustrate flow diagrams illustrating example processes for moving an object between an augmented device corresponding to a first electronic device and an application window running on a second electronic device according to embodiments of the disclosure. As shown in FIG. 9A, process 900 begins at a first electronic device in communication with a display generation component and one or more input devices. In some embodiments, the first electronic device is optionally a head-mounted display similar or corresponding to device 240 of FIG. 2. As shown at 904, the first electronic device may capture, via the one or more input devices, at least a portion of a real-world environment including a second electronic device configurable to display a user interface. In some embodiments, the second electronic device may be a laptop computer, a desktop computer, or a tablet computer, among other possibilities, similar or corresponding to device 230 of FIG. 2. Additionally, in some embodiments, the second electronic device is optionally configurable to display a user interface comprising one or more user interface elements and/or one or more objects, such as user interface 315/315' of FIGS. 4A-4D, for example.

At 906, the first electronic device may present, via the display generation component, a computer-generated environment. In some embodiments, the computer-generated environment optionally includes a representation of the captured portion of the real-world environment including a representation of the second electronic device (908), a representation of the user interface of the second electronic device (910), and a representation of a first object corresponding to data stored at the first electronic device outside the representation of the user interface of the second electronic device (912). For example, the first electronic device may present a three-dimensional environment (e.g., three-dimensional environment 455 of FIG. 4A) including a three-dimensional representation of the second electronic device (e.g., 415'), the augmented user interface (e.g., 414" in FIG. 4A) of the augmented device (e.g., 445 in FIG. 4A), and a representation of a file (e.g., second file 462) corresponding to data stored in memory on the first electronic device. At 914, while presenting the computer-generated environment including the representation of the captured portion of the real-world environment, the representation of the user interface, and the representation of the first object, the first electronic device may receive an input. For example, the input may correspond to movement of the first object from a user interface of the first electronic device to the augmented user interface of the augmented device, as shown in FIGS. 4B-4C. In accordance with the input, at 916, the first electronic device may transfer data corresponding to the first object from the first electronic device to the second electronic device.

Additionally or alternatively, as shown by process 920 in FIG. 9B, in accordance with the input, the first electronic device may move the representation of the first object from outside the representation of the user interface of the second electronic device inside the user interface of the second electronic device presented using the first electronic device. For example, in some embodiments, the representation of the file may be displayed within the augmented user interface 414" of the augmented device 445, as shown in FIG. 4D. Additionally or alternatively, in some embodiments, data can be transferred from the second electronic device to the first electronic device, as described with reference to FIGS. 6A-6D. As shown in FIG. 9B, at 924, the computer-generated environment further comprises a representation of a second object (e.g., third file 663 of FIG. 6A) different than the representation of the first object, the representation of the second object corresponding to second data stored on the second electronic device. At 926, while presenting the computer-generated environment including the representation of the captured portion of the real-world environment, the representation of the user interface, and the representation of the second object, the first electronic device may receive a second input. For example, the second input may correspond to movement of the second object from the augmented user interface of the augmented device to the user interface of the first electronic device, as shown in FIGS. 6B-6C. In accordance with the second input, at 928, the first electronic device may receive the second data corresponding to the second object from the second electronic device (930), and move the representation of the second object from within the user interface of the second electronic device to a region of the three-dimensional environment outside of the user interface of the second electronic device (932).

Additionally or alternatively, in some embodiments, the input corresponds to movement of the representation of the object. As shown by process 940 of FIG. 9C, the input comprises, at 942, selection of the representation of the first object at a first location outside the representation of the user interface of the second electronic device, at 944. In some embodiments, the selection of the representation optionally includes targeting the first location using gaze detected by the one or more input devices of the first electronic device and activation of a button of a first input device of the one or more input devices in communication with the second electronic device, at 944. At 948, the input may further comprise movement of the representation of the first object toward a second location within the representation of the user interface of the second electronic device. In some embodiments, the movement of the representation optionally includes movement of the gaze detected by the one or more input devices of the first electronic device while maintaining the activation of the button of the first input device of the one or more input devices in communication with the second electronic device, at 950. The input may further comprise, at 952, release of the selection of the representation of the first object at the second location within the representation of the user interface of the second electronic device. In some embodiments, at 954, the release of the selection of the representation optionally includes deactivation of the button of the first input device of the one or more input devices in communication with the second electronic device.

It is understood that processes 900, 920 and 940 are examples and that more, fewer, or different operations can be performed in the same or in a different order. Additionally, the operations in processes 900, 920 and 940 described above are, optionally, implemented by running one or more functional modules in an information processing apparatus such as general-purpose processors (e.g., as described with respect to FIG. 2) or application specific chips, and/or by other components of FIG. 2.

FIGS. 10A-10C illustrate flow diagrams illustrating example processes for altering a position of a cursor within an augmented device corresponding to a first electronic device while moving an object between the augmented device and an application window running on a second electronic device according to embodiments of the disclosure. As shown in FIG. 10A, process 1000 begins, at 1002, at a first electronic device in communication with a display generation component and one or more first input devices, and a second electronic device in communication with one or more second input devices. In some embodiments, the first electronic device is optionally a head-mounted display similar or corresponding to device 240 of FIG. 2. At 1004, the first electronic device may present, via the display generation component, a computer-generated environment.

The computer-generated environment may include a representation of a user interface of a second electronic device (1008), a cursor within the representation of the user interface of the second electronic device and controllable by one of the one or more second input devices (1010), and an object at a first location in the computer-generated environment outside the representation of the user interface of the second electronic device (1012). For example, the first electronic device may display a three-dimensional environment (e.g., three-dimensional environment 555 of FIG. 5A) including an augmented user interface (e.g., augmented user interface 514″) of an augmented device (e.g., augmented device 545), a cursor (e.g., cursor 546) displayed within the augmented user interface, and an object (e.g., file 562) presented outside of the augmented user interface.

As shown at 1014, while presenting the computer-generated environment including the representation of the user interface of the second electronic device, the cursor, and the object, the first electronic device may receive, via the one or more first input devices and/or the one or more second input devices, an input corresponding to a request to move the object from the first location to a second location within the representation of the user interface of the second device. In some embodiments, the input optionally includes selection of the object (1016), movement from the first location to a second location (1018), and release of the object at the second location within the representation of the user interface (1020). For example, as described with reference to FIGS. 5A-5B, the input optionally corresponds to movement of the file 562 from the application window 548 to the user interface 514″ of the augmented device 545. As shown in FIG. 10B, at 1022, in accordance with a determination that the input satisfies one or more first criteria including a first criterion that is satisfied when the second location is within a threshold distance of the representation of the cursor upon the release of the object, the first electronic device can present the object at a location of the cursor. For example, as shown in FIG. 5C, if the user's gaze (at the second location) is within a threshold distance of a current location of the cursor 546 at the time of release, the file 562 is displayed at the current location of the cursor 546. At 1024, in accordance with a determination that the input satisfies one or more second criteria including a second criterion that is satisfied when the second location is outside the threshold distance of the representation of the cursor upon the release of the object, the first electronic device can present the object at the second location and move the representation of the cursor to the second location. For example, as shown in FIG. 5D, if the user's gaze (at the second location) is outside the threshold distance of the current location of the cursor 546 at the time of release, the file 562 and the cursor 546 are displayed at the current location of the gaze (the second location).

Additionally or alternatively, as shown by process 1030 in FIG. 10C, presentation of a movement of the cursor controllable by the one of the one or more input devices in communication with the second electronic device is bounded by boundaries of the representation of the user interface of the second electronic device, at 1032. Additionally or alternatively, at 1034, movement from the first location to the second location includes movement across a boundary of the representation of the user interface of the second electronic device, such that while the object is moved away from the first location toward the second location, the object contacts at least a portion of the boundary of the representation of the user interface. Additionally or alternatively, at 1036, movement from the first location to the second location corresponds to movement of a gaze detected by one of the one or more first input devices in communication with the first electronic device. In some embodiments, the first electronic device may present a shadow representation (e.g., shadow representation 562A) during the input moving the object from the first location to the second location. In some such embodiments, at 1038, the first electronic device may change an appearance of the object in accordance with the selection of the object. At 1040, the first electronic device may animate a motion of the object in accordance with the movement of the object from the first location to the second location. At 1042, the first electronic device may change the appearance of the object in accordance with the release of the object at the second location within the representation of the user interface of the second electronic device.

It is understood that processes 1000 and 1030 are examples and that more, fewer, or different operations can be performed in the same or in a different order. Additionally, the operations in processes 1000 and 1030 described above are, optionally, implemented by running one or more functional modules in an information processing apparatus such as general-purpose processors (e.g., as described with respect to FIG. 2) or application specific chips, and/or by other components of FIG. 2.

Therefore, according to the above, some embodiments of the disclosure are directed to a method of launching an augmented user interface of an electronic device. The method can comprise: at a first electronic device in communication with a display and one or more input devices: capturing, via the one or more input devices, at least a portion of a real-world environment including a second electronic device with a display configured to display a first representation of a user interface of the second electronic device; presenting, via the display, a computer-generated environment including a representation of the captured portion of the real-world environment; while presenting the computer-generated environment including the representation of the captured portion of the real-world environment, in accordance with a determination that one or more first criteria are satisfied: presenting, via the display generation component, a first affordance associated with a representation of the second electronic device; while presenting the computer-generated environment including the representation of the captured portion of the real-world environment and the first affordance, receiving, via the one or more input devices, an input corresponding to a selection of the first affordance; and presenting, in the computer-generated environment, a second representation of the user interface of the second electronic device different than the first representation of the user interface, in accordance with the input corresponding to the selection of the first affordance.

Additionally or alternatively, in some embodiments, the first electronic device may be a head-mounted display.

Additionally or alternatively, in some embodiments, the second electronic device may be a laptop computer, a desktop computer, or a tablet computer.

Additionally or alternatively, in some embodiments, the one or more first criteria may include a criterion that is satisfied when the display of the second electronic device is visible to a user of the first electronic device.

Additionally or alternatively, in some embodiments, the one or more first criteria may include a criterion that is satisfied when the second electronic device is in communication with the first electronic device.

Additionally or alternatively, in some embodiments, the method may further comprise: while presenting, in the computer-generated environment, the second representation of the user interface of the second electronic device, presenting, via the display, a second affordance; in accordance with an input corresponding to a selection of the second affordance, ceasing presenting, in the computer-generated environment, the second representation of the user interface of the second electronic device.

Additionally or alternatively, in some embodiments, the method may further comprise while presenting, in the computer-generated environment, the second representation of the user interface of the second electronic device, causing the display of the second electronic device to power down.

Additionally or alternatively, in some embodiments, presenting, in the computer-generated environment, the second representation of the user interface of the second electronic device may include presenting, within the second representation of the user interface of the second electronic device, a cursor controllable by one or more input devices in communication with the second electronic device. Additionally or alternatively, in some embodiments, presentation of a movement of the cursor may be bounded within the second representation of the user interface of the second electronic device.

Additionally or alternatively, in some embodiments, the method can further comprise: while presenting, in the computer-generated environment, the second representation of the user interface of the second electronic device, receiving an input corresponding to a manipulation of contents of the second representation of the user interface of the second electronic device; and in accordance with the input corresponding to the manipulation of the representation of the user interface, updating an appearance of the second representation of the user interface in accordance with the input.

Additionally or alternatively, in some embodiments, presenting, in the computer-generated environment, the second representation of the user interface of the second electronic device can also include: presenting, in the computer-generated environment, a first portion of the first representation of the user interface of the second electronic device at a region of the computer-generated environment at which the display is located and a second portion of the first representation of the user interface in a user interface element within a threshold distance of the region of the computer-generated environment at which the display is located.

Additionally or alternatively, in some embodiments, the second representation of the user interface of the second electronic device may include a cursor controllable by one or more input devices in communication with the second electronic device. Additionally or alternatively, presentation of a movement of the cursor may be bounded by the region of the computer-generated environment at which the display is located and the user interface element within the threshold distance of the region of the computer-generated environment at which the display is located.

Additionally or alternatively, in some embodiments, the second representation of the user interface of the second electronic device may include one or more representations of portions of the first user interface displayed on the display of the second electronic device. Additionally or alternatively, in some embodiments, a size of the second representation of the user interface of the second electronic device in the computer-generated environment may be larger than a size of the display of the second electronic device.

Some embodiments of the disclosure are directed to a method of launching an augmented user interface of an electronic device. The method can comprise, at a first electronic device in communication with a display and one or more input devices, capturing, via the one or more input devices, at least a portion of a real-world environment including a second electronic device with a display configured to display a representation of a user interface of the second electronic device. Additionally or alternatively, in some embodiments, the display of the second electronic device may not be captured or the representation of the user interface of the second electronic device may not be captured. The method can further comprise: presenting, via the display, a computer-generated environment including a representation of the captured portion of the real-world environment; while presenting the computer-generated environment including the representation of the captured portion of the real-world environment, in accordance with a determination that one or more first criteria are satisfied: presenting, via the display, a first affordance associated with a representation of the second electronic device; while presenting the computer-generated environment including the representation of the captured portion of the real-world environment and the first affordance, receiving, via the one or more input devices, an input corresponding to a selection of the first affordance; and presenting, in the computer-generated environment, the representation of a user interface of the second electronic device.

Some embodiments of the disclosure are directed to a method of transferring data between a first electronic device and a second electronic device. The method can comprise: at a first electronic device in communication with a display and one or more input devices: capturing, via the one or more input devices, at least a portion of a real-world environment including a second electronic device configurable to display a user interface; presenting, via the display, a computer-generated environment including: a representation of the captured portion of the real-world environment including a representation of the second electronic device; a representation of the user interface of the second electronic device; and a representation of a first object corresponding to data stored at the first electronic device outside the representation of the user interface of the second electronic device; while presenting the computer-generated environment including the representation of the captured portion of the real-world environment, the representation of the user interface, and the representation of the first object, receiving an input; and in accordance with the input, transferring the data corresponding to the first object from the first electronic device to the second electronic device.

Additionally or alternatively, in some embodiments, the method can further comprise, in accordance with the input, moving the representation of the first object from outside the representation of the user interface of the second electronic device inside the user interface of the second electronic device presented using the first electronic device.

Additionally or alternatively, in some embodiments, the first electronic device may be a head-mounted display.

Additionally or alternatively, in some embodiments, the second electronic device may be a laptop computer, a desktop computer, or a tablet computer.

Additionally or alternatively, in some embodiments, the object may be a file.

Additionally or alternatively, in some embodiments, the input can comprise: selection of the representation of the first object at a first location outside the representation of the user interface of the second electronic device; movement of the representation of the first object toward a second location within the representation of the user interface of the second electronic device; and release of the selection of the representation of the first object at the second location within the representation of the user interface of the second electronic device.

Additionally or alternatively, in some embodiments, the computer-generated environment may further include a cursor controllable by one or more input devices in communication with the second electronic device. Additionally or alternatively, in some embodiments, the selection of the representation of the first object at the first location outside the representation of the user interface of the second electronic device can comprise targeting the first location using the cursor and activation of a button of a first input device of the one or more input devices in communication with the second electronic device. Additionally or alternatively, in some embodiments, the movement of the representation of the first object toward the second location within the representation of the user interface of the second electronic device can comprise movement of the cursor using the first input device while maintaining the activation of the button of the first input device. Additionally or alternatively, in some embodiments, the release of the selection of the representation of the first object at the second location within the representation of the user interface of the second electronic device can comprise deactivation of the button of the first input device.

Additionally or alternatively, in some embodiments, the computer-generated environment may further include a cursor controllable by a first input device of one or more input devices in communication with the second electronic device. Additionally or alternatively, in some embodiments, the selection of the representation of the first object at the first location outside the representation of the user interface of the second electronic device can comprise targeting the first location using the cursor and activation of a first combination of keys of a second input device of the one or more input devices in communication with the second electronic device. Additionally or alternatively, in some embodiments, the movement of the representation of the first object to the second location within the representation of the user interface of the second electronic device can comprise movement of the cursor using the first input device from the first location to the second location. Additionally or alternatively, in some embodiments, the release of the selection of the representation of the first object at the second location within the representation of the user interface of the second electronic device can comprise activation of a second combination of keys, different than the first combination of keys, of the second input device.

Additionally or alternatively, in some embodiments, the selection of the representation of the first object at the first location outside the representation of the user interface of the second electronic device can comprise targeting the first location using gaze detected by the one or more input devices of the first electronic device and activation of a button of a first input device of the one or more input devices in communication with the second electronic device. Additionally or alternatively, in some embodiments, the movement of the representation of the first object toward the second location within the representation of the user interface of the second electronic device can comprise movement of the gaze detected by the one or more input devices of the first electronic device while maintaining the activation of the button of the first input device of the one or more input devices in communication with the second electronic device. Additionally or alternatively, in some embodiments, the release of the selection of the representation of the first object at the second location within the representation of the user interface of the second electronic device can comprise deactivation of the button of the first input device of the one or more input devices in communication with the second electronic device.

Additionally or alternatively, in some embodiments, the computer-generated environment may further comprise a representation of a second object different than the representation of the first object, the representation of the second object corresponding to second data stored on the second electronic device.

Additionally or alternatively, in some embodiments, the method can further comprise: while presenting the computer-generated environment including the representation of the captured portion of the real-world environment, the representation of the user interface, and the representation of the second object, receiving a second input; and in accordance with the second input: transferring the second data corresponding to the second object from the second electronic device to the first electronic device; and moving the representation of the second object from within the user interface of the second electronic device to a region of the three-dimensional environment outside of the user interface of the second electronic device.

Additionally or alternatively, in some embodiments, moving the representation of the second object from within the user of the second electronic device to the region of the three-dimensional environment outside of the user interface of the second electronic device can comprise: moving the representation of the second object from within the user interface of the second electronic device to a user interface element located at the region of the three-dimensional environment outside of the user interface of the second electronic device. Additionally or alternatively, in some embodiments, the user interface element may be associated with an application running on the first electronic device.

Some embodiments of the disclosure are directed to a method of resetting a location of a cursor displayed in a user interface of an electronic device. The method can comprise: at a first electronic device in communication with a display, one or more first input devices, and a second electronic device in communication with one or more second input devices: presenting, via the display, a computer-generated environment including: a representation of a user interface of a second electronic device, a cursor within the representation of the user interface of the second electronic device and controllable by one of the one or more second input devices, and an object at a first location in the computer-generated environment outside the representation of the user interface of the second electronic device; while presenting the computer-generated environment including the representation of the user interface of the second electronic device, the cursor, and the object, receiving, via the one or more first input devices and/or the one or more second input devices, an input corresponding to a request to move the object from the first location to a second location within the representation of the user interface of the second electronic device. Additionally or alternatively, in some embodiments, the input may include selection of the object, movement from the first location to a second location, and release of the object at the second location within the representation of the user interface. The method can further comprise: in accordance with a determination that the input satisfies one or more first criteria including a first criterion that is satisfied when the second location is within a threshold distance of the representation of the cursor upon the release of the object, presenting the object at a location of the cursor, and in accordance with a determination that the input satisfies one or more second criteria including a second criterion that is a satisfied when the second location is outside the threshold distance of the representation of the cursor upon the release of the object, presenting the object at the second location and moving the representation of the cursor to the second location.

Additionally or alternatively, in some embodiments, the first electronic device may be a head-mounted display.

Additionally or alternatively, in some embodiments, the second electronic device may be a laptop computer, a desktop computer, or a tablet computer.

Additionally or alternatively, in some embodiments, the one of the one or more input devices of the second electronic device may be a trackpad or a mouse.

Additionally or alternatively, in some embodiments, presentation of a movement of the cursor controllable by the one of the one or more input devices in communication with the second electronic device may be bounded by boundaries of the representation of the user interface of the second electronic device.

Additionally or alternatively, in some embodiments, the object may be presented in the computer-generated environment within a user interface element associated with an application running on the first electronic device.

Additionally or alternatively, in some embodiments, movement from the first location to the second location can include: movement across a boundary of the representation of the user interface of the second electronic device, such that while the object is moved away from the first location toward the second location, the object contacts at least a portion of the boundary of the representation of the user interface.

Additionally or alternatively, in some embodiments, movement from the first location to the second location can correspond to movement of a gaze detected by one of the one or more first input devices in communication with the first electronic device.

Additionally or alternatively, in some embodiments, the method can further comprise: changing an appearance of the object in accordance with the selection of the object; animating a motion of the object in accordance with the movement of the object from the first location to the second location; and changing the appearance of the object in accordance with the release of the object at the second location within the representation of the user interface.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:

at a first electronic device in communication with one or more displays and one or more input devices:

capturing, via the one or more input devices, at least a portion of a real-world environment including a second electronic device that is displaying, via one or more second displays, a first representation of a user interface of the second electronic device;

presenting, via the one or more displays, a three-dimensional environment including a representation of the captured portion of the real-world environment;

while presenting the three-dimensional environment including the representation of the captured portion of the real-world environment, in accordance with a determination that one or more first criteria are satisfied:

presenting, via the one or more displays, a first affordance associated with a representation of the second electronic device;

while presenting the three-dimensional environment including the representation of the captured portion of the real-world environment and the first affordance, receiving, via the one or more input devices, an input corresponding to a selection of the first affordance; and presenting, in the three-dimensional environment, a second representation of the user interface of the second electronic device different than the first representation of the user interface, in accordance with the input corresponding to the selection of the first affordance, while maintaining presentation of the captured portion of the real-world environment that includes the first representation of the user interface of the second electronic device that is being displayed via the one or more second displays.

2. The method of claim 1, wherein the one or more first criteria include a criterion that is satisfied when the one or more second displays of the second electronic device are visible to a user of the first electronic device.

3. The method of claim 1, wherein the one or more first criteria include:

a criterion that is satisfied when the second electronic device is in communication with the first electronic device.

4. The method of claim 1, further comprising:

while presenting, in the three-dimensional environment, the second representation of the user interface of the second electronic device, causing the one or more second displays of the second electronic device to power down.

5. The method of claim 1, wherein presenting, in the three-dimensional environment, the second representation of the user interface of the second electronic device includes:

presenting, within the second representation of the user interface of the second electronic device, a cursor controllable by one or more input devices in communication with the second electronic device;

wherein presentation of a movement of the cursor is bounded within the second representation of the user interface of the second electronic device.

6. The method of claim 1, further comprising:

while presenting, in the three-dimensional environment, the second representation of the user interface of the second electronic device, receiving an input corresponding to a manipulation of contents of the second representation of the user interface of the second electronic device; and in accordance with the input corresponding to the manipulation of the representation of the user interface, updating an appearance of the second representation of the user interface in accordance with the input.

7. The method of claim 1, wherein presenting, in the three-dimensional environment, the second representation of the user interface of the second electronic device also includes:

presenting, in the three-dimensional environment, a first portion of the first representation of the user interface of the second electronic device at a region of the three-dimensional environment at which the one or more second displays are located and a second portion of the first representation of the user interface in a user interface element within a threshold distance of the region of the three-dimensional environment at which the one or more second displays are located.

8. The method of claim 7, wherein the second representation of the user interface of the second electronic device includes a cursor controllable by one or more input devices in communication with the second electronic device;

wherein presentation of a movement of the cursor is bounded by the region of the three-dimensional environment at which the one or more second displays are located and the user interface element within the threshold distance of the region of the three-dimensional environment at which the one or more second displays are located.

9. A first electronic device comprising:

one or more processors;

memory; and one or more programs stored in the memory and configured to be executed by the one or more processors, the one or more programs including instructions for performing a method comprising:

capturing, via one or more input devices, at least a portion of a real-world environment including a second electronic device that is displaying, via one or more second displays, a first representation of a user interface of the second electronic device;

presenting, via one or more displays, a three-dimensional environment including a representation of the captured portion of the real-world environment;

while presenting the three-dimensional environment including the representation of the captured portion of the real-world environment, in accordance with a determination that one or more first criteria are satisfied:

presenting, via the one or more displays, a first affordance associated with a representation of the second electronic device;

while presenting the three-dimensional environment including the representation of the captured portion of the real-world environment and the first affordance, receiving, via the one or more input devices, an input corresponding to a selection of the first affordance; and presenting, in the three-dimensional environment, a second representation of the user interface of the second electronic device different than the first representation of the user interface, in accordance with the input corresponding to the selection of the first affordance, while maintaining presentation of the captured portion of the real-world environment that includes the first representation of the user interface of the second electronic device that is being displayed via the one or more second displays.

10. The first electronic device of claim 9, wherein the one or more first criteria include a criterion that is satisfied when the one or more second displays of the second electronic device are visible to a user of the first electronic device.

11. The first electronic device of claim 9, wherein the one or more first criteria include:

a criterion that is satisfied when the second electronic device is in communication with the first electronic device.

12. The first electronic device of claim 9, wherein the method further comprises:

while presenting, in the three-dimensional environment, the second representation of the user interface of the second electronic device, causing the one or more second displays of the second electronic device to power down.

13. The first electronic device of claim 9, wherein presenting, in the three-dimensional environment, the second representation of the user interface of the second electronic device includes:

presenting, within the second representation of the user interface of the second electronic device, a cursor controllable by one or more input devices in communication with the second electronic device;

wherein presentation of a movement of the cursor is bounded within the second representation of the user interface of the second electronic device.

14. The first electronic device of claim 9, wherein the method further comprises:

while presenting, in the three-dimensional environment, the second representation of the user interface of the second electronic device, receiving an input corresponding to a manipulation of contents of the second representation of the user interface of the second electronic device; and in accordance with the input corresponding to the manipulation of the representation of the user interface, updating an appearance of the second representation of the user interface in accordance with the input.

15. The first electronic device of claim 9, wherein presenting, in the three-dimensional environment, the second representation of the user interface of the second electronic device also includes:

presenting, in the three-dimensional environment, a first portion of the first representation of the user interface of the second electronic device at a region of the three-dimensional environment at which the one or more second displays are located and a second portion of the first representation of the user interface in a user interface element within a threshold distance of the region of the three-dimensional environment at which the one or more second displays are located.

16. The first electronic device of claim 15, wherein the second representation of the user interface of the second electronic device includes a cursor controllable by one or more input devices in communication with the second electronic device;

wherein presentation of a movement of the cursor is bounded by the region of the three-dimensional environment at which the one or more second displays are located and the user interface element within the threshold distance of the region of the three-dimensional environment at which the one or more second displays are located.

17. A non-transitory computer readable storage medium storing one or more programs, the one or more programs comprising instructions, which when executed by one or more processors of a first electronic device, cause the first electronic device to perform a method comprising:

capturing, via one or more input devices, at least a portion of a real-world environment including a second electronic device that is displaying, via one or more second displays, a first representation of a user interface of the second electronic device;

presenting, via one or more displays, a three-dimensional environment including a representation of the captured portion of the real-world environment;

while presenting the three-dimensional environment including the representation of the captured portion of the real-world environment, in accordance with a determination that one or more first criteria are satisfied:

presenting, via the one or more displays, a first affordance associated with a representation of the second electronic device;

while presenting the three-dimensional environment including the representation of the captured portion of the real-world environment and the first affordance, receiving, via the one or more input devices, an input corresponding to a selection of the first affordance; and presenting, in the three-dimensional environment, a second representation of the user interface of the second electronic device different than the first representation of the user interface, in accordance with the input corresponding to the selection of the first affordance, while maintaining presentation of the captured portion of the real-world environment that includes the first representation of the user interface of the second electronic device that is being displayed via the one or more second displays.

18. The non-transitory computer readable storage medium of claim 17, wherein the one or more first criteria include a criterion that is satisfied when the one or more second displays of the second electronic device are visible to a user of the first electronic device.

19. The non-transitory computer readable storage medium of claim 17, wherein the one or more first criteria include:

a criterion that is satisfied when the second electronic device is in communication with the first electronic device.

20. The non-transitory computer readable storage medium of claim 17, wherein the method further comprises:

while presenting, in the three-dimensional environment, the second representation of the user interface of the second electronic device, causing the one or more second displays of the second electronic device to power down.

21. The non-transitory computer readable storage medium of claim 17, wherein presenting, in the three-dimensional environment, the second representation of the user interface of the second electronic device includes:

presenting, within the second representation of the user interface of the second electronic device, a cursor controllable by one or more input devices in communication with the second electronic device;

wherein presentation of a movement of the cursor is bounded within the second representation of the user interface of the second electronic device.

22. The non-transitory computer readable storage medium of claim 17, wherein the method further comprises:

while presenting, in the three-dimensional environment, the second representation of the user interface of the second electronic device, receiving an input corresponding to a manipulation of contents of the second representation of the user interface of the second electronic device; and in accordance with the input corresponding to the manipulation of the representation of the user interface, updating an appearance of the second representation of the user interface in accordance with the input.

23. The non-transitory computer readable storage medium of claim 17, wherein presenting, in the three-dimensional environment, the second representation of the user interface of the second electronic device also includes:

presenting, in the three-dimensional environment, a first portion of the first representation of the user interface of the second electronic device at a region of the three-dimensional environment at which the one or more second displays are located and a second portion of the first representation of the user interface in a user interface element within a threshold distance of the region of the three-dimensional environment at which the one or more second displays are located.

24. The non-transitory computer readable storage medium of claim 23, wherein the second representation of the user interface of the second electronic device includes a cursor controllable by one or more input devices in communication with the second electronic device;

wherein presentation of a movement of the cursor is bounded by the region of the three-dimensional environment at which the one or more second displays-are located and the user interface element within the threshold distance of the region of the three-dimensional environment at which the one or more second displays are located.

* * * * *